US006344075B1

(12) United States Patent
Ohya et al.

(10) Patent No.: US 6,344,075 B1
(45) Date of Patent: Feb. 5, 2002

(54) DYE AND IMAGE RECORDING MATERIAL, AND THERMAL TRANSFER MATERIAL AND INK-JET RECORDING LIQUID

(75) Inventors: Hidenobu Ohya; Manabu Kaneko; Shuji Kida, all of Hino (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 09/338,938

(22) Filed: Jun. 24, 1999

(30) Foreign Application Priority Data

Jun. 24, 1998 (JP) .......................................... 10-193793
Jun. 24, 1998 (JP) .......................................... 10-193794

(51) Int. Cl.[7] .............................................. C09D 11/02
(52) U.S. Cl. ................................ 106/31.27; 106/31.43; 106/31.47; 106/31.49
(58) Field of Search ........................... 106/31.49, 31.47, 106/31.27, 31.4, 31.43; 548/336.1, 375.1, 371.7; 546/187, 199, 256, 274.1, 275.7

(56) References Cited

U.S. PATENT DOCUMENTS

| | | | | |
|---|---|---|---|---|
| 5,210,200 A | * | 5/1993 | Shimada et al. | .......... 548/303.1 |
| 5,470,985 A | * | 11/1995 | Ninomiya et al. | ........ 548/312.4 |
| 5,476,943 A | * | 12/1995 | Komamura et al. | ......... 546/271 |
| 5,753,017 A | * | 5/1998 | Onodera et al. | .......... 106/31.49 |

FOREIGN PATENT DOCUMENTS

| | | |
|---|---|---|
| JP | 3-93862 | 4/1991 |
| JP | 4-089287 A * | 3/1992 |
| JP | 4-234860 | 8/1992 |
| JP | 4-338592 | 11/1992 |
| JP | 5-239367 | 9/1993 |
| JP | 5-309954 | 11/1993 |
| JP | 6-73009 | 3/1994 |
| JP | 6-80638 | 3/1994 |
| JP | 6-143838 | 5/1994 |
| JP | 6-143839 | 5/1994 |
| JP | 6-219057 | 8/1994 |
| JP | 7-232482 | 9/1995 |
| JP | 8-283591 | 10/1996 |

OTHER PUBLICATIONS

Derwent abstract of JP04/089287, 3/1002.*

* cited by examiner

*Primary Examiner*—Helene Klemanski
(74) *Attorney, Agent, or Firm*—Frishauf, Holtz, Goodman, Langer & Chick, P.C .

(57) ABSTRACT

A dye and a recording material employing the dye are disclosed. The dye is represented by formula $$B=N-A$$

In the formula, A represents a metal-free atomic group necessary to form a condensed ring having —$NR_1R_2$ as a substituent on the ring, except for one ring in which a carbon atom on the ring combines with the nitrogen atom in the formula. B represents a coupler component and combines with a nitrogen atom in the formula at coupling position of the coupler component. $R_1$ and $R_2$ each independently represents a hydrogen atom, an alkyl group which may have a substituent, an aryl group which may have a substituent, and a heterocycle which may have a substituent, and $R_1$ and $R_2$ may combine with each other to form a ring.

20 Claims, No Drawings

DYE AND IMAGE RECORDING MATERIAL, AND THERMAL TRANSFER MATERIAL AND INK-JET RECORDING LIQUID

BACKGROUND OF THE INVENTION

Conventionally, in order to obtain high-quality full color images employing a simple apparatus, is known a method in which a thermal transfer material is employed. In this method, dyes employed for forming color images are most essential and affect the performance of a variety of areas such as color reproduction of color images, various types of fastness, maximum density, thermal sensitivity, etc. Hitherto, various dyes such as styryl series, pyridoneazo series, pyrazoleazo series, anthraquinone series, naphthoquinone series, azomethine series, indoaniline series, and the like, have been investigated. However, dyes which exhibit satisfactory fastness, specifically in light fastness, have not been found yet.

In recent years, dyes, in which the aniline structure part of azomethine dyes and indoaniline dyes is altered to a heterocycle, have been investigated and the light fastness has been improved. For example, known regarding pyridine series dyes, are Japanese Patent Publication Open to Public Inspection Nos. 4-89287, 5-239367, 6-73009, 6-80638, 7-232482, etc. Regarding thiazole series dyes, are known Japanese Patent Publication Open to Public Inspection Nos. 3-93862, 4-234860, 4-338592, 5-309954, 8-283591, etc. Regarding thiophene series dyes, are known Japanese Patent Publication Open to Public Inspection Nos. 6-143838 and 6-143839. In addition, azomethine dyes having a 5-membered unsaturated heterocyclic structure are disclosed in Japanese Patent Publication Open to Public Inspection No. 6-219057.

As described above, many types of dyes have been investigated so far, but dyes having satisfactory light fastness have not been discovered. Thus, further improvement in the light fastness is being sought.

In ink-jet recording, conventionally employed azo series dyes, xanthene series dyes, triphenylmethane series dyes, etc. do not exhibit satisfactory fastness, specifically in light fastness. Among azomethine dyes, recently, those, in which the aniline structure part is altered to a heterocycle, have been investigated to improve the light fastness. For example, regarding pyridine series dyes, Japanese Patent Publication Open to Public Inspection No. 9-150572 is known. However, at present, dyes having satisfactory light fastness have not yet been discovered. Further improvement in the light fastness is demanded.

Similarly, in color electrophotography, dyes exhibiting satisfactory fastness, specifically in light fastness have not been found in the same way as have thermal transfer materials and ink-jet recording liquids.

As described above, in a variety of image recording materials, improvement in image fastness, specifically in light fastness is demanded, however, there are no image recording materials which exhibit satisfactory properties. This is largely due to the fact that dyes having sufficient fastness, specifically in light fastness have not been discovered.

Japanese Patent Publication Open to Public Inspection No. 6-80900 discloses dyes composed of aminophenol compounds and couplers. However, the resulting dyes exhibit insufficient light fastness.

U.S. Pat. No. 2,895,825 discloses that 4-aminopyrazolone compounds are employed as a developing agent for silver halide color photosensitive photographic materials. However, in that document, no description is given on isolation of dyes employing the developing agent, or application of dyes employing the developing agent to thermal transfer materials, to ink-jet recording or to a color toner for electrophotography, and the technique only disclose a method in which the resulting compounds are employed as a developing agent for silver halide photosensitive color photographic material to form images. Accordingly, nothing is described on the fastness of color images on the media employed for the thermal transfer recording or ink-jet recording.

SUMMARY OF THE INVENTION

An object of the present invention is to provide novel dyes which are excellent in fastness, specifically in light fastness, and image recording materials, thermal transfer materials, and ink-jet recording liquids employing said dyes.

The present invention and embodiments thereof will now be described.

A dye represented by formula (1)

wherein A represents a metal-free atomic group necessary to form a condensed ring having —$NR_1R_2$ as a substituent on the ring, except for one ring in which a carbon atom on the ring combines with the nitrogen atom in the formula, and B represents a coupler component and combines with a nitrogen atom in the formula at the coupling position of the coupler component. $R_1$ and $R_2$ each independently represents a hydrogen atom, an alkyl group which may have a substituent, an aryl group which may have a substituent, and a heterocycle which may have a substituent, and $R_1$ and $R_2$ may combine with each other to form a ring.

A dye described above in which A represents a metal-free atomic group necessary to form an aromatic condensed ring composed of two rings having —$NR_1R_2$ as a substituent on a ring except for, one ring in which a carbon atom on the ring combines with the nitrogen atom in the formula.

A dye represented by formula (2)

wherein A represents a metal-free atomic group necessary to form a condensed ring having —$NR_1R_2$ as a substituent on the ring, except for one ring in which a carbon atom on the ring combines with D, and B represents a coupler component and combines with D at the coupling position of the coupler component. $R_1$ and $R_2$ each independently represents a hydrogen atom, an alkyl group which may have a substituent, an aryl group which may have a substituent, and a heterocycle which may have a substituent, and $R_1$ and $R_2$ may combine with each other to form a ring. D represents a nitrogen atom or $CR_3$. $R_3$ represents a hydrogen atom or a substitutable group.

A dye represented by formula (I)

wherein X and Y each independently represents a coupler component, and G combines with a coupler component at the coupling position. G represents a nitrogen atom or C—$R_X$, in which $R_X$ represents a hydrogen atom or a substitutable group, however except that at least one of X and Y is phenol, and may also have a substituent.

In the formula (I) Y is preferably not a cyan coupler component.

In the formula (I) either X or Y is preferably a magenta coupler component.

In the formula (I) both X and Y are preferably magenta coupler components.

A dye represented by formula (2-1)

$$A_2\text{—}N\text{=}B_2 \qquad (2\text{-}1)$$

wherein $B_2$ represents a coupler component and combines with the nitrogen atom at the coupling position of the coupler component. $A_2$ represents a heterocycle composed of a single ring containing at least one nitrogen atom in the ring or a condensed ring having at least two rings containing at least one nitrogen atom in the rings, and at least one nitrogen atom in the heterocycle is a conjugated terminal and a conjugated chain is completed with —N=$B_2$. However, cases are excluded when the heterocycle in $A_2$ is substituted with an amino group, and when the coupler component represented by $B_2$ is phenol which may have a substituent.

In preferable examples of dye of the formula (2-1), $A_2$ represents a heterocycle composed of a single ring containing at least one nitrogen atom in the ring or a condensed ring having at least two rings containing at least one nitrogen atom in the rings, and at least one nitrogen atom in the heterocycle is a conjugated terminal and a conjugated chain is completed with —N=$B_2$, and the nitrogen atom of —N=$B_2$ is substituted on a ring containing the nitrogen atom which is the conjugated terminal (however, cases are excluded when the heterocycle represented by $A_2$ is substituted with an amino group, and when the coupler component represented by $B_2$ is phenol which may have a substituent).

In the formula (2-1) a heterocycle represented in $A_2$ is preferably a single ring compound.

In the formula (2-1) the heterocycle represented by $A_2$ is a condensed polycyclic compound in which at least two rings are condensed to form the heterocycle.

In a preferable example of dye of formula (2-1) the heterocycle represented by $A_2$ is pyrrole, imidazole, indole or pyrrocoline each of which may have a substituent.

A dye represented by formula (2-2)

$$A_2\text{—}D_2\text{=}B_2 \qquad (2\text{-}2)$$

wherein $B_2$ represents a coupler component, and combines with $D_2$ represents at the coupling position of the coupler component. $D_2$ represents a nitrogen atom or —C($R_1$)=, and $R_1$ represents a hydrogen atom or a substituent. $A_2$ represents a heterocycle composed of a single ring containing at least one nitrogen atom in the ring or a condensed ring having at least two rings containing at least one nitrogen atom in the rings, and at least one nitrogen atom in the heterocycle is a conjugated terminal and a conjugated chain is completed with —$D_2$=$B_2$. However, cases are excluded when the heterocycle represented by $A_2$ is substituted with an amino group, and when the coupler component represented by $B_2$ is phenol which may have a substituent.

A dye represented by formula (2-I)

$$X_2\text{—}G_2\text{=}Y_2 \qquad (2\text{-I})$$

wherein $Y_2$ represents a coupler component and combines with $G_2$ at the coupling position of the coupler component. $G_2$ represents a nitrogen atom or —C($R_a$)=, wherein $R_a$ represents a hydrogen atom or a substituent. $X_2$ represents a condensed polycyclic heterocycle which contains at least one nitrogen atom in the ring and is formed by condensing at least two rings, a heterocycle in which at least one nitrogen atom in the ring is a conjugated terminal and a conjugated chain is thereby completed with —$G_2$=$Y_2$, and a heterocycle in which $G_2$ is substituted with a ring different from a ring containing a nitrogen atom which is a conjugated terminal. However, cases are excluded when the coupler component represented by $Y_2$ is phenol which may have a substituent.

Preferable example of the heterocycle represented by X is indole.

A dye represented by formula (229) or formula (230)

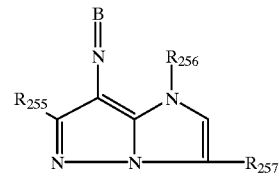

Formula (229)

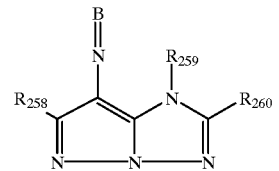

Formula (230)

In formulas (229) and (230), $R_{255}$, $R_{257}$, $R_{258}$, and $R_{260}$, each represents an alkyl group which may have a substituent, an aryl group which may have a substituent, a heterocycle which may have a substituent, an acylamino group, an alkyloxy group, an aryloxy group, a carbamoyl group, a cyano group, an alkoxycarbonyl group, and an aryloxycarbonyl group, $R_{256}$ and $R_{59}$ each represent an alkyl group which may have a substituent, and B represents a coupler component.

A dye represented by formula (231) or formula (232)

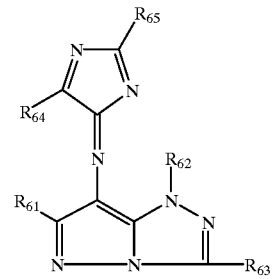

Formula (231)

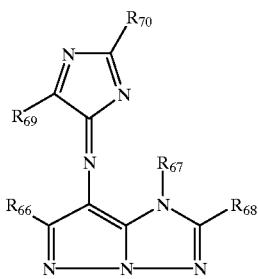

Formula (232)

In formulas (231) and (232), $R_{64}$ and $R_{69}$ each represents a hydrogen atom, an alkyl group which may have a substituent, an aryl group which may have a substituent, a heterocycle which may have a substituent, an acylamino group, an alkyloxy group, an aryloxy group; $R_{65}$ and $R_{70}$ each represents a hydrogen atom, an alkyl group which may have a substituent, an aryl group which may have a substituent, a heterocycle which may have a substituent, an acylamino group, an alkyloxy group, an aryloxy group; $R_{61}$, $R_{63}$, $R_{66}$, and $R_{68}$ each represents an alkyl group which may have a substituent, an aryl group which may have a substituent, a heterocycle which have a substituent, an acylamino group, an alkyloxy group, an aryloxy group, a carbamoyl group, a cyano group, an alkoxycarbonyl group, and an aryloxycarbonyl group; and $R_{62}$ and $R_{67}$ each represents an alkyl group which may have a substituent.

The dyes are employed in an image recording material, particularly a thermal transfer recording material, an ink-jet recording liquid.

The thermal transfer material comprises a support and a layer containing the dye.

DETAILED DESCRIPTION OF THE INVENTION

These dyes of the present invention are different from conventional dyes having a 5-membered unsaturated heterocyclic structure, and are characterized in that an amino group is not substituted on the heterocycle. The nitrogen atom in the heterocycle, positioned at the terminal of the conjugated chain of the dye, works as an auxochrome. Accordingly, dyes having maximum adsorption wavelengths in the visible range of 400 to 700 nm, that is, yellow, magenta, and cyan dyes are obtained. Though the dyes have the same heterocyclic structure as conventional dyes, in terms of technology, they are different from conventional dyes.

First, dyes represented by formula (1) will be described.

"A" represents a metal-free atomic group which is necessary to form a condensed ring having —NR₁R₂ as a substituent on the ring except for a ring in which a carbon atom on the ring combines with the nitrogen atom in the formula. The condensed ring represented by "A" include two-ring condensed compounds such as naphthalene, benzofuran, indole, thionaphthene, benzimidazole, benzthiazole, purine, quinoline, isoquinoline, coumarin, cinnoline, quinoxaline, and azulene; 3-ring condensed compounds such as fluorene, dibenzofuran, carbazole, anthracene, phenanthrene, acridine; and 4-ring condensed compounds such as pyrene. However, 2-ring condensed compounds are preferred.

Further, condensed rings include a carbon ring and a heterocyclic ring, of which the latter is preferred.

Still further, the condensed rings represented by "A" may be either a saturated ring or an unsaturated ring.

Still further, the condensed rings represented by "A" may have a substituent which is substitutable, and include, for example, an alkyl group, a phenyl group, an alkoxy group, an amino group, an alkylthio group, a halogen atom, an acylamino group, an acyloxy group, a carbamoyl group, an oxycarbonyl group, a cyano group, a nitro group, a fulphon acid group, a carboxylic acid group, etc.

As the condensed rings represented by "A", aromatic rings composed of two rings are preferred. Specifically preferred are naphthalene, benzofuran, indole, thionaphthene, benzimidazole, benzthiazole, purine, quinoline, isoquinoline, coumarin, cinnoline, quinoxaline, and azulene; more preferred are quinoline, benzofuran, indole, thionaphthene, benzimidazole, and benzthiazole, and most preferred is quinoline.

"A" has —NR₁R₂ as a substituent on the ring except for a ring in which a carbon atom on the ring combines with the nitrogen atom in the formula, and it is preferred to substitute —NR₁R₂ in a position to complete a conjugated chain together with B=N. By substituting —NR₁R₂ in the position to complete the conjugated chain together with B=N, the maximum absorption wavelengths of the dye are shifted to the longer wavelength region and the molar absorption coefficient is increased.

$R_1$ and $R_2$ each independently represents a hydrogen atom, an alkyl group which may have a substituent, an aryl group which may have a substituent, a heterocyclic group which may have a substituent, and may combine with each other to form a ring. Substituents as described herein include an alkyl group, a phenyl group, an alkoxy group, an amino group, an alkylthio group, a halogen atom, an acylamino group, an acyloxy group, a carbamoyl group, an oxycarbonyl group, a cyano group, a nitro group, a fulphon acid group, an carboxylic acid, etc.

$R_1$ and $R_2$ each independently is more preferably an alkyl group which may have a substituent, and specifically, $R_1$ and $R_2$ each represents a methyl group, an ethyl group, a n-propyl group, an i-propyl group, a n-butyl group, a n-hexyl group, a 2-hydroxyethyl group, a 2-methanesulfonamidoethyl group, a 2-cyanoethyl group, a 2-methanesulfonylethyl group, a 2-ethoxycarbonylethyl group, a 2-methoxyethyl group, a 2-sulfoethyl group, a 2-carboxyethyl group, etc.

Next, couplers represented by B in general formula (1) will be described.

The coupler component as described herein is one which is subjected to oxidation coupling with a p-phenylenediamine series compound. Active methylene compounds, active hydrogen-containing compounds, phenols, naphthols, etc. are listed. As preferred B, general formulas (3) through (9) are listed.

Of these, couplers represented by the general formulas (5), (6), and (7) are preferred, and couplers represented by the general formulas (5) and (6) are more preferred.

General Formula (3)

$R_5COC^*R_4$

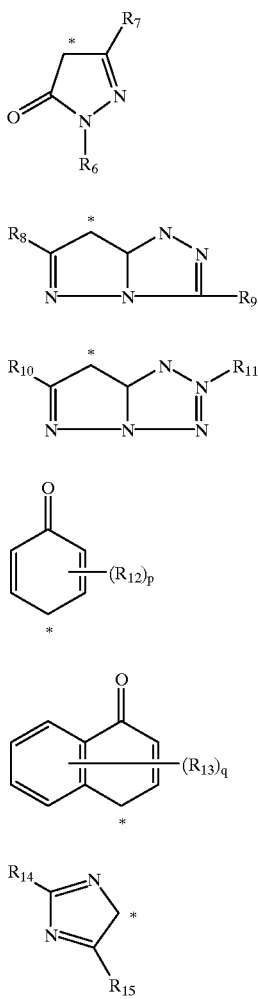

General Formula (4)

General Formula (5)

General Formula (6)

General Formula (7)

General Formula (8)

General Formula (9)

In these formulas, a carbon atom marked with "*" shows a coupling position.

In general formula (3), $R_4$ represents a carbamoyl group or a cyano group, and $R_5$ represents an alkyl group which may have a substituent, an aryl group which may have a substituent, a heterocycle which may have a substituent. In these formulas, a carbon atom marked with "*" shows an coupling position.

In general formula (4), $R_6$ is the same as $R_5$, and $R_7$ represents an alkyl group which may have a substituent, an aryl group which may have a substituent, a heterocycle which may have a substituent, an acylamino group, an anilino group, an amino group, an alkyloxy group, a cyano group, a carbamoyl group, an alkoxycarbonyl group, and an aryloxycarbonyl group.

In general formula (5), $R_8$ and $R_9$ each is the same as $R_7$.

In general formula (6), $R_{10}$ and $R_{11}$ each is the same as $R_7$.

In general formula (7), $R_{12}$ represents an alkyl group which may have a substituent, an acylamino group, a halogen atom, a ureido group, an alkoxycarbonylamino group, and an aryloxycarbonylamino group. "p" represents is 1 to 4. When "p" represents 2, 3, or 4, $R_{12}$ may be the same or different.

In general formula (8), $R_{13}$ represents an acylamino group, a sulfonylamino group, a ureido group, a carbamoyl group, an alkoxycarbonylamino group, an aryloxycarbony-lamino group, an amino group, and "q" represents 1 to 3. When "q" represents 2, 3, or 4, $R_{13}$ may be the same or different.

In general formula (9), $R_{14}$ and $R_{15}$ each is the same as $R_5$.

Particularly preferred dyes represented by general formula (1) are those represented by the general formula (10) described below.

$$E=N-F$$ General Formula (10)

wherein F represents a metal-free atomic group necessary for forming an aromatic condensed 2-ring having, as a substituent, $-NR_1R_2$ on the ring except for a ring in which a carbon atom on a ring combines with the nitrogen atom in the formula, and $-NR_1R_2$ positions to complete a conjugated chain together with $E=N$. "E" represents a coupler component represented by the general formulas (3) through (9), and combines with a nitrogen atom in the formula at the coupling position of the coupler component. $R_1$ and $R_2$ each independently represents a hydrogen atom, an alkyl group which may have a substituent, an aryl group which may have a substituent, a heterocycle which may have a substituent, and $R_1$ and $R_2$ may combine with each other to form a ring.

As condensed rings represented by F, specifically preferred are naphthalene, benzofuran, indole, thionaphthene, benzimidazole, benzthiazole, purine, quinoline, isoquinoline, coumarin, cinnoline, quinoxaline, and azulene; more preferred are quinoline, benzofuran, indole, thionaphthene, benzimidazole, and benzthiazole, and, most preferred is quinoline. These condensed ring may have a substitutable substitute such as, for example, an alkyl group, a phenyl group, an alkoxy group, an amino group, an alkylthio group, a halogen atom, an acylamino group, an acyloxy group, a carbamoyl group, an oxycarbonyl group, a cyano group, a nitro group, a fulphon acid group, a carboxylic acid, etc.

E represents couplers represented by general formulas (3) through (9), but couplers represented by (5) and (6) are more preferred.

Next, general formula (2) will be described.

A represents a metal-free atomic group necessary for forming a condensed ring having $-NR_1R_2$ as a substituent on the ring except for a ring in which a carbon atom on a ring combines with D. The condensed ring represented by A include two-ring condensed compounds such as naphthalene, benzofuran, indole, thionaphthene, benzimidazole, benzthiazole, purine, quinoline, isoquinoline, coumarin, cinnoline, quinoxaline, and azulene; 3-ring condensed compounds such as fluorene, dibenzofuran, carbazole, anthracene, phenanthrene, acridine; and 4-ring condensed compounds such as pyrene. However, 2-ring condensed compounds are preferred.

Further, condensed rings include a carbon ring and a heterocyclic ring, and the latter is preferred.

Still further, the condensed rings represented by "A" may be either a saturated ring or an unsaturated ring.

Further, the condensed rings represented by "A" may have a substituent which is substitutable, and include, for example, an alkyl group, a phenyl group, an alkoxy group, an amino group, an alkylthio group, a halogen atom, an acylamino group, an acyloxy group, a carbamoyl group, an oxycarbonyl group, a cyano group, a nitro group, a fulphon acid group, a carboxylic acid group, etc.

As the condensed rings represented by "A", aromatic rings composed of two rings are preferred. Specifically preferred are naphthalene, benzofuran, indole, thionaphthene, benzimidazole, benzthiazole, purine, quinoline, isoquinoline, coumarin, cinnoline, quinoxaline, and azulene, more preferred are quinoline, benzofuran, indole, thionaphthene, benzimidazole, and benzthiazole, and most preferred is quinoline.

"A" has —NR₁R₂ as a substituent on the ring except for a ring in which a carbon atom on the ring combines with the nitrogen atom in the formula, and it is preferred to substitute —NR₁R₂ in a position to complete a conjugated chain together with B=N. By substituting —NR₁R₂ in the position to complete the conjugated chain together with B=N, the maximum absorption wavelengths of the dye are shifted to the longer wavelength region and the molar absorption coefficient is increased.

R₁ and R₂ each independently represents a hydrogen atom, an alkyl group which may have a substituent, an aryl group which may have a substituent, a heterocyclic group which may have a substituent, and may combine with each other to form a ring. Substituents as described herein include an alkyl group, a phenyl group, an alkoxy group, an amino group, an alkylthio group, a halogen atom, an acylamino group, an acyloxy group, a carbamoyl group, an oxycarbonyl group, a cyano group, a nitro group, a fulphon acid group, an carboxylic acid, etc.

R₁ and R₂ each independently is more preferably an alkyl group which may have a substituent, and specifically, R₁ and R₂ each represents a methyl group, an ethyl group, a n-propyl group, an i-propyl group, a n-butyl group, a n-hexyl group, a 2-hydroxyethyl group, a 2-methanesulfonamidoethyl group, a 2-cyanoethyl group, a 2-methanesulfonylethyl group, a 2-ethoxycarbonylethyl group, a 2-methoxyethyl group, a 2-sulfoethyl group, a 2-carboxyethyl group, etc.

Next, couplers represented by B in general formula (2) will be described.

The coupler component as described herein is one which is subjected to oxidation coupling with a p-phenylenediamine series compound. Active methylene compounds, active hydrogen-containing compounds, phenols, naphthols, etc. are listed. As preferred B, general formulas (3) through (9) are listed.

Of these, couplers represented by the general formulas (5), (6), and (9) are preferred, and couplers represented by the general formulas (5) and (6) are more preferred.

Particularly preferred dyes represented by general formula (2) are those represented by the general formula (11) described below.

E=D—F  General Formula (11)

wherein "F" represents a metal-free atomic group necessary for forming an aromatic condensed 2-ring having —NR₁R₂ as a substituent on the ring except for a ring in which a carbon atom on a ring combines with "D", and —NR₁R₂ positions to complete a conjugated chain together with E=D. "E" represents a coupler component represented by the general formulas (3) through (9), and combines with "D" at the coupling position of the coupler component. R₁ and R₂ each independently represents a hydrogen atom, an alkyl group which may have a substituent, an aryl group which may have a substituent, a heterocyclic group which may have a substituent, and may combine with each other to form a ring.

As condensed rings represented by "F", specifically preferred are naphthalene, benzofuran, indole, thionaphthene, benzimidazole, benzthiazole, purine, quinoline, isoquinoline, coumarin, cinnoline, quinoxaline, and azulene, more preferred are quinoline, benzofuran, indole, thionaphthene, benzimidazole, and benzthiazole, and, most preferred is quinoline. These condensed ring may have a substitutable substitute such as, for example, an alkyl group, a phenyl group, an alkoxy group, an amino group, an alkylthio group, a halogen atom, an acylamino group, an acyloxy group, a carbamoyl group, an oxycarbonyl group, a cyano group, a nitro group, a sulfonic acid group, a carboxylic acid, etc.

"E" represents couplers represented by general formulas (3) through (9), but couplers represented by (5) and (6) are more preferred.

As "A" represented by the general formulas (1) and (2) of the present invention, preferred examples are specifically shown below.

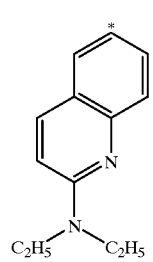

(A1)

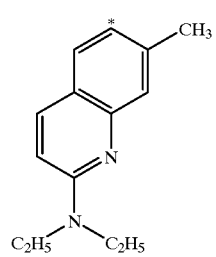

(A2)

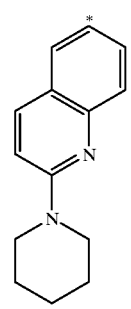

(A3)

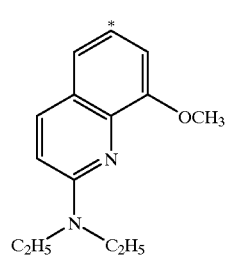

(A4)

-continued
(A5) 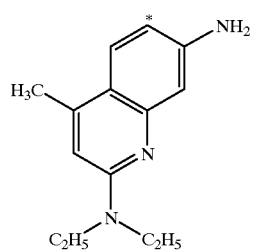
(A6) 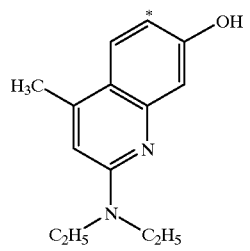
(A7) 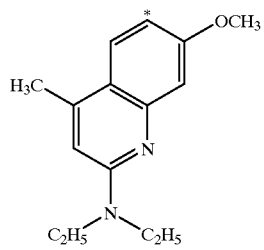
(A8) 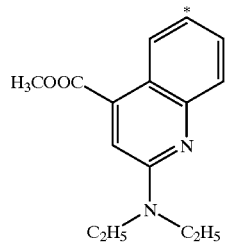
(A9) 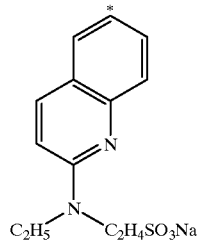
(A10) 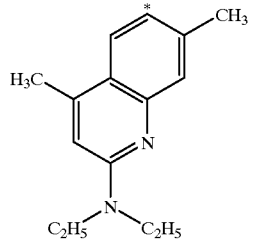
-continued
(A11) 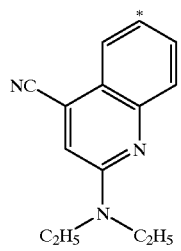
(A12) 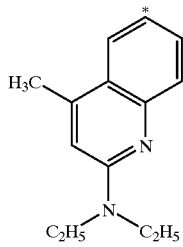
(A13) 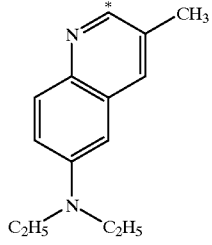
(A14) 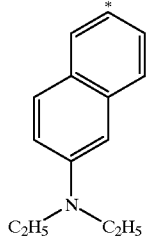
(A15) 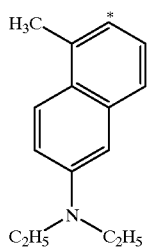
(A16) 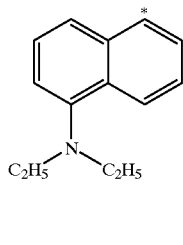

-continued
(A17) 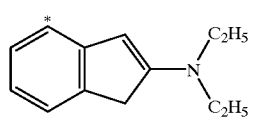
(A18) 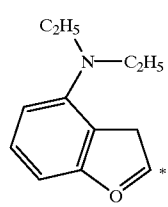
(A19) 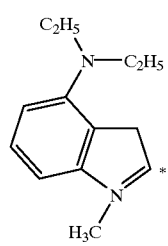
(A20) 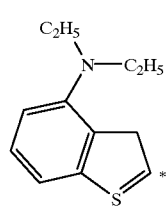
(A21) 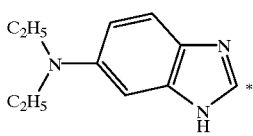
(A22) 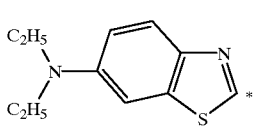
(A23) 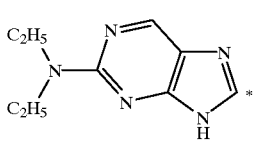
(A24) 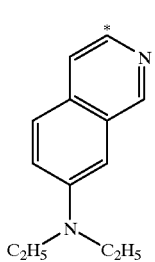
-continued
(A25) 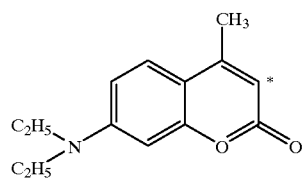
(A26) 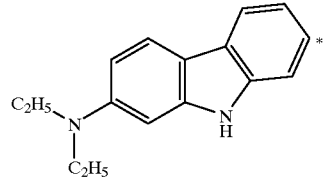
(A27) 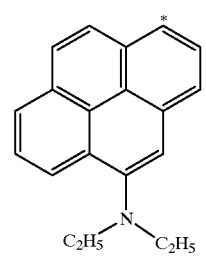
(A28) 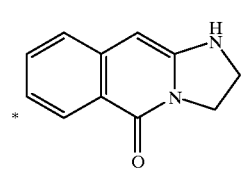
(B1) 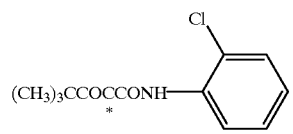
(B2) 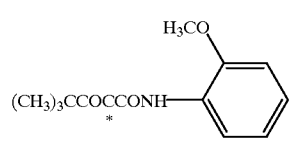
(B3) 
(B4) 
(B5) 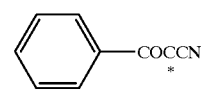

-continued
(B6)
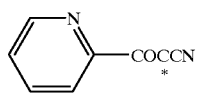
(B7)
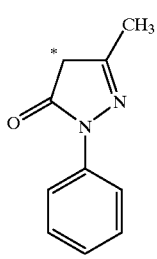
(B8)
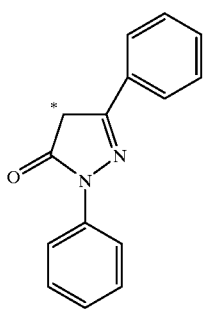
(B9)
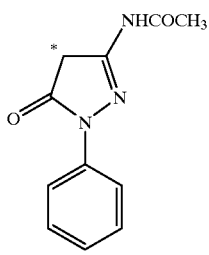
(B10)
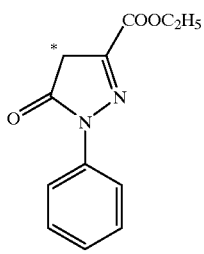
(B11)
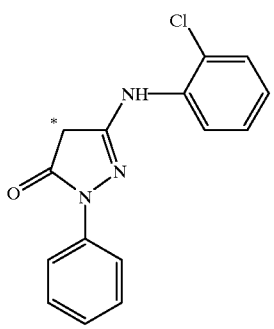
-continued
(B12)
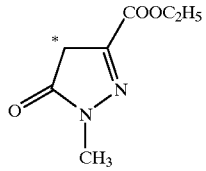
(B13)
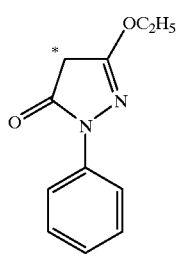
(B14)
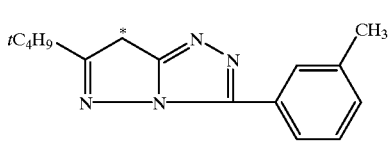
(B15)
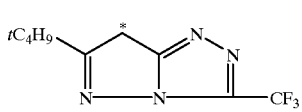
(B16)
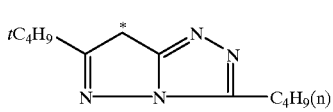
(B17)
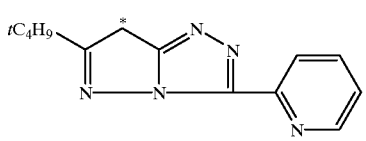
(B18)
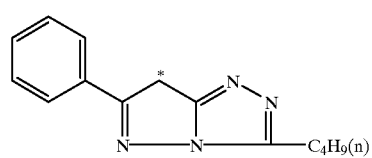
(B19)
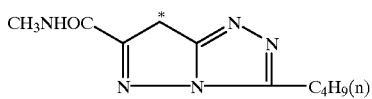
(B20)
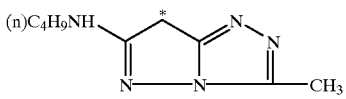
(B21)
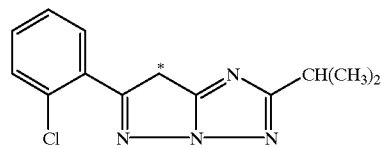

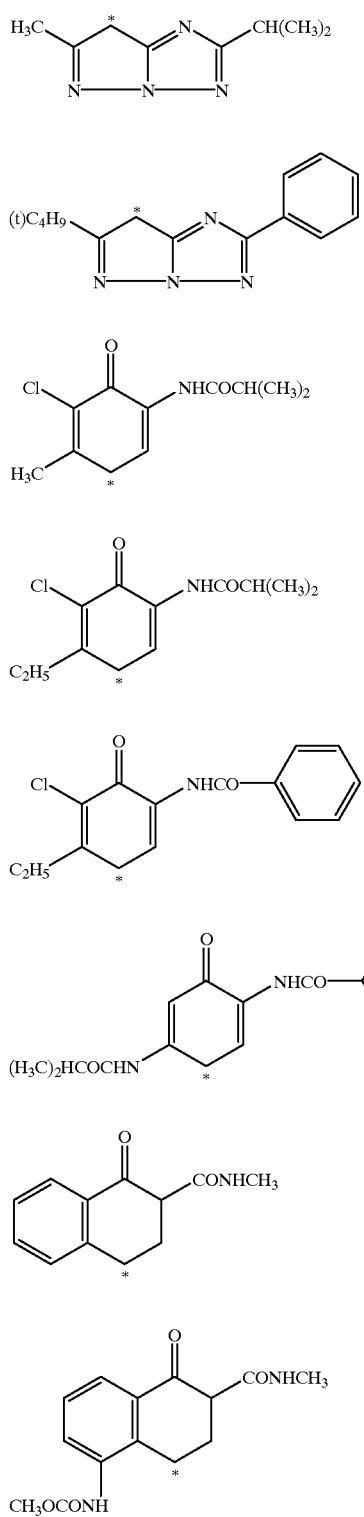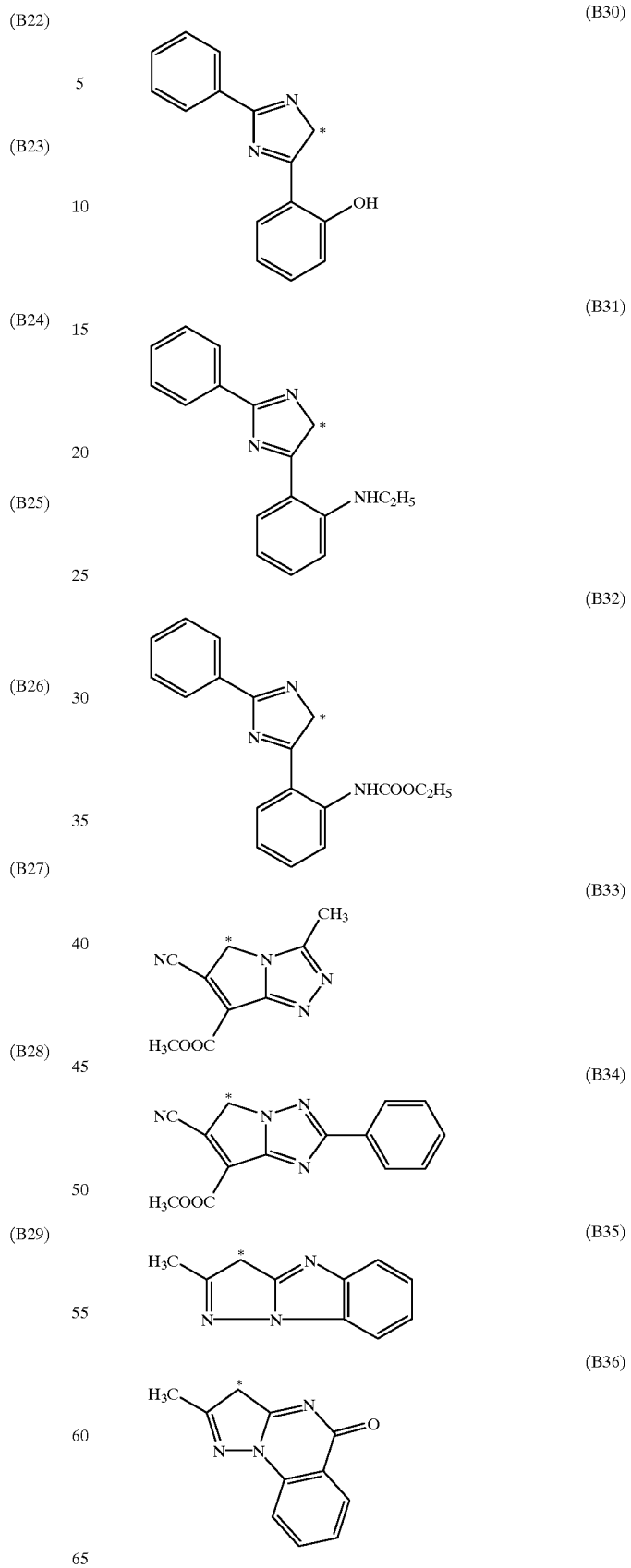

-continued (B37) 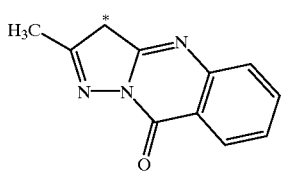

(B38) 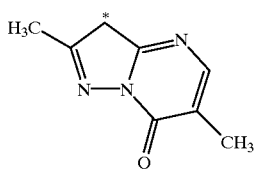

(B39) 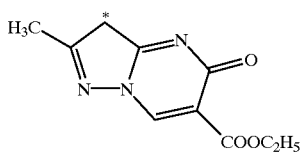

(B40) 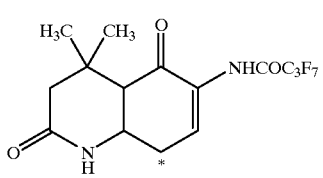

(B41) 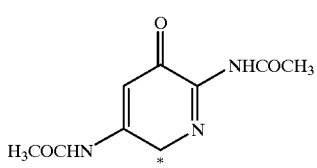

(B42) 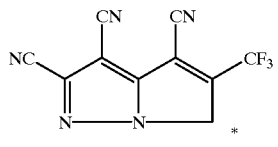

(B43) 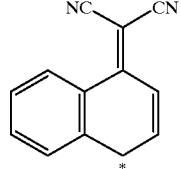

(B44) 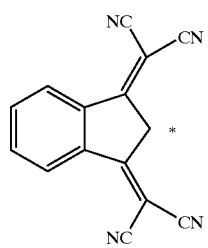

-continued (B45) 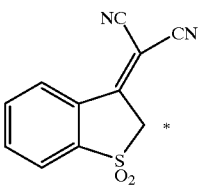

(B46) 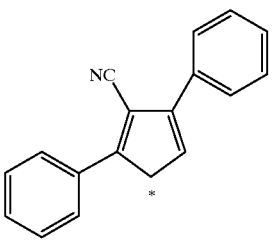

(B47) 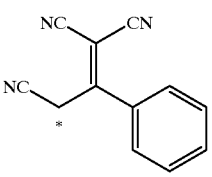

(B48) 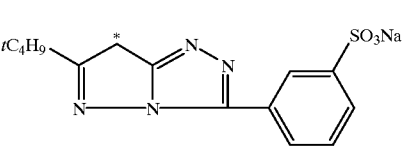

(B49) 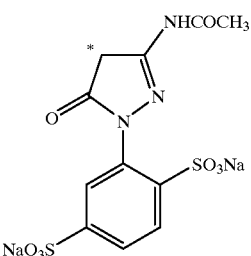

(B50) 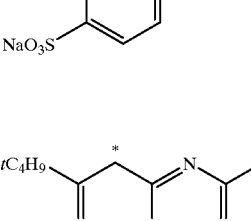

Specific examples of dyes represented by general formulas (1) and (2) of the present invention are shown in Tables 1 and 2 below.

Dyes represented by the general formula (1) of the present invention can be synthesized by a method employing schemes (1) through (4) shown below.

In schemes (1) and (3), derivatives of "A" and "B" are subjected to oxidation coupling in the presence of bases. Herein, L represents a coupling-off group (for example, a chlorine atom, a bromine atom, etc.) or a hydrogen atom.

In schemes (2) and (4), the derivatives of "A" and "B" are subjected to dehydration condensation in the presence of acid catalysts.

$$A\text{—}NH_2 + B\underset{L}{\overset{H}{\diagdown}} \longrightarrow B=N\text{—}A \quad (1)$$

$$A\text{—}NO + B\underset{H}{\overset{H}{\diagdown}} \longrightarrow B=N\text{—}A \quad (2)$$

$$A\text{—}H + B\underset{H}{\overset{NH_2}{\diagdown}} \longrightarrow B=N\text{—}A \quad (3)$$

$$A\text{—}H + B\underset{H}{\overset{NO}{\diagdown}} \longrightarrow B=N\text{—}A \quad (4)$$

Of dyes represented by the general formulas (2) and (11), dyes in which "D" is a nitrogen atom and those represented by the general formula (10) can be synthesized by the same method as above.

Further, dyes represented by general formulas (2) and (11), when "D" is $CR_3$, are synthesized in the same manner as above, except that during reaction (2), nitroso is replaced with corresponding aldehyde, etc.

Synthesis Example 1

Added to 40 ml of methanol, were 2.15 g of Synthesis Example S1 (prepared by reducing a nitro compound synthesized by a method described on pages 258~ of Yakugaku Zasshi, 63; (1943)) and 2.54 g of compound S2, and the resulting mixture was stirred at room temperature. Further, a solution prepared by dissolving 4.14 g of potassium carbonate in 15 ml of water was added. A solution prepared by dissolving 5.01 g of ammonium peroxosulfate in 30 ml of water was added dropwise. After dropwise addition, the resulting mixture was further stirred for one hour at room temperature. Thereafter, the resulting dye was extracted employing ethyl acetate. The resulting ethyl acetate solution was washed with a saturated sodium chloride solution and ethyl acetate was evaporated to obtain a dye residue. The resulting residue was recrystallized employing acetonitrile to obtain 1.0 g of a targeted compound. The synthesized compound was identified as the targeted compound employing NMR and mass spectra. Further, the absorption of the ethyl acetate solution of the synthesized compound was measured, and The maximum absorption wavelength (λmax) and molar absorption coefficient (ε) of the synthesized compound in ethyl acetate were 520 nm and 40,000, respectively.

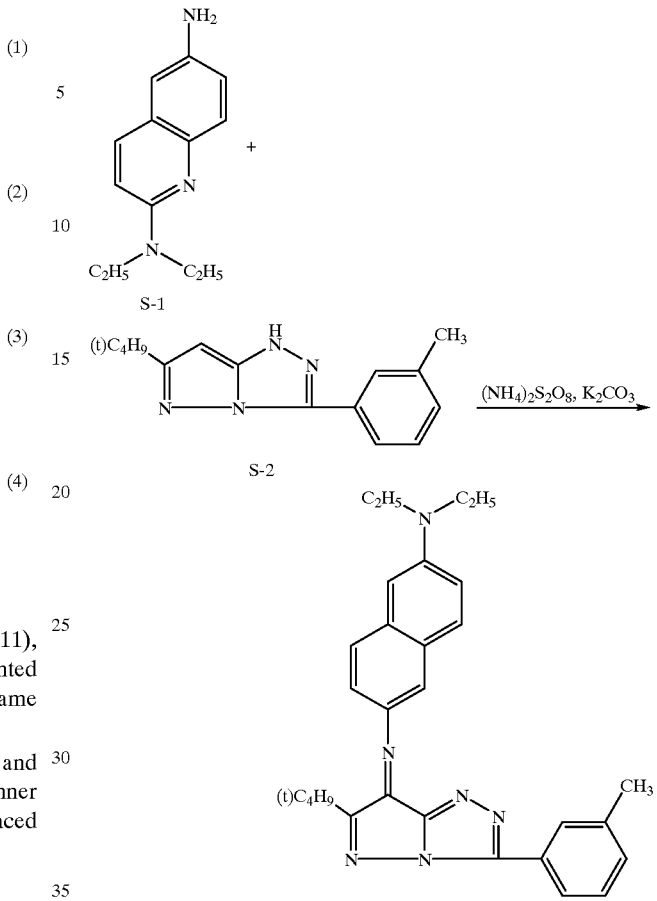

Next, dyes represented by formula (I) will be described.

Some of dyes represented by formula (I) form tautomers as shown below:

and all these tautomers are included in the present invention.

wherein X and Y each represents a coupler component and combines with G at the coupling position of the coupler component. Coupler components represented by X and Y may be the same or different. The coupler component as described herein is one which undergoes oxidation coupling with a p-phenylenediamine series compound and is employed to form dyes in silver halide photosensitive color photographic materials. Mother groups which can be a coupler component are described in Chapter 12 of T. H. James, "The Theory of the Photographic Process" 4th Ed. (Macmillan Ltd.) and Chapter 14 of Mees, "The Theory of the Photographic Process" (Macmillan Ltd.) and those can be employed. Specifically, listed are active methylene compounds, active hydrogen-containing compounds, phenols, naphthols, etc.

The coupler component undergoes oxidation coupling with a p-phenylenediamine series compound to form a dye. Based on the hue of the resulting dyes, coupler components can be classified into a yellow coupler component, a magenta coupler component, and a cyan coupler component.

In the present invention, a coupler component which forms a dye upon oxidation coupling with p-phenylenediamino-m-toluidine (CD-2), in which the maximum absorption wavelengths in an ethyl acetate solution are between 400 and 500 nm, is denoted as a yellow coupler component, a coupler component which forms a dye having the maximum absorption wavelengths between 501 and 600 nm is denoted as a magenta coupler component, and a coupler component which forms a dye having the maximum absorption wavelengths between 601 and 700 nm is denoted as a cyan coupler component.

In formula (I), there are many types for selecting coupler components represented by X and Y, however, as the coupler components represented by X and Y, a yellow coupler component and a magenta coupler component are preferably selected, and a magenta coupler component is more preferably selected.

Further, couplers represented by X and Y are preferably coupler components having the same color in terms of spectroscopic characteristics of the resulting dyes. specifically, there are cases in which both X and Y represent yellow coupler components, both X and Y represent magenta coupler components, and both X and Y represent cyan coupler components. Of these, the case is preferred in which both X and Y represent magenta coupler components.

Further, preferred coupler components are those represented by formulas (II) through (VII) described below; more preferred coupler components are those represented by formulas (III), (IV), (V), and (VII), and most preferred coupler components are those represented by general formulas (IV) and (V).

In these formulas, a carbon atom marked with "*" shows an coupling position.

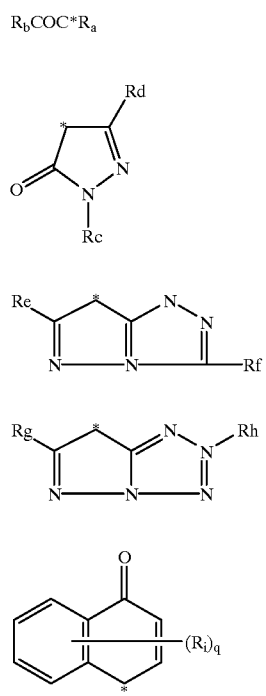

General Formula (II)

$R_bCOC^*R_a$

General Formula (III)

General Formula (IV)

General Formula (V)

General Formula (VI)

-continued

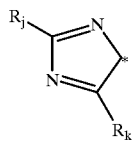

General Formula (VII)

In formula (II), $R_a$ represents a carbamoyl group or a cyano group, and $R_b$ represents an alkyl group which may have a substituent, an aryl group which may have a substituent, and a heterocycle which may have a substituent.

In formula (III), $R_c$ is the same as $R_b$, and $R_d$ represents an alkyl group which may have a substituent, an aryl group which may have a substituent, a heterocycle which may have a substituent, an acylamino group, an anilino group, an amino group, an alkyloxy group, a cyano group, a carbamoyl group, an alkoxycarbonyl group, and an aryloxycarbonyl group.

In (IV), $R_e$ and $R_f$ each is the same as $R_d$. $R_e$ and $R_f$ each represents an alkyl group which may have a substituent, an aryl which may have a substituent, a heterocycle which may have a substituent, an acylamino group, an anilino group, an amino group, an alkyloxy group, a cyano group, a carbamoyl group, an alkoxycarbonyl group, and an aryloxycarbonyl group, and of these, an alkyl group which may have a substituent and an aryl which may have a substituent are preferred. More preferred specific examples include a methyl group, an ethyl group, an i-propyl group, a t-butyl group, a n-pentyl group, a phenyl group, and a phenyl group having a substituent. The phenyl groups having a substituent include an alkyl group, an alkoxy group, an acyloxy group, an amino group, an acylamino group, a sulfonamide group, a halogen atom, a cyano group, a nitro group, an alkylthio group. $R_e$ is most preferably a methyl group, an i-propyl group, a t-butyl group, and a phenyl group which may have a substituent. $R_f$ is most preferably an alkyl group which may have a substituent, a phenyl group, a heterocyclic group.

In formula (V), $R_g$ and $R_h$ each is the same as $R_d$. $R_g$ and $R_h$ each represents an alkyl group which may have a substituent, an aryl which may have a substituent, a heterocycle which may have a substituent, an acylamino group, an anilino group, an amino group, an alkyloxy group, a cyano group, a carbamoyl group, an alkoxycarbonyl group, and an aryloxycarbonyl group, and of these, an alkyl group which may have a substituent and an aryl which may have a substituent are preferred. More preferred specific examples include a methyl group, an ethyl group, an i-propyl group, a t-butyl group, a n-pentyl group, a phenyl group, and a phenyl group having a substituent. The phenyl groups having a substituent include an alkyl group, an alkoxy group, an acyloxy group, an amino group, an acylamino group, a sulfonamide group, a halogen atom, a cyano group, a nitro group, an alkylthio group. $R_g$ is most preferably a methyl group, an i-propyl group, a t-butyl group, and a phenyl group which may have a substituent. $R_h$ is most preferably an alkyl group which may have a substituent, a phenyl group, a heterocyclic group.

In formula (VI), $R_i$ represents an acylamino group, a sulfonylamino group, a ureido group, a carbamoyl group, an alkoxycarbonylamino group, an aryloxycarbonylamino group, an amino group, an alkyl group, and "q" represents 1 to 3, and, when "q" represents 2, 3, and 4, substituents represented by $R_i$ may be the same or different.

In general formula (VII), $R_j$ and $R_k$ each is the same as $R_b$.

Next, G in general formula (I) will be explained. G represents a nitrogen atom or $CR_X$. $R_X$ is preferably a hydrogen atom or a substitutable substituent. Specifically listed as preferred examples of $R_X$ are a hydrogen atom, an alkyl group, an aryl group, a cyano group, etc. but listed as more preferred $R_X$ are a hydrogen atom and a cyano group. Further, G is more preferably a nitrogen atom.

Particularly preferred dyes represented by formula (1) are those represented by general formula (VIII) described below and more preferred dyes are those represented by formula (IX) described below.

$$J=N-K \quad (VIII)$$

wherein J and K each represents a coupler component represented by formulas (II) through (V) and combines with the nitrogen atom in the formula at the coupling position of each coupler.

$$L=N-M \quad (IX)$$

wherein L and M each represents a coupler component represented by formulas (IV) or (V) and combines with the nitrogen atom in the formula at the coupling position of each coupler.

Specific examples of dyes represented by formula (I) are shown in Tables 3 and 4 described below.

Synthesis Example

Dyes represented by formula (I) of the present can be synthesized by a method employing schemes shown below.

In schemes (1) and (3), derivatives of X and Y are subjected to oxidation coupling in the presence of bases. Herein, L represents a coupling-off group (for example, a chlorine atom, a bromine atom, etc.) or a hydrogen atom.

In schemes (2) and (4), the derivatives of X and Y are subjected to dehydration condensation in the presence of an acid catalyst.

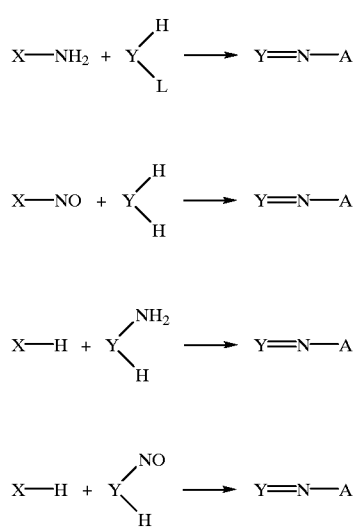

Of dyes represented by the formula (I), when G represents $R_X$, dyes are synthesized employing the above-mentioned scheme (2) or corresponding aldehydes instead of a nitroso compound.

SYNTHESIS OF SYNTHESIS EXAMPLE (S2)

Into 250 ml of glacial acetic acid, 25.4 g of Synthesis Example (S1) were dispersed and then, 6.9 g of sodium nitrite were gradually added so that the inner temperature was maintained at below 15° C. After the addition, the resulting mixture was stirred further for 2 hours and was added with 250 ml of a saturated sodium chloride solution. The resultant solid deposits were collected by filtration, which were washed with a saturated sodium chloride solution, and were then washed with cold water. The washed deposits were dried and 25.5 g of a nitroso compound were obtained. The obtained nitroso compound was reduced by catalytic hydrogenation with Pd/C in ethanol. The catalyst was removed by filtration, and hydrochloric acid gas was introduced into the filtrate to obtain hydrochloride. The yield was 23.1 g.

Dye Synthesis

Added to 70 ml of methanol were 2.9 g of Compound (S2) synthesized as described above as well as 2.5 g of Compound (S1), and the resulting mixture was stirred at room temperature. Further, a solution prepared by dissolving 4.14 g of potassium carbonate in 15 ml of water was added. Then, a solution prepared by dissolving 5.01 g of ammonium peroxosulfate in 30 ml of water was added dropwise. After the dropwise addition, the resulting mixture was further stirred at room temperature for one hour. Thereafter, a formed dye was extracted employing ethyl acetate. After washing the obtained ethyl acetate solution with a saturated sodium chloride solution, ethyl acetate was evaporated and a dye residue was obtained. The resulting residue was purified by column chromatography employing silica gel, and 1.1 g of the targeted compound were obtained. Further, the absorption of an ethyl acetate solution containing the synthesized compound was measured. The maximum absorption wavelength ($\lambda$max) and molar absorption coefficient ($\epsilon$) of the synthesized compound in ethyl acetate were 511 nm and 36,000, respectively.

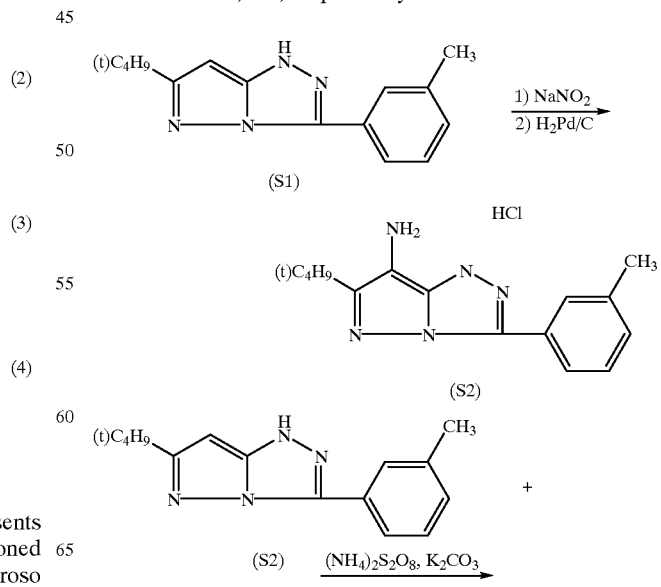

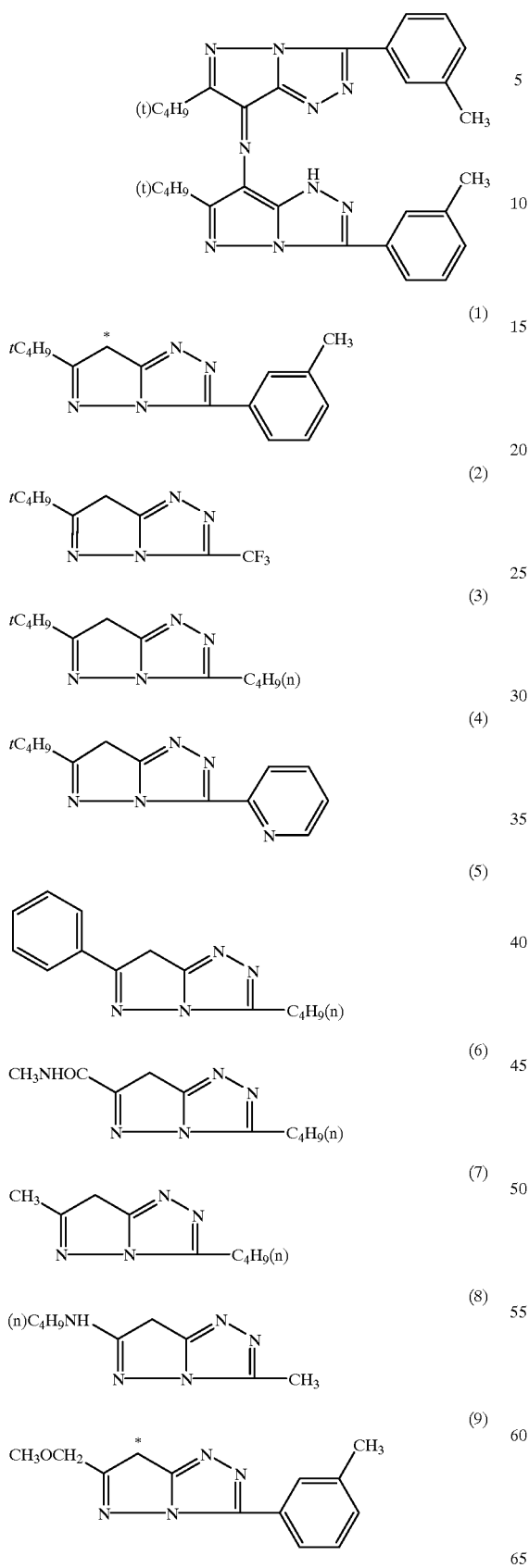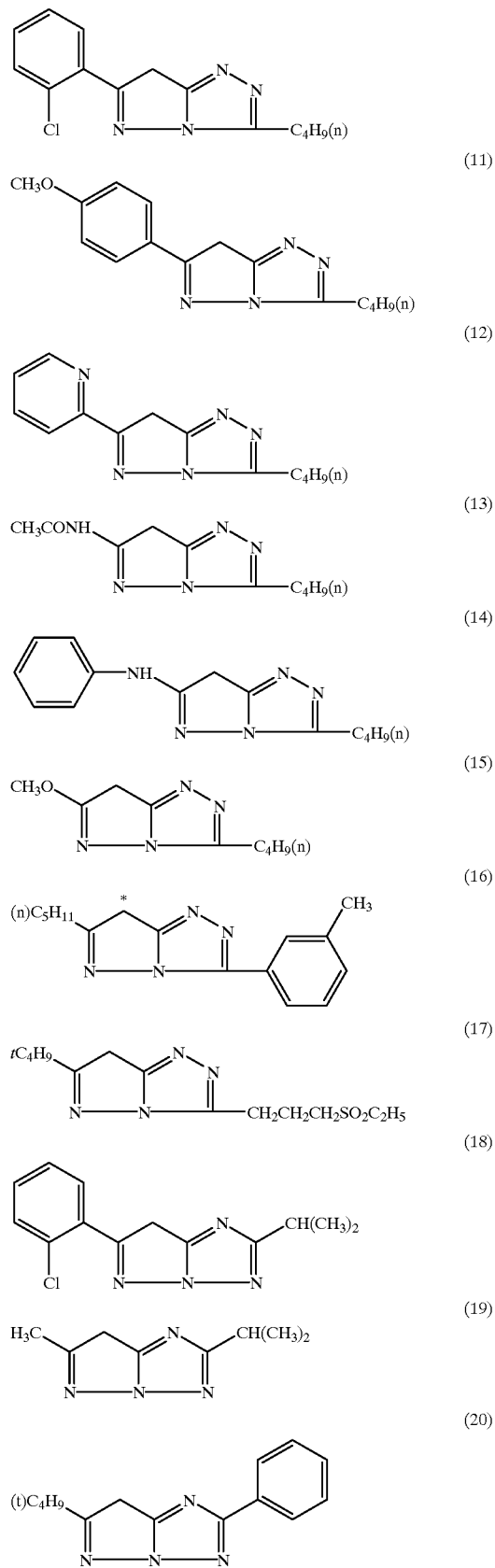

(21) 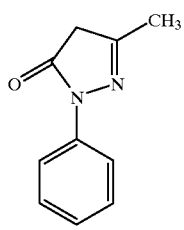
(22) 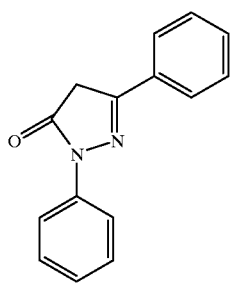
(23) 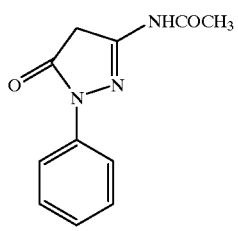
(24) 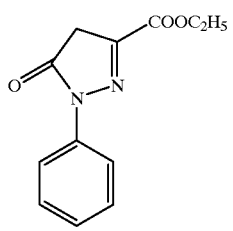
(25) 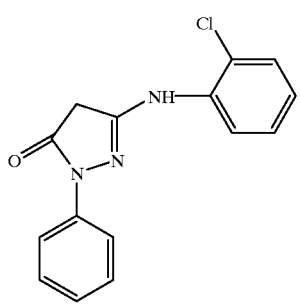
(26) 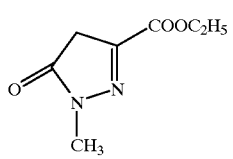
(27) 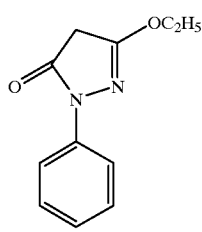
(28) 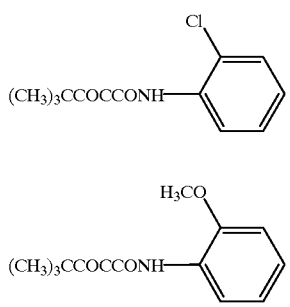
(29) 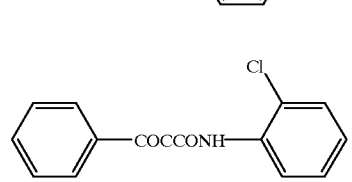
(30) 
(31) 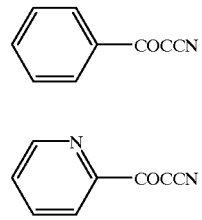
(32) 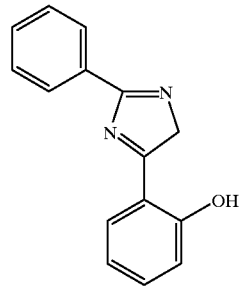
(33)
(34)

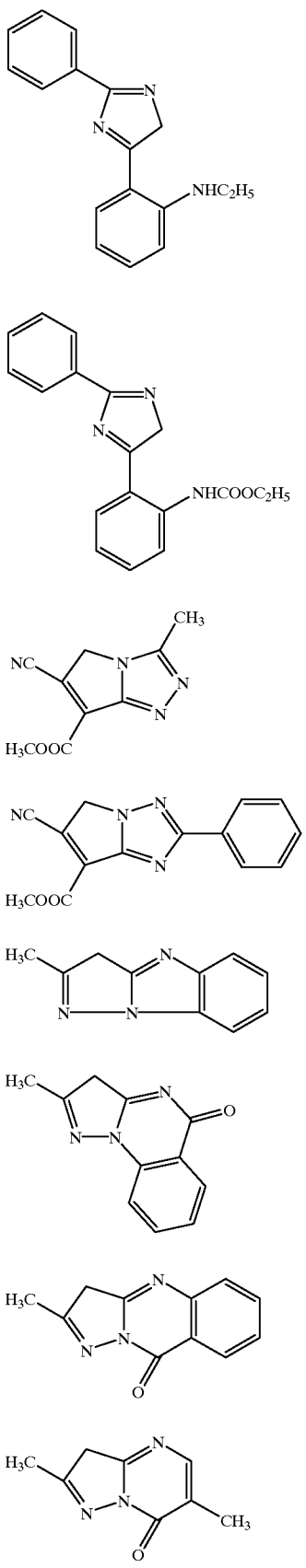
(35)
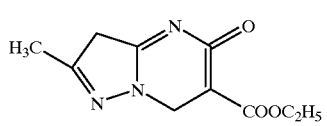
(36)
(37)
(38)
(39)
(40)
(41)
(42)
(43)
(44)
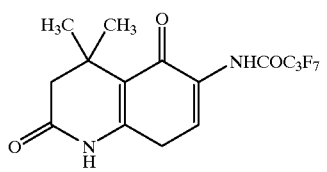
(45)
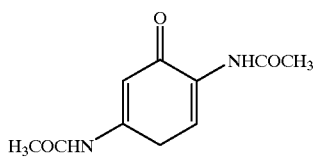
(46)
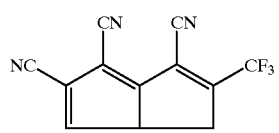
(47)
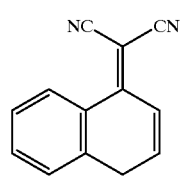
(48)
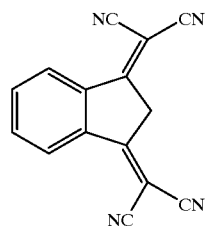
(49)
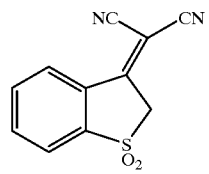
(50)
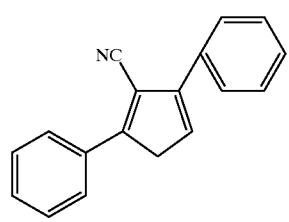

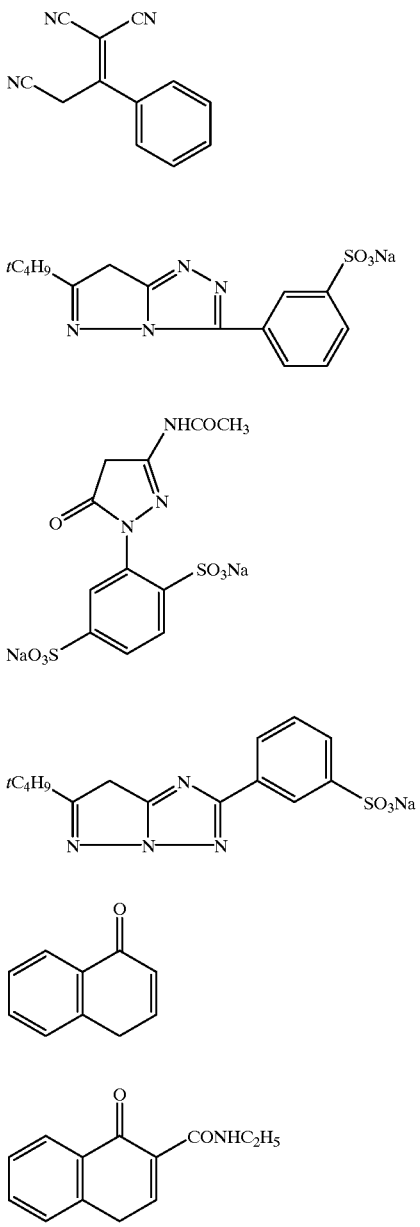

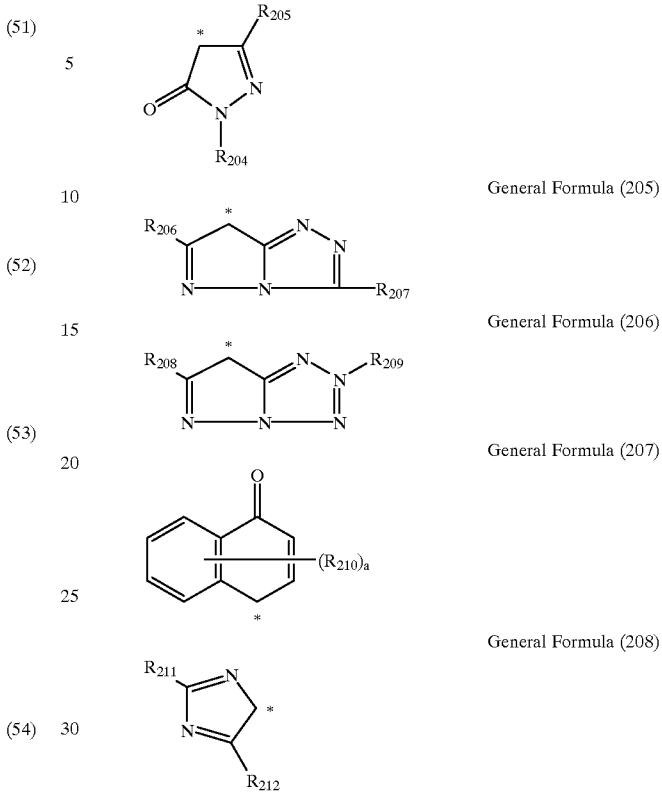

$B_2$ in formulas (2-1) and (2-2) will be described. $B_2$ represents a coupler component. The coupler component as described herein is one which undergoes oxidation coupling with a p-ohenylenediamine series compound. Active methylene compounds, active hydrogen-containing compounds, phenols, naphthols, etc. are listed. As preferred $B_2$, general formulas (203) through (208) described below are listed. in these formulas, a carbon atom marked with "*" shows a coupling position.

General Formula (203)

$R_{203}COC^*R_{202}$

In general formula (203), $R_{202}$ represents a carbamoyl group or a cyano group, and $R_{203}$ represents an alkyl group which may have a substituent, an aryl group which may have a substituent, a heterocycle which may have a substituent.

In (204), $R_{204}$ is the same as $R_{203}$, and $R_{205}$ represents an alkyl group which may have a substituent, an aryl group which may have a substituent, a heterocycle which may have a substituent, an acylamino group, an anilino group, an amino group, an alkyloxy group, a cyano group, a carbamoyl group, an alkoxycarbonyl group, and an aryloxycarbonyl group.

In (205), $R_{206}$ and $R_{207}$ each is the same as $R_{205}$.

In (206), $R_{208}$, and $R_{209}$ each is the same as $R_{205}$.

in general formula (207), $R_{210}$ represents an acylamino group, a sulfonylamino group, a ureido group, a carbamoyl group, an alkoxycarbonylamino group, an aryloxycarbonylamino group, an amino group, and an alkyl group, and "a" represents is 1 to 3. When "a" represents 2, 3, or 4, substituents represented by $R_{210}$ may be the same or different.

In general formula (208), $R_{211}$ and $R_{212}$ each is the same as $R_{203}$.

In terms of minimal secondary absorption, as $B_2$, formulas (205) and (206) are particularly preferred.

$D_2$ in formula (202) represents $—C(R_{201})=$ or a nitrogen atom, and $R_{201}$ represents a hydrogen atom or a substituent. Listed as preferred examples represented by $R_{201}$ are hydrogen atom, an alkyl group, an aryl group, a cyano group, etc., and a hydrogen atom and a cyano group are more preferred. Further, as D, a nitrogen atom is more preferred.

$A_2$ in formulas (2-1) and (2-2) will be described. $A_2$ represents a single ring containing at least one nitrogen atom in the ring, a condensed polycyclic heterocycle formed by condensing at least two rings, or a heterocycle in which at least one nitrogen atom in the ring is a conjugated terminal, and which completes a conjugated chain with —N=$B_2$ or -$D_2$=$B_2$. However, a case is excluded in which the heterocycle is substituted with an amino group. Single heterocycles which contains at least one nitrogen atom in the ring include pyrrole, pyrazole, imidazole, triazole, etc., and condensed polycyclic-type heterocycles formed by the condensation of at least two rings include indole, indazole, benzimidazole, pyrrocoline, imidazopyridine, pyrrolopyrimidine, imidazopyrimidine, etc. Further, condensed polycyclic-type compounds may be saturated or unsaturated compounds.

Further, these heterocycles may have a substitutable substituent except for an amino group.

Regarding the substitution position of the nitrogen atom in —N=$B_2$ and $D_2$ in —$D_2$=$B_2$, when a heterocycle is contained in a condensed polycyclic compound, there are cases in which substitution is carried out onto a ring containing a nitrogen atom which is in the ring and forms a conjugated terminal, and in which substitution is carried out onto a ring other than that. The more preferred case is that substitution is carried out onto a ring containing a nitrogen atom which forms a conjugated terminal.

In formula (2-1) or (2-2), listed as preferred $A_2$ are substituents represented by the general formula described below.

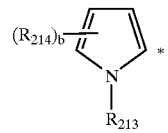

General Formula (209)

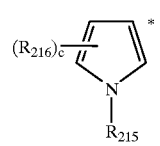

General Formula (210)

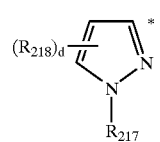

General Formula (211)

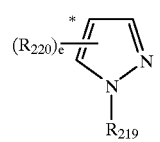

General Formula (212)

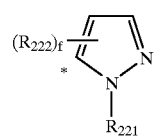

General Formula (213)

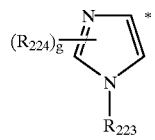

General Formula (214)

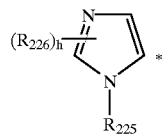

General Formula (215)

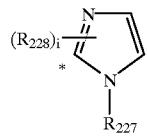

General Formula (216)

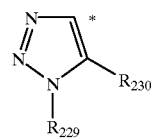

General Formula (217)

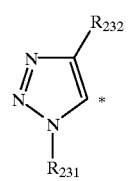

General Formula (218)

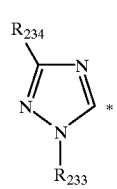

General Formula (219)

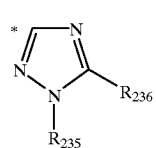

General Formula (220)

A carbon atom marked with "*" is substituted with —N=B or —$D_2$=$B_2$.

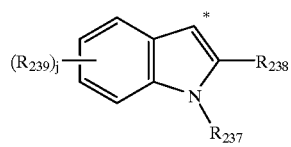

General Formula (221)

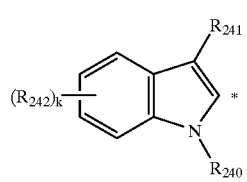

General Formula (222)

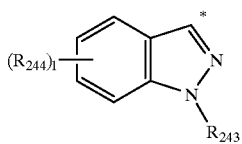
General Formula (223)

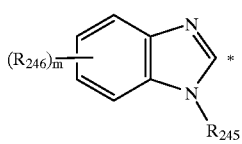
General Formula (224)

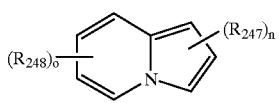
General Formula (225)

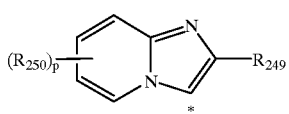
General Formula (226)

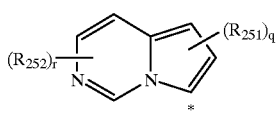
General Formula (227)

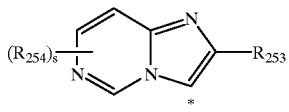
General Formula (228)

$R_{213}$ represents a hydrogen atom, an alkyl group which may have a substituent, an aryl group which may have a substituent, a heterocycle which may have a substituent. Listed as alkyl groups, which may have a substituent, are a methyl group, an ethyl group, a n-propyl group, an i-propyl group, a n-butyl group, a hydroxyethyl group, a methanesulfonylamino group, etc. Listed as aryl group, which may have a substituent, are a phenyl group which may have a substituent, and the like. In this case, listed as the substituents are an alkyl group, an alkoxy group, a halogen atom, an acylamino group, an acyloxy group, a carbamoyl group, etc. $R_{214}$ represents a substitutable substituent except for an amino group. Examples of substitutable substituents include an alkyl group which may have a substituent, a cycloalkyl group, an aryl group which may have a substituent, a heterocyclic group which may have a substituent, an alkoxy group, an alkylthio group, a carbonyl group, a halogen atom, an acylamino group, an acyloxy group, a carbamoyl group, an oxycarbonyl group, a cyano group, a nitro group, sulfonic acid group, a carboxylic acid, etc. "b" represents integer of 0 to 3. When "b" represents 2 or more, substituents represented by $R_{214}$ may be the same or different.

$R_{215}$, is the same as $R_{213}$, R216 is the same as $R_{214}$ and "c" is the same as "b". When "c" is 2 or more, substituents represented by $R_{216}$ may be the same or different.

$R_{217}$ is the same as $R_{213}$, and $R_{218}$ is the same as $R_{214}$. "d" represents an integer of 0 to 2. When "d" is 2, substituents represented by $R_{218}$ may be the same or different.

$R_{219}$ is the same as $R_{213}$, and $R_{220}$ is the same as $R_{214}$. "e" represents an integer of 0 to 2. When "e" is 2, substituents represented by $R_{220}$ may be the same or different.

$R_{221}$ is the same as $R_{213}$, and $R_{222}$ is the same as $R_{214}$. "f" represents an integer of 0 to 2. When "f" is 2, substituents represented by $R_{222}$ may be the same or different.

$R_{223}$ is the same as $R_{213}$, and $R_{224}$ is the same as $R_{214}$. "g" represents an integer of 0 to 2. When "g" is 2, substituents represented by $R_{224}$ may be the same or different.

$R_{225}$ is the same as $R_{213}$, and $R_{226}$ is the same as $R_{214}$. "h" represents an integer of 0 to 2. When "h" is 2, substituents represented by $R_{226}$ may be the same or different.

$R_{227}$ is the same as $R_{213}$, and $R_{228}$ is the same as $R_{214}$. "i" represents an integer of 0 to 2. When "i" is 2, substituents represented by $R_{228}$ may be the same or different.

$R_{229}$ is the same as $R_{213}$, and $R_{230}$ represents a hydrogen a tom or is the same as $R_{214}$.

$R_{231}$ is the same as $R_{213}$, and $R_{232}$ represents a hydrogen atom or is the same as $R_{214}$.

$R_{233}$ is the same as $R_{213}$, and $R_{234}$ represents a hydrogen atom or is the same as $R_{214}$.

$R_{235}$ is the same as $R_{213}$, and $R_{236}$ represents a hydrogen atom or is the same as $R_{214}$.

$R_{237}$ is the same as $R_{213}$, and $R_{238}$ represents a hydrogen atom or is the same as $R_{214}$. $R_{239}$ is the same as $R_{214}$. "j" represents an integer of 0 to 4. When "j" is 2 or more, substituents represented by $R_{239}$ may be the same or different. Further, when "j" is an integer other than 0, $R_{238}$ and $R_{239}$ may be the same or different.

$R_{240}$ is the same as $R_{213}$, and $R_{241}$ represents a hydrogen atom or is the same as $R_{214}$. $R_{242}$ is the same as $R_{214}$. "k" represents an integer of 0 to 4. When "k" is 2 or more, substituents represented by $R_{240}$ may be the same or different. Further, when "k" is an integer other than 0, $R_{241}$, and $R_{242}$ may be the same or different.

$R_{243}$ is the same as $R_{213}$, and $R_{244}$ is the same as $R_{214}$. "l" represents an integer of 0 to 4. When "j" is 2 or more, substituents represented by $R_{244}$ may be the same or different.

$R_{245}$ is the same as $R_{213}$, and $R_{246}$ is the same as $R_{214}$. "m" represents an integer of 0 to 4. When "m" is 2 or more, substituents represented by $R_{246}$ may be the same or different.

$R_{247}$ and $R_{248}$ each is the same as $R_{214}$, and $R_{244}$ is the same as $R_{214}$. "n" represents an integer of 0 to 2 and "o" represents an integer of 0 to 4. When "n" is 2 or more, substituents represented by $R_{247}$ may be t he same or different. When "o" is 2 or more, substituents represented by $R_{448}$ may be the same or different. Further, when "n" and "o" each represents an integer other than 0, $R_{247}$ and $R_{248}$ may be the same or different.

$R_{249}$ represents a hydrogen atom or is the same as $R_{214}$. $R_{250}$ is the same as $R_{214}$. "p" represents an integer of 0 to 4. When "p" is 2 or more, substituents represented by $R_{250}$ may be the same or different. Further, when "p" represents an integer other than 0, $R_{249}$ and $R_{250}$ may be the same or different.

$R_{251}$ and $R_{252}$ each is the same as $R_{214}$. "q" represents an integer of 0 to 2 and "r" represents an integer of 0 to 3. When "q" is 2 or more, substituents represented by $R_{251}$ may be the same or different. When "r" is 2 or more, substituents represented by $R_{252}$ may be the same or different. Further, when "q" and "r" each represents an integer other than 0, $R_{251}$ and $R_{252}$ may be the same or different.

$R_{253}$ represents a hydrogen atom or is the same as $R_{214}$. $R_{254}$ is the same as $R_{214}$. "s" represents an integer of 0 to 3. When "s" is 2 or more, substituents represented by $R_{254}$ may be the same or different. Further, when "s" represents an integer other than 0, $R_{253}$ and $R_{254}$ may be the same or different.

More preferred as $A_2$ in formulas (2-1) and (2-2) are formulas (209), (210), (214), (215), (216), (221), (225), and (226).

Of dyes represented by formula (201), dyes particularly preferred are those represented by the general formula (229) described below.

$$E—N=F_2 \qquad (229)$$

wherein $F_2$ represents a coupler component represented by formulas (205) and (206), and combines with a nitrogen atom at the coupling position of the coupler component. $E_2$ represents a single ring containing at least one nitrogen atom in the ring, a condensed polycyclic heterocycle formed by condensing at least two rings, or a heterocycle in which at least one nitrogen atom in the ring is a conjugated terminal, and which completes a conjugated chain with —N=$F_2$, and a heterocycle in which the nitrogen atom in —N=F2 is substituted on a ring comprising a nitrogen atom which is a conjugated terminal. Single heterocycles which contains at least one nitrogen atom in the ring include pyrrole, pyrazole, imidazole, triazole, etc., and condensed polycyclic-type heterocycles formed by the condensation of at least two rings include indole, indazole, benzimidazole, pyrrocoline, imidazopyridine, pyrrolopyrimidine, imidazopyrimidine, etc. Of these, particularly preferred are pyrrole, imidazole, indole, and pyrrocoline. Further, condensed polycyclic compounds may be saturated or unsaturated. Further, these heterocyles may have a substitutable substituent except for an amino group.

Preferred specific examples as $A_2$ in formulas (201) and (202) are shown below. In a carbon atom marked with "*", —N=B or —$D_2$=$B_2$ is substituted.

A-1
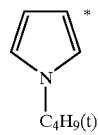

A-2
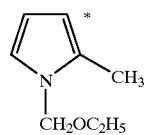

A-3
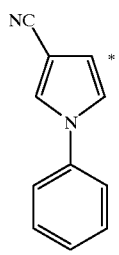

A-4
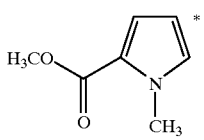

-continued

A-5
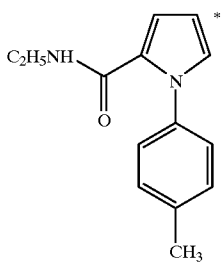

A-6
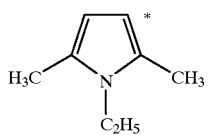

A-7
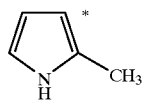

A-8
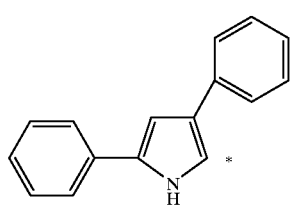

A-9
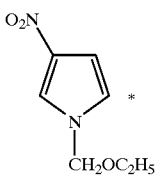

A-10
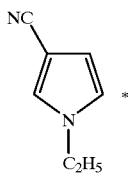

A-11
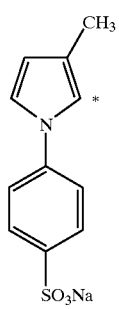

A-12
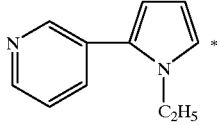

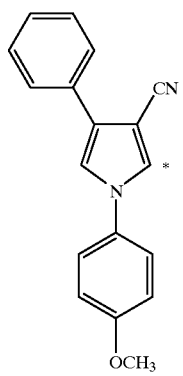
A-13
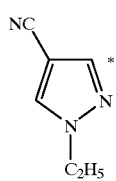
A-14
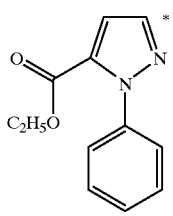
A-15
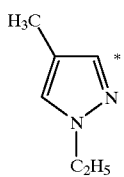
A-16
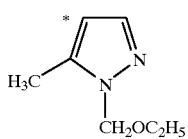
A-17
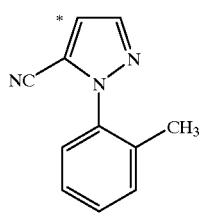
A-18
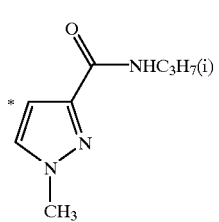
A-19
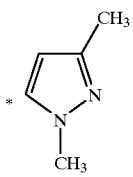
A-20
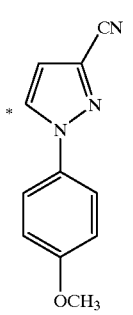
A-21
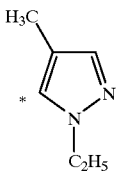
A-22
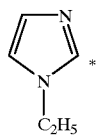
A-23
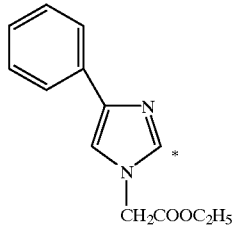
A-24
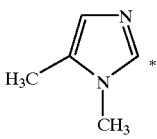
A-25
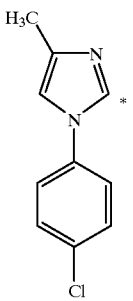
A-26

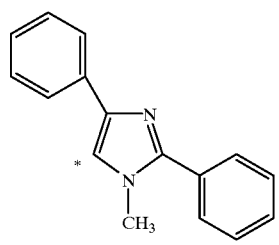 A-27
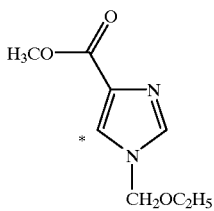 A-28
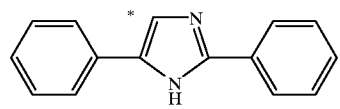 A-29
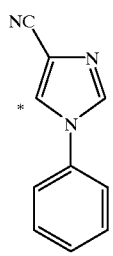 A-30
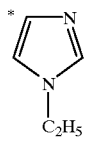 A-31
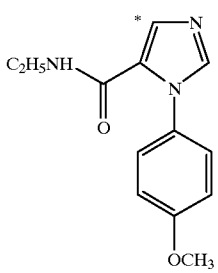 A-32
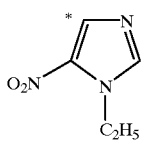 A-33
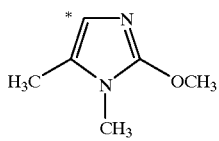 A-34
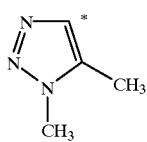 A-35
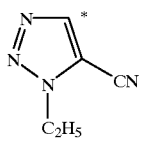 A-36
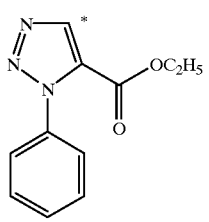 A-37
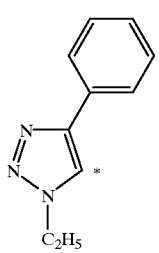 A-38
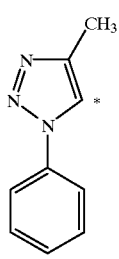 A-39
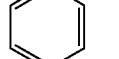 A-40
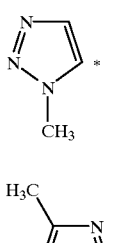 A-41
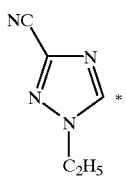 A-42

-continued
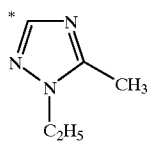
A-43
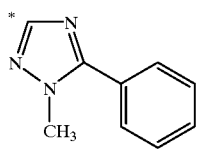
A-44
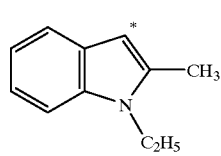
A-45
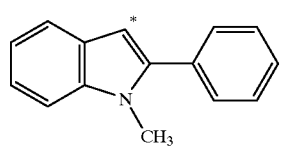
A-46
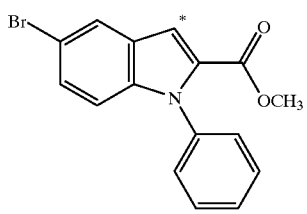
A-47
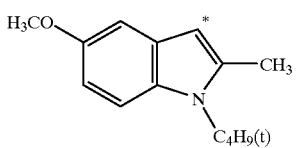
A-48
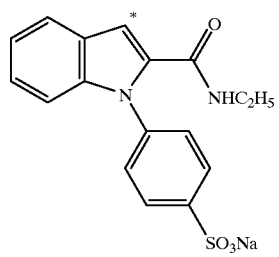
A-49
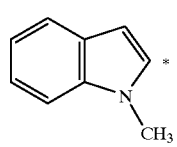
A-50
-continued
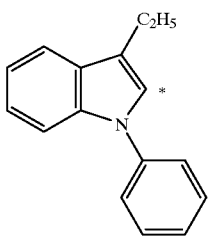
A-51
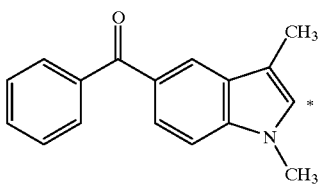
A-52
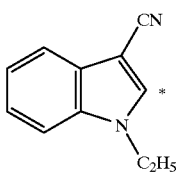
A-53
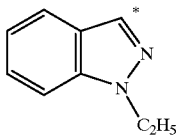
A-54
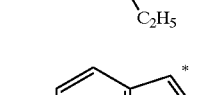
A-55
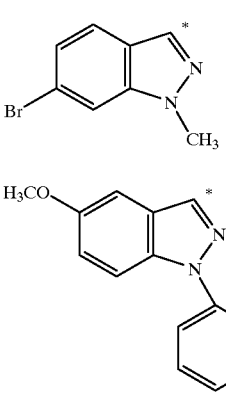
A-56
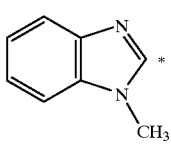
A-57
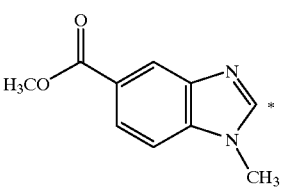
A-58

-continued
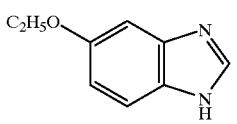  A-59
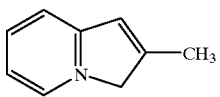  A-60
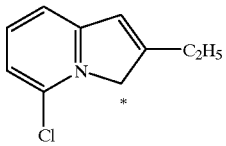  A-61
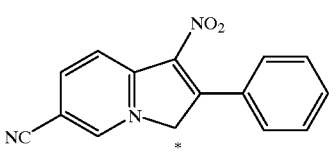  A-62
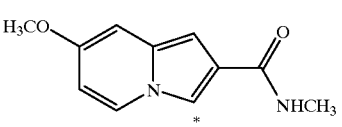  A-63
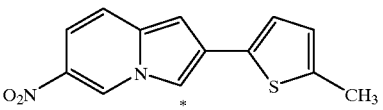  A-64
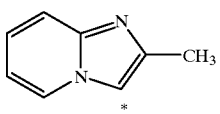  A-65
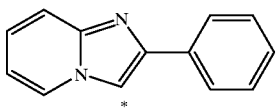  A-66
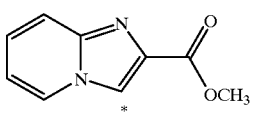  A-67
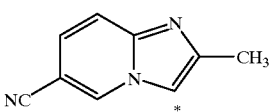  A-68
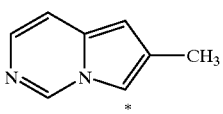  A-69
-continued
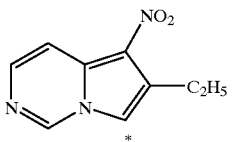  A-70
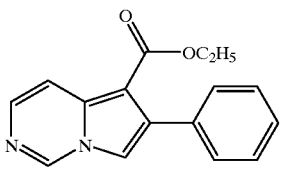  A-71
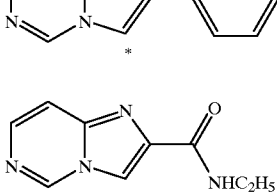  A-72
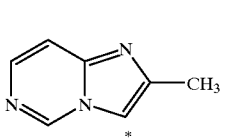  A-73
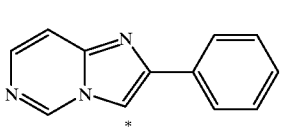  A-74
Preferred specific examples as $B_2$ in formulas (201) and (202) are shown below. In a carbon atom marked with "*", —A2—$D_2$= or $A_2$—N= is substituted.
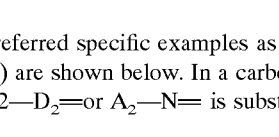  B-1
  B-2
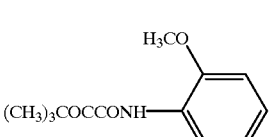  B-3
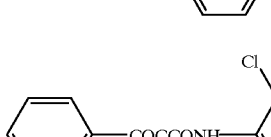  B-4
  B-5

-continued
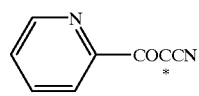
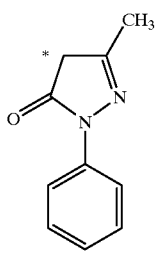
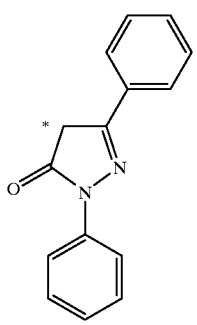
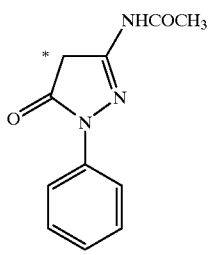
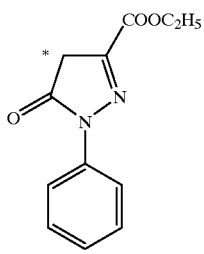
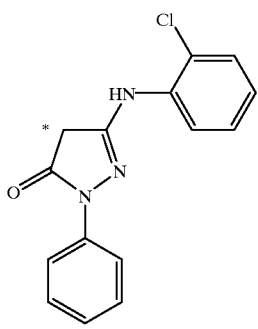
-continued
B-6
B-7
B-8
B-9
B-10
B-11
B-12
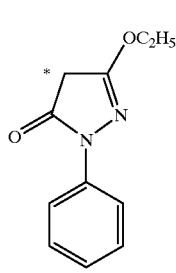
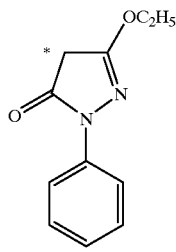
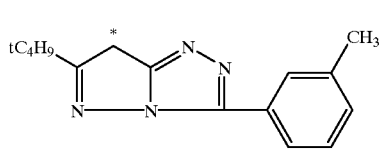
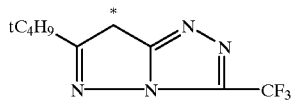
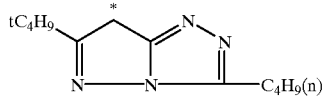
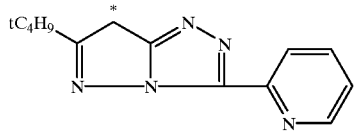
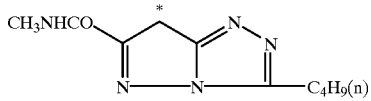
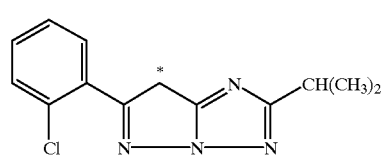
B-13
B-14
B-15
B-16
B-17
B-18
B-19
B-20
B-21
B-22

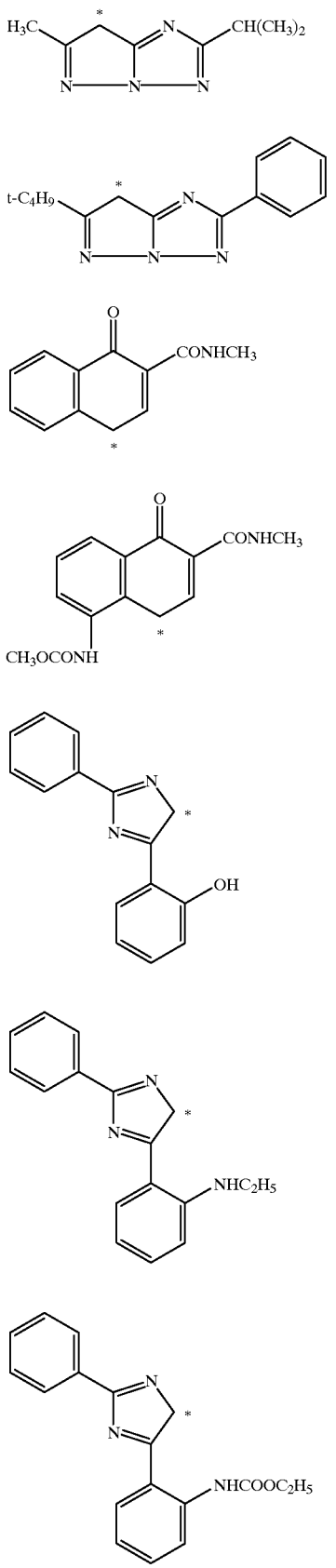
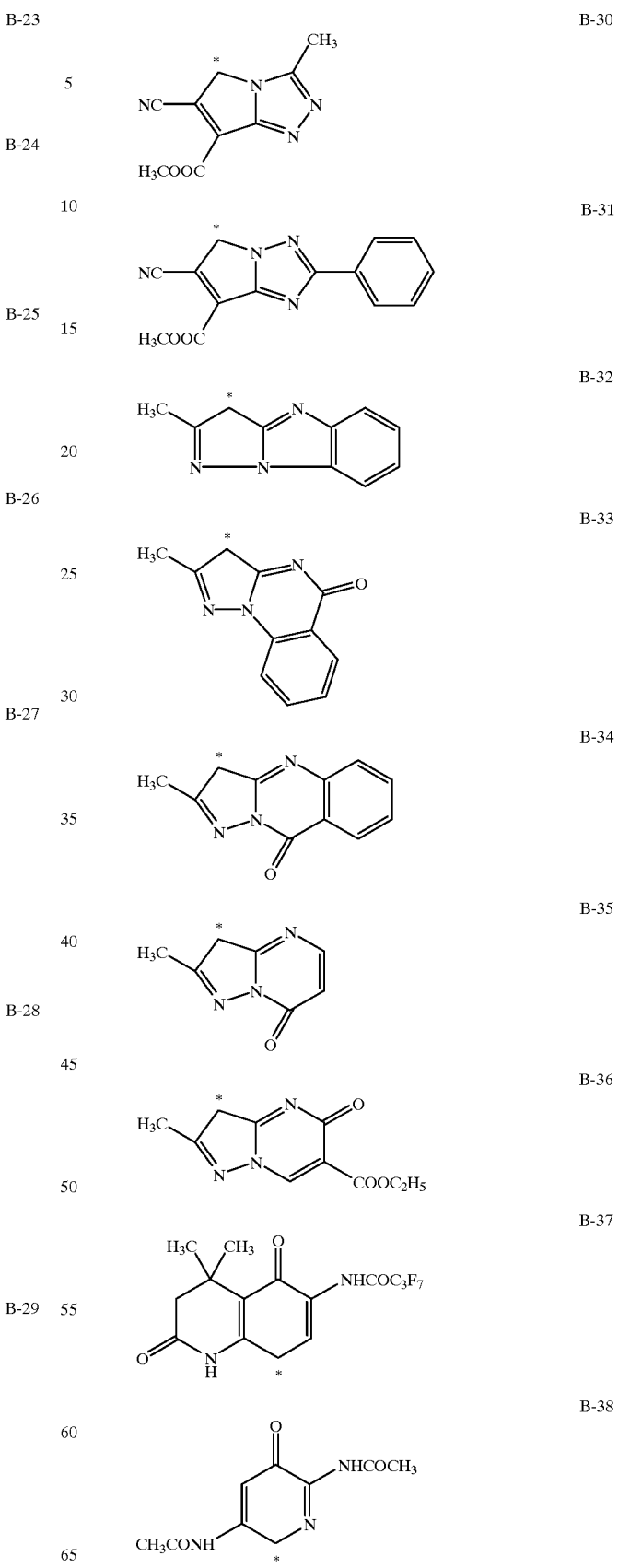

-continued

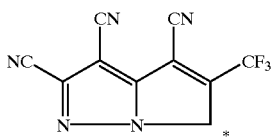
B-39

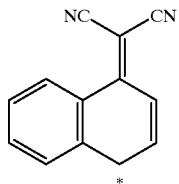
B-40

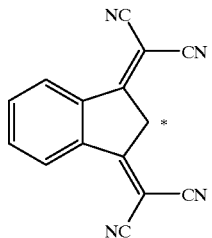
B-41

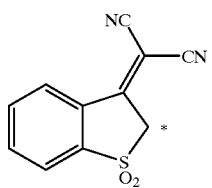
B-42

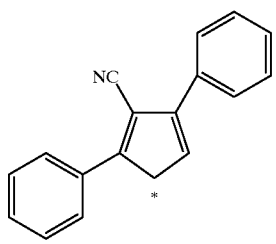
B-43

B-44

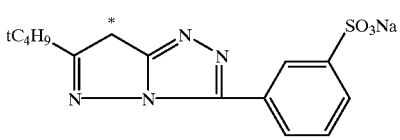
B-45

-continued

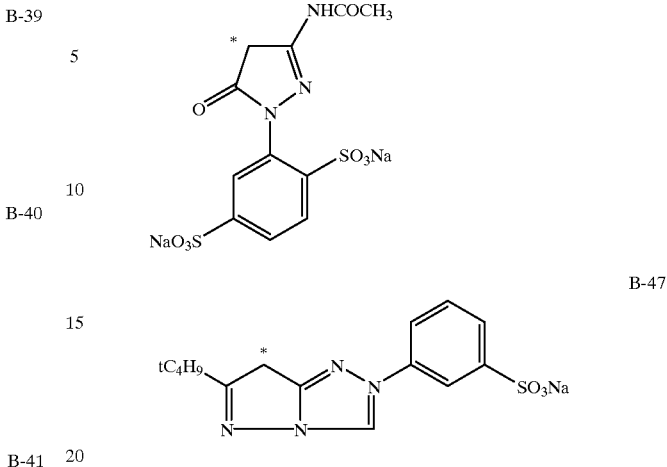
B-46

B-47

Specific examples of dyes represented by formulas (201) and (202) are shown in Tables 2-1, 2-2, 2-3, and 2-5 described below.

Dyes represented by either formulas (229) or formula (230) are also preferably employed.

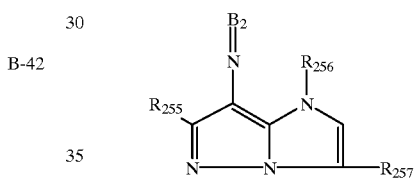
General Formula (229)

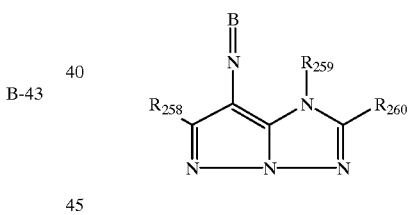
General Formula (230)

In the formulas (229) and (230), $R_{255}$, $R_{257}$, $R_{258}$ and $R_{260}$ each represents an alkyl group which may have a substituent, an aryl group which may have a substituent, a heterocycle which may have a substituent, an acylamino group, an alkyloxy group, an aryloxy group, a carbamoyl group, a cyano group, an alkoxycarbonyl group, an aryloxycarbonyl group, and $R_{256}$ and $R_{259}$ each represents an alkyl group which may have a substituent.

$B_2$ represents a coupler component.

$R_{255}$, $R_{257}$, $R_{258}$, and $R_{260}$ each represents an alkyl group (for example, a methyl group, an ethyl group, a n-butyl group, a n-decyl group, an i-propyl group, a t-butyl group, a butylsulfonylethyl group, a trifluoromethyl group, a phenoxymethyl group, an acetylaminomethyl group, etc.) which may have a substituent, an aryl group (for example, a phenyl group, a m-tolyl group, an o-chlorophenyl group, a p-methoxyphenyl group, a m-cyanophenyl group, a m-sulfophenyl group, etc.) which may have a substituent, a heterocycle (for example, a pyridyl group, a thienyl group, a furyl group, an oxazolyl group, an imidazolyl group, etc.) which may have a substituent, an acylamino group (for example, an acetylamino group, a benzoylamino group, etc.), an alkyloxy group (for example, a methoxy group, an ethoxy group, an benzyloxy group), an aryloxy group (for example, a phenoxy group, a p-methylphenoxy group, etc.), a carbamoyl group (for example, a carbamoyl group, an N-methylcarbamoyl group, etc.), a cyano group, an alkoxycarbonyl group (for example, a methoxycarbonyl group, an ethoxycarbonyl group, etc.), an aryloxycarbonyl group (for example, a phenoxycarbonyl group, a p-methoxyphenoxycarbonyl group, etc.), and $R_{56}$ and $R_{59}$ each represents an alkyl group (for example, a methyl group, an ethyl group, a n-propyl group, a n-butyl group, a n-octyl group, an i-butyl group, a 2-methoxyethyl group, a 2-hydroxyethyl group, a 2-methanesulfonamidoethyl group, a benzyl group, etc.) which may have a substituent.

$B_2$ represents a coupler component. Those which are most preferred as the coupler component are imidazoles represented by general formula (208).

Of compounds represented by formula (229), most preferred compounds are those represented by formula (231). Furthermore, of compounds represented by formula (230), most preferred compounds are those represented by formula (232).

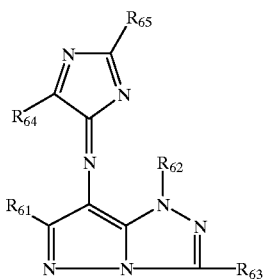

Formula (231)

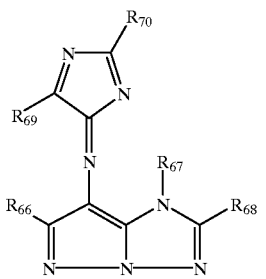

Formula (232)

In formulas (231) and (232), $R_{64}$ and $R_{69}$ each represents a hydrogen atom, an alkyl group which may have a substituent, an aryl group which may have a substituent, a heterocycle which may have a substituent, an acylamino group, an alkyloxy group. $R_{65}$ and $R_{70}$ each represents a hydrogen atom, an alkyl group which may have a substituent, an aryl group which may have a substituent, a heterocycle which may have a substituent, an acylamino group, an alkyloxy group, and an aryloxy group. $R_{61}$, $R_{63}$, $R_{66}$, and $R_{68}$ each represents an alkyl group which may have a substituent, an aryl group which may have a substituent, a heterocycle which may have a substituent, an acylamino group, an alkyloxy group, an aryloxy group, a carbamoyl group, a cyano group, an alkoxycarbonyl group, an aryloxycarbonyl group, and $R_{62}$ and $R_{67}$ each represents an alkyl group which may have a substituent.

$R_{64}$ and $R_{69}$ each represents an alkyl group (for example, a methyl group, an ethyl group, an i-propyl group, a t-butyl group, etc.) which may have a substituent, an aryl group (for example, a phenyl group, a naphthyl group, p-nitrophenyl group, a p-cyanophenyl group, a p-chlorophenyl group, a p-methoxyphenyl group, a p-dimethylaminophenyl group, a p-acetylaminophenyl group, an o-chlorophenyl group, an o-hydroxyphenyl group, an o-hydroxy-m-chlorophenyl group, etc.) which may have a substituent, a heterocycle (for example, a pyridyl group, a thienyl group, a furyl group, an oxazolyl group, an imidazolyl group, etc.) which may have a substituent, an acylamino group (for example, an acetylamino group, a benzoylamino group, etc.), an alkyloxy group (for example, a methoxy group, an ethoxy group, etc.), an aryloxy group (for example, a phenoxy group, a p-chlorophenoxy group, etc.). $R_{65}$ and $R_{70}$ each represents a hydrogen atom, an alkyl group (for example, a methyl group, an ethyl group, a n-butyl group, a n-decyl group, an i-propyl group, a t-butyl group, etc.) which may have a substituent, an aryl group (for example, a phenyl group, a naphthyl group, a p-nitrophenyl group, p-cyanophenyl group, a p-chlorophenyl group, a p-methoxyphenyl group, a p-dimethylaminophenyl group, a p-acetylaminiophenyl group, an o-chlorophenyl group, an o-hydroxyphenyl group, an o-hydroxy-m-chlorophenyl group, etc.) which may have a substituent, a heterocycle (for example, a pyridyl group, a thienyl group, a furyl group, an oxazolyl group, an imidazolyl group, etc.) which may have a substituent, an acylamino group (for example, an acetylamino group, a benzoylamino group, etc.), an alkyloxy group (for example, a methoxy group, an ethoxy group, etc.), an aryloxy group (for example, a phenoxy group, a p-chlorophenoxy group, etc.).

$R_{61}$, $R_{63}$, $R_{66}$, and $R_{68}$ each represents an alkyl group which may have a substituent, an aryl group which may have a substituent, a heterocycle which may have a substituent, an acylamino group, an alkyloxy group, an aryloxy group, a carbamoyl group, a cyano group, an alkoxycarbonyl group, an aryloxycarbonyl group. Description on $R_{61}$, $R_{63}$, $R_{66}$, and $R_{68}$ is the same as $R_{55}$, $R_{57}$, $R_{58}$, and $R_{60}$ in general formulas 29 and 30.

$R_{62}$ and $R_{67}$ each represents an alkyl group (for example, (for example, a methyl group, an ethyl group, a n-propyl group, a n-butyl group, a n-octyl group, an i-butyl group, a 2-methoxyethyl group, a 2-hydroxyethyl group, a 2-methanesulfonamidoethyl group, a benzyl group, etc.) which may have a substituent.

These compounds will be exemplified.

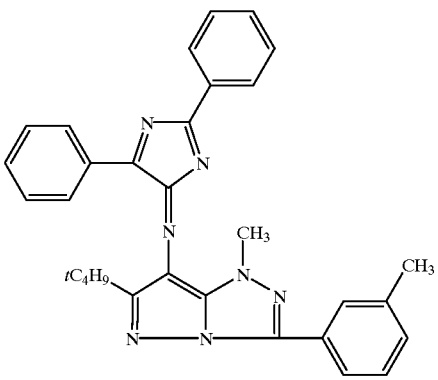

2-1

2-2
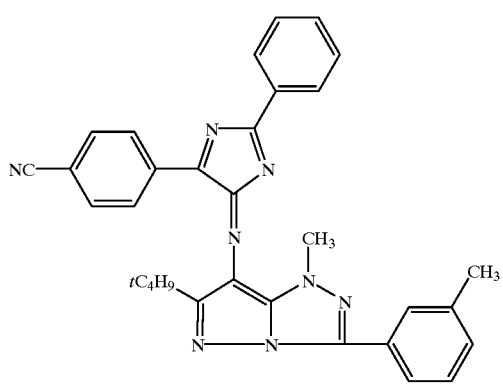
2-3
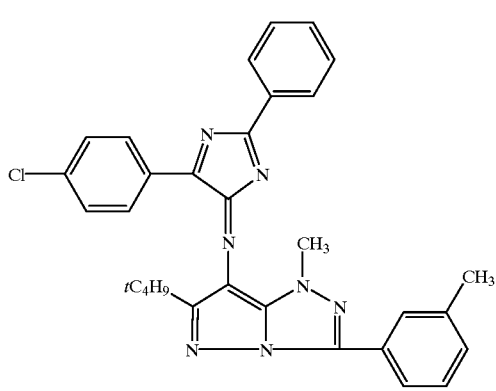
2-4
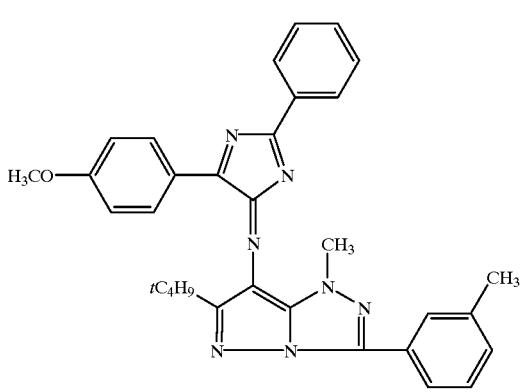
2-5
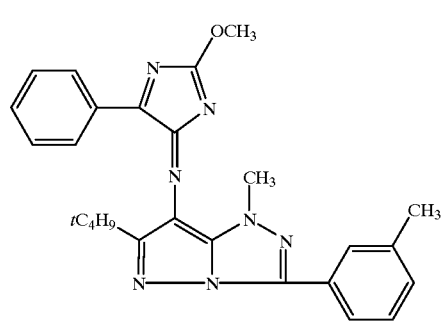
2-6
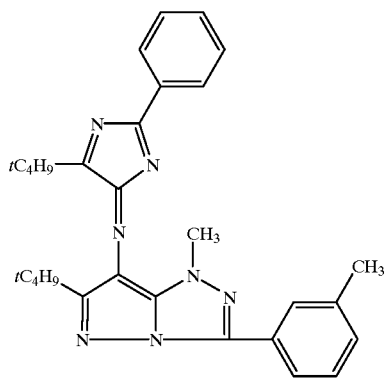
2-7
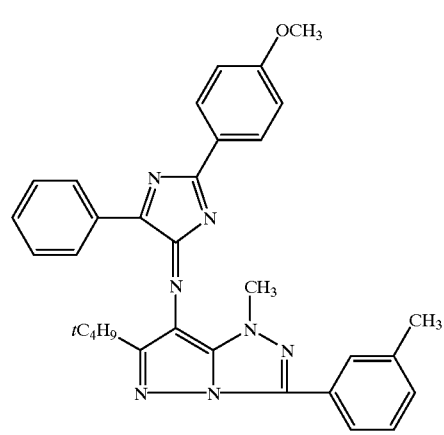
2-8
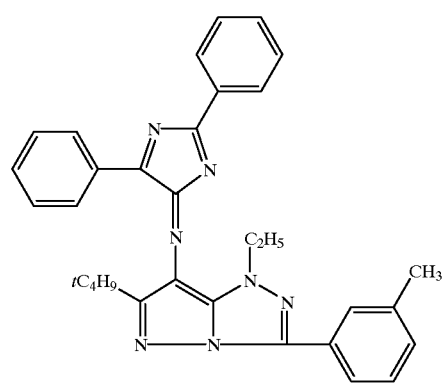
2-9
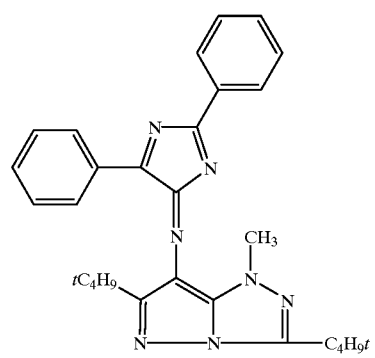

2-10 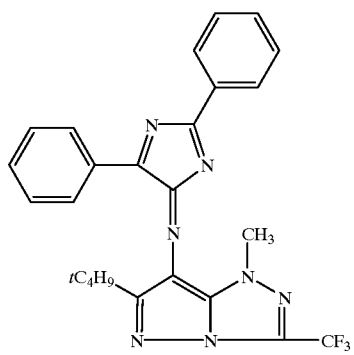
2-14 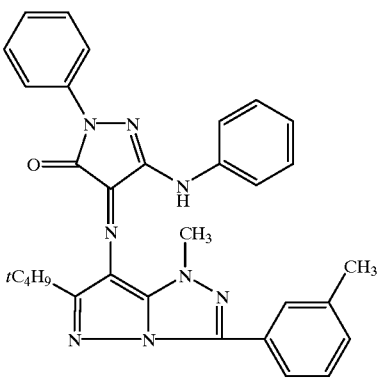
2-11 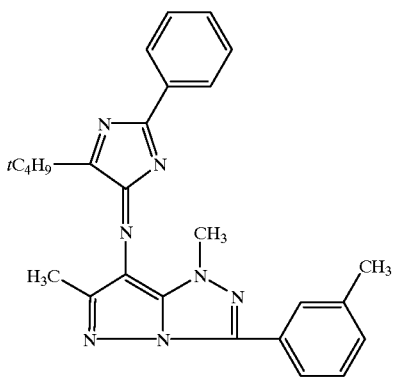
2-15 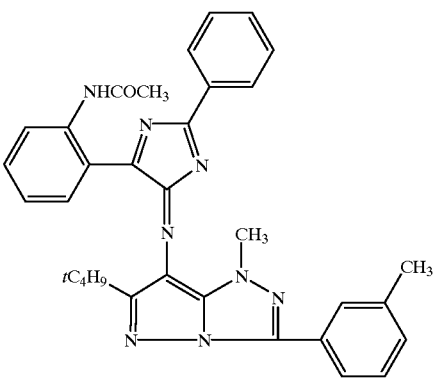
2-12 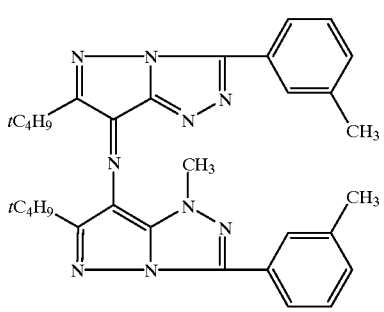
2-16 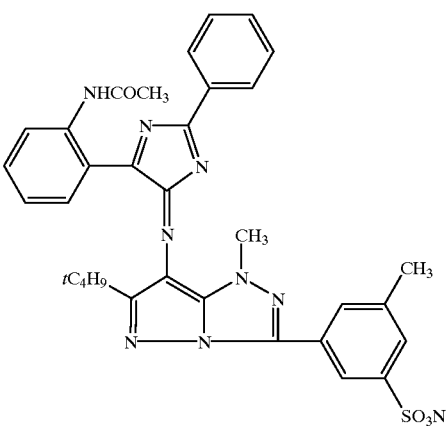
2-13 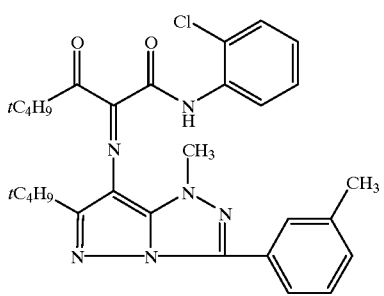
2-17 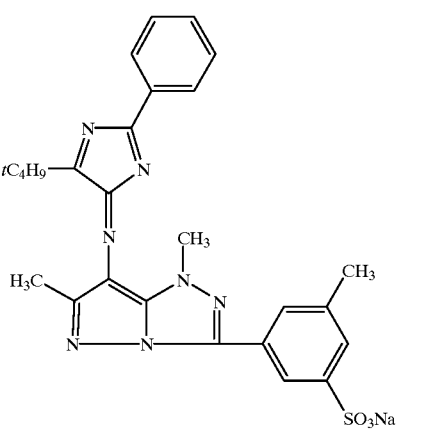

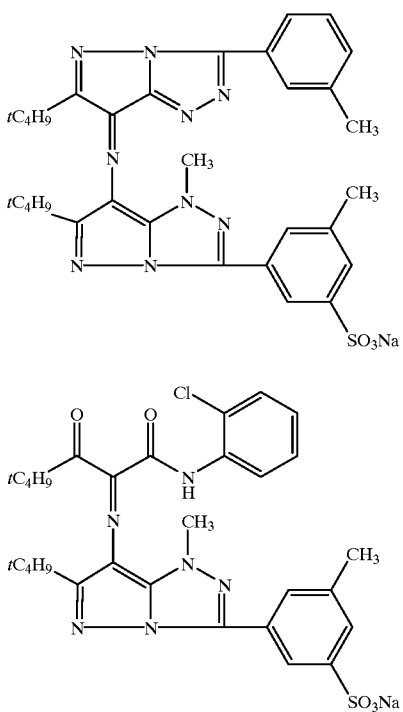

2-18

2-19

Dyes represented by general formula (20) of the present invention can be synthesized by a method employing schemes shown below.

In schemes (1) and (3), derivatives of $A_2$ and $B_2$ undergo oxidation coupling in the presence of bases. Herein, L represents a coupling-off group (for example, a chlorine atom, a bromine atom, etc.) or a hydrogen atom. In schemes (2) and (4), the derivatives of $A_2$ and $B_2$ undergo dehydration condensation in the presence of an acid catalyst.

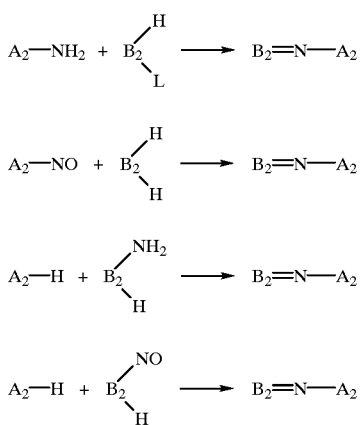

Of dyes represented by formula (202), these, in which $D_2$ is a nitrogen atom, can be synthesized by the same method as above. Further, of dyes represented by formulas (202), when $D_2$ is $CR_{303}$, are synthesized in the same manner as above, except that during reaction (2), nitroso is replaced with corresponding aldehyde, etc.

Synthesis Example (21)

Added to 40 ml of methanol were 1.40 g of compound S21 (synthesized by a method described in BULLETIN OF THE CHEMICAL SOCIETY OF JAPAN, 40, page 2936, (1967)) and 2.54 g of compound S22, and were stirred at room temperature. Further, a solution prepared by dissolving 4.14 g of sodium carbonate in 15 ml of water was added. A solution prepared by dissolving 5.01 g of ammonium peroxosulfate in 30 ml of water was then added dropwise. After dropwise addition, the resultant mixture was further stirred for one hour at room temperature and a formed dye was extracted employing ethyl acetate. After washing the resulting ethyl acetate solution with a saturated sodium chloride solution, ethyl acetate was removed by evaporation to obtain a dye residue. The resulting dye residue was purified employing column chromatography and 1.22 g of the targeted compound was obtained. The synthesized compound was identified as the target compound employing NMR and mass spectra.

The maximum absorption wavelength (λmax) and molar absorption coefficient (ε) of the synthesized compound in ethyl acetate were 551 nm and 51,000, respectively.

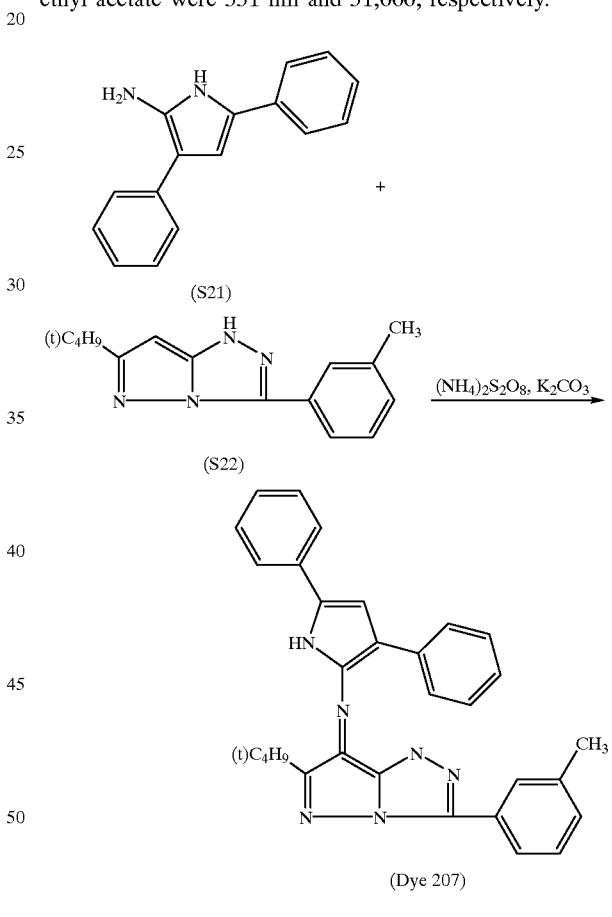

Synthesis Example (22)

100 ml of toluene containing 2.2 g of compound (S23), 2.8 g of compound (S22), and 0.3 g of p-toluenesulfonic acid was refluxed with Dean-Stark tube for 60 hours. The resulting solution was washed and p-toluenesulfonic acid was removed. Further, after purifying the resulting product employing chromatography, it was crystallized employing acetonitrile. The yield was 1.5 g.

The maximum absorption wavelength (λmax) and molar absorption coefficient (ε) of the synthesized compound in ethyl acetate were 542 nm and 32,000, respectively.

63

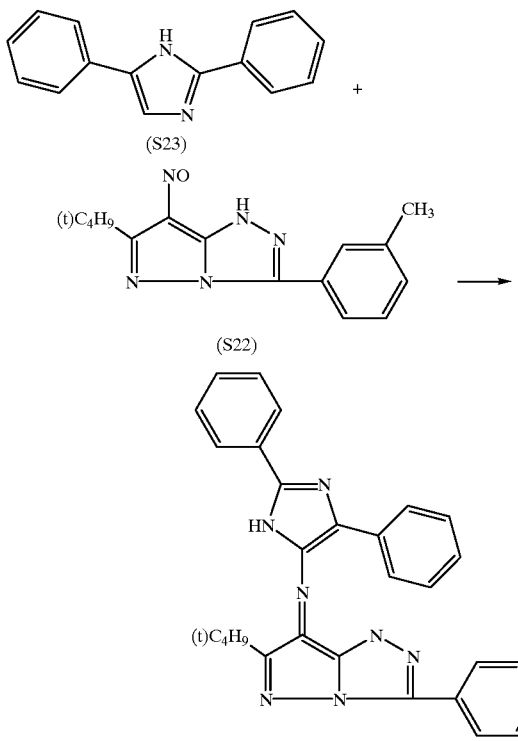

Synthesis Example (23)

Added to 70 ml of toluene were 7.00 g of compound S24 (synthesized by modifying N-methyl-2-phenylindole to a nitroso compound employing sodium nitrite), 6.80 g of compound S2, and 0.35 g of p-toluenesulfonic acid monohydrate, and the resulting mixture was thermally refluxed for 4 hours. After extracting a formed dye employing ethyl acetate, the dye was washed with water and a saturated sodium chloride solution, and ethyl acetate was then evaporated to obtain a dye residue. The resulting dye residue was recrystallized employing hexane-ethyl acetate and 10.60 g of the targeted compound were obtained.

The synthesized compound was identified as the targeted compound employing NMR and mass spectra.

The maximum absorption wavelength (λmax) and molar absorption coefficient (ε) of the synthesized compound in ethyl acetate were 533 nm and 278,000, respectively.

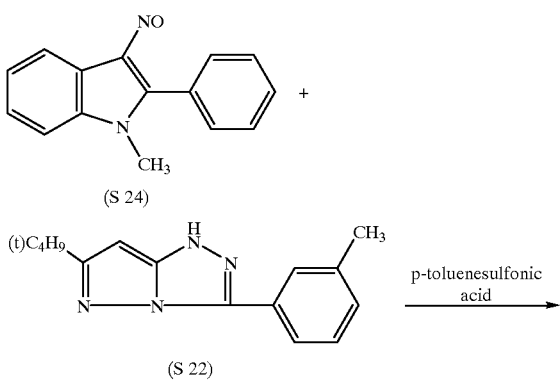

64

-continued

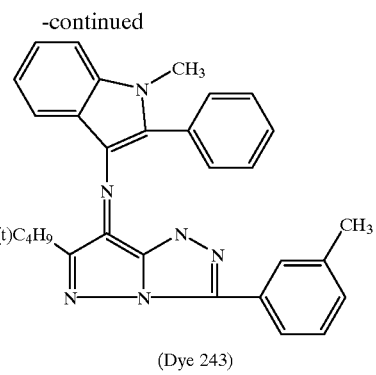

(Dye 243)

Synthesis Example (24)

Added to 20 ml of toluene were 0.70 g of compound S25 (synthesized by employing a method described in Ber., 60, page 1607 (1927)), 1.10 g of compound S26 (synthesized by modifying compound S22 to a corresponding nitroso compound employing sodium nitrite), and 0.10 g of p-toluenesulfonic acid monohydrate, and the resulting mixture was thermally refluxed for one hour. After extracting a formed dye employing ethyl acetate, the dye was washed with water and a saturated sodium chloride solution, and ethyl acetate was then removed by evaporation to obtain a dye residue. The resulting dye residue was recrystallized employing hexane-ethyl acetate and 0.50 g of the targeted compound was obtained. The synthesized compound was identified as the targeted compound employing NMR and mass spectra.

The spectral absorption spectra of the resulting dye were measured and the following results were obtained: λmax was 596 nm and ε was 450,000 (in ethyl acetate).

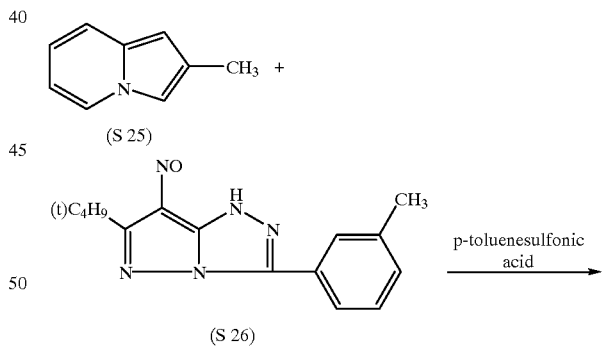

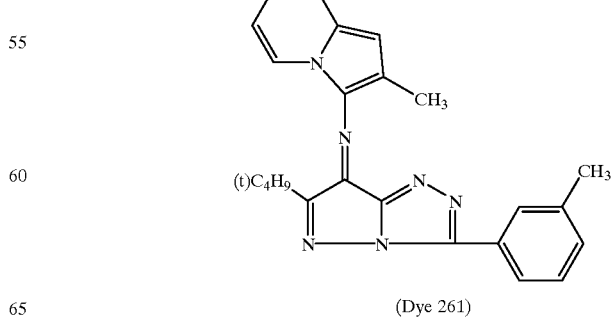

(Dye 261)

Synthesis of Dye 2-1

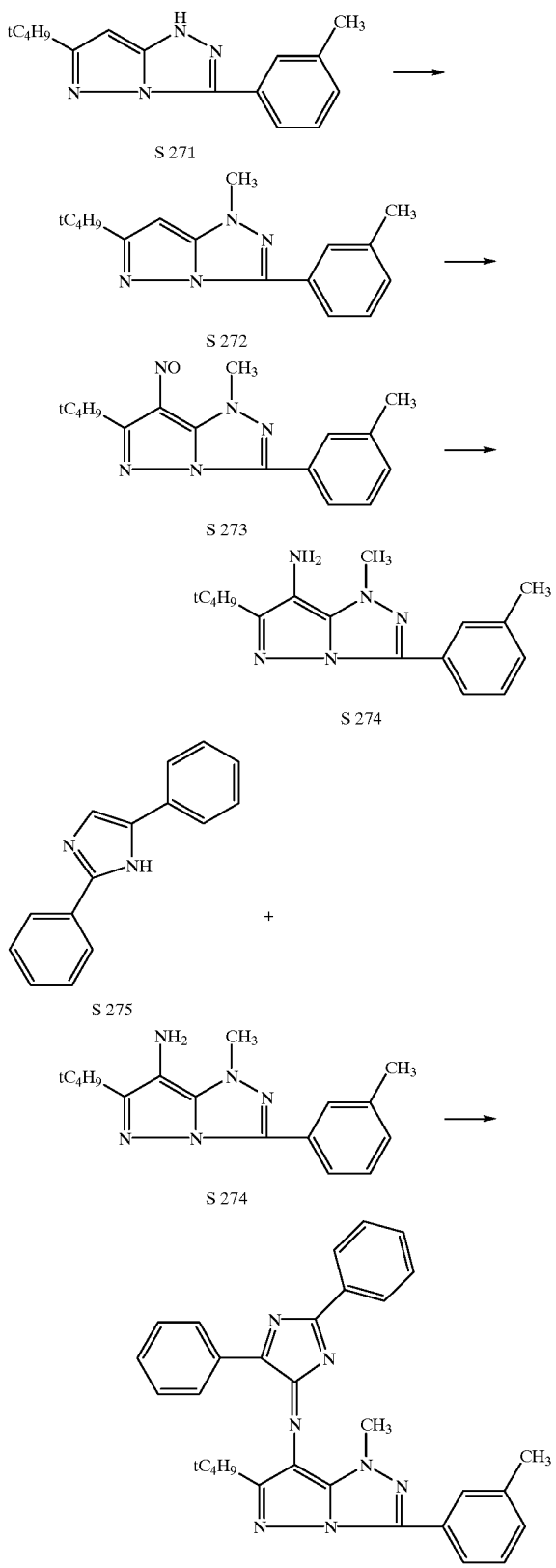

In 400 ml of N,N-dimethylformamide, 50 g of compound S271 and 39 g of potassium carbonate were mixed while stirring, and 36.7 g of methyl iodide were added dropwise to the resulting mixture. After dropwise addition, the resulting mixture was stirred for 15 hours. Into 2 liters of water, the resulting mixture was poured and a deposit was collected by filtration. The deposit was sufficiently washed and dried under reduced pressure to obtain 45 g of compound S272.

Dissolved in 400 ml of glacial acetic acid were 40 g of S272. An aqueous solution containing 10.2 g of sodium nitrite was added dropwise to the resulting mixture which was cooled with ice while stirring. After dropwise addition, it was further stirred for 3 hours. To the resulting mixture, 400 ml of water were added and a deposit was obtained employing filtration. The deposit was sufficiently washed and dried under reduced pressure to obtain 40 g of S273.

Dissolved in 400 ml of THF were 40 g of compound S273 and 10 g of Pd/C were added. The resulting mixture underwent contact hydrogenation at normal pressure. After the nearly theoretical amount of hydrogen was allowed to react, the reaction was further carried out for 2 hours. The catalyst was removed from the reaction mixture employing filtration, and a filtrate was concentrate-dried under reduced pressure to obtain 37.5 g of compound 274.

Dissolved in 100 ml of ethyl acetate were 2.8 g of compound 274 and 2.2 g of compound S275, and 100 ml of 5% aqueous sodium carbonate solution were added and stirred vigorously. To the resulting mixture, an aqueous solution containing 4.8 g of ammonium peroxodisulfate was added dropwise. After dropwise addition, the resulting mixture was further stirred for 24 hours. The reaction mixture was placed in a separation funnel and an aqueous layer was removed. An ethyl acetate layer was then washed with a saturated sodium chloride solution. After drying the organic layer with magnesium sulfate anhydride, the solvent was removed by evaporation to obtain a residue. The resulting residue was purified employing silica chromatography (ethyl acetate/hexane=1/3), and was then crystallized employing acetonitrile to obtain 2.4 g of dye 2-1.

The melting point was between 188 and 191° C.
The λmax in ethyl acetate was 573 nm and ε was 38,000.

Dye (2-2) was prepared by employing the same synthesis method as dye (2-1).
The melting point was between 224 and 225° C.
The λmax in ethyl acetate was 591 nm and ε was 41,000.

Dye (2-3) was prepared by employing the same synthesis method as dye (2-1).
The melting point was between 195 and 197° C.
The λmax in ethyl acetate was 581 nm and ε was 41,000.

Dye (2-4) was prepared by employing the same synthesis method as dye (2-1).
The melting point was between 226 and 228° C.
The λmax in ethyl acetate was 580 nm and ε was 28,000.

Dye (2-5) was prepared by employing the same synthesis method as dye (2-1).
The melting point was 140° C. (Decomposed).
The λmax in ethyl acetate was 537 nm and ε was 25,000.

Dye (2-6) was prepared by employing the same synthesis method as dye (2-1).
The melting point was between 191 and 192° C.
The λmax in ethyl acetate was 547 nm and ε was 36,000.

Dye (2-7) was prepared by employing the same synthesis method as dye (2-1).
The melting point was between 145 and 148° C.
The λmax in ethyl acetate was 581 nm and ε was 38,000.

Dye (2-8) was prepared by employing the same synthesis method as dye (2-1).
The melting point was between 123 and 126° C.
The λmax in ethyl acetate was 577 nm and ε was 34,000.

Dye (2-9) was prepared by employing the same synthesis method as dye (2-1).

The melting point was between 140 and 142° C.

The λmax in ethyl acetate was 566 nm and ε was 34,000.

Dye (2-11) was prepared by employing the same synthesis method as dye (2-1).

The melting point was between 153 and 154° C.

The λmax in ethyl acetate was 513 nm and ε was 42,000.

Dye (2-12) was prepared by employing the same synthesis method as dye (2-1). The λmax in ethyl acetate was 552 nm and ε was 29,000.

Dye (2-15) was prepared by employing the same synthesis method as dye (2-1).

The melting point was between 235 and 237° C.

The λmax in ethyl acetate was 599 nm and ε was 43,000.

Next, formula (2-1) will be described.

$Y_2$ represents a coupler component. The coupler component as described herein denotes a coupler component which undergoes oxidation coupling with a p-phenylenediamine series compound, and includes active methylene compounds, active hydrogen-containing compounds, naphthols, etc. Listed as preferred $Y_2$ are formulas (2-II) through (2-VI).

In these formulas, a carbon atom marked with "*" shows an coupling position.

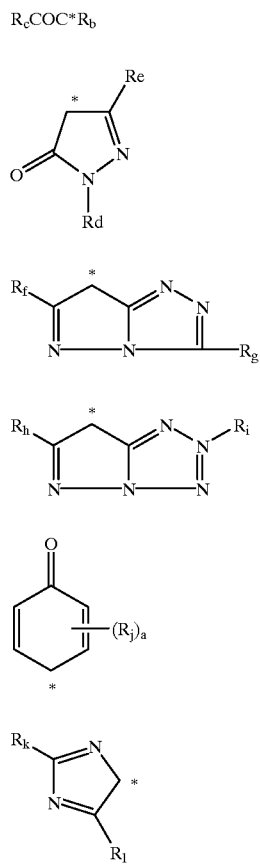

General Formula (2-II)

$R_cCOC*R_b$

General Formula (2-III)

General Formula (2-IV)

General Formula (2-V)

General Formula (2-VI)

General Formula (2-VII)

In formula (2-II), $R_b$ represents a carbamoyl group or a cyano group, and $R_c$ represents an alkyl group which may have a substituent, an aryl group which may have a substituent, a heterocycle which may have a substituent.

In formula (2-III), $R_d$ is the same as $R_c$, and $R_e$ represents an alkyl group which may have a substituent, an aryl group which may have a substituent, a heterocycle which may have a substituent, an acylamino group, an anilino group, an amino group, an alkyloxy group, a cyano group, a carbamoyl group, an alkoxycarbonyl group, and an aryloxycarbonyl group.

In (2-IV), $R_f$ and $R_g$ each is the same as $R_e$.

In formula (2-V), $R_h$ and $R_i$ each is the same as $R_e$.

In formula (2-VI), $R_j$ represents an acylamino group, a sulfonylamino group, a ureido group, a carbamoyl group, an alkoxycarbonylamino group, an aryloxycarbonylamino group, an amino group, and an alkyl group, and "a" represents is 1 to 3. When "a" represents 2, 3, or 4, substituents represented by $R_j$ may be the same or different.

In formula (2-VII), $R_k$ and $R_l$ each is the same as $R_c$.

In terms of minimal secondary absorption, as $Y_2$, formulas (2-IV) and (2-V) are particularly preferred.

$G_2$ in formula (2-I) represents —C($R_a$)= or a nitrogen atom, and $R_a$ represents a hydrogen atom or a substituent. Listed as preferred examples represented by $R_a$ are a hydrogen atom, an alkyl group, an aryl group, a cyano group, etc., and a hydrogen atom and a cyano group are more preferred. Further, as $G_2$, a nitrogen atom is more preferred.

$X_2$ in formula (2-I) will be described. $X_2$ represents a condensed polycyclic heterocyle which contains at least one nitrogen atom in the ring and which is formed by condensation of at least two rings, a heterocycle in which at least one nitrogen atom in the ring is a conjugated terminal and completes a conjugated chain with —$G_2$=$Y_2$, and a heterocycle in which $G_2$ is substituted with a ring different from a ring containing a nitrogen atom which is a conjugated terminal. Listed as heterocycles which contains at least one nitrogen atom in the ring and which is formed by condensation of at least two rings, are indole, indazole, benzimidazole, benztriazole, purine, carbazole, pyrazoloazole derivatives, etc. Furthermore, condensed polycyclic compounds be saturated or unsaturated.

Further, these heterocycles may have a substitutable substituent. Preferred condensed polycyclic heterocycles include indole, benzimidazole, pyrazoloazole derivatives. $G_2$ in —$G_2$=Y is substituted with a ring which is different from a ring containing a nitrogen atom which is in the ring and is a conjugated terminal.

In formula (2-I), listed as preferred X are those compounds described below.

In these formulas, —G=Y is substituted in a carbon atom marked with "*".

General Formula (2-VIII)

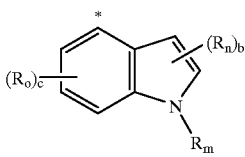

General Formula (2-IX)

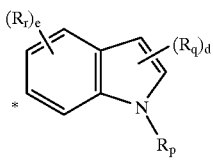

-continued

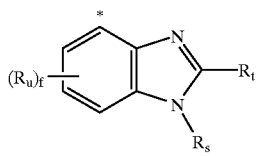

General Formula (2-X)

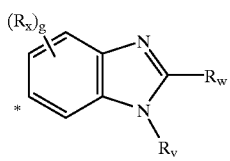

General Formula (2-XI)

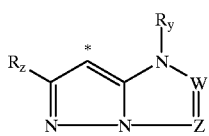

General Formula (2-XII)

In formula (2-VIII), $R_m$ represents a hydrogen atom, an alkyl group which may have a substituent, an aryl group which may have a substituent, a heterocycle which may have a substituent. Specifically listed as alkyl groups, which may have a substituent, are a methyl group, an ethyl group, a n-propyl group, an i-propyl group, a n-butyl group, a hydroxyethyl group, a methanesulfonylamino group, etc. Specifically listed as aryl groups, which may have a substituent, are a phenyl group which may have a substituent, and the like. In this case, listed as the substituents are an alkyl group, an alkoxy group, a halogen atom, an acylamino group, an acyloxy group, a carbamoyl group, etc. $R_n$ and $R_o$ each represents a substitutable substituent. Examples of substitutable substituents include an alkyl group which may have a substituent, a cycloalkyl group, an aryl group which may have a substituent, a heterocycle which may have a substituent, an alkoxy group, an alkylthio group, a carbonyl group, a halogen atom, an acylamino group, an acyloxy group, a carbamoyl group, an oxycarbonyl group, a cyano group, a nitro group, sulfonic acid group, a carboxylic acid, etc. "b" represents integer of 0 to 2 and "c" represents an integer of 0 to 3. When "b" represents 2 or more, substituents represented by $R_n$ may be the same or different. When "c" is 2 or more, substituents represented by $R_o$ may be the same or different.

In formula (2-IX), $R_p$ is the same as $R_m$, and $R_q$ and $R_r$ each is the same as $R_n$. "d" is the same as "e" and "c" is the same as "e". When "d" is 2, substituents represented by $R_r$ may be the same or different. When "e" is at least 2, substituents represented by $R_r$ may be the same or different. Furthermore, when "d" and "e" each is an integer except for 0, $R_q$ and $R_r$ may be the same or different.

In formula (2-X), $R_s$ is the same as $R_m$, and $R_t$ and $R_u$ each is the same as $R_n$, and "f" is the same as "b". When "f" is 2 or more, substituents represented by $R_u$ may be the same or different.

In formula (2 -XI), $R_v$ is the same as $R_m$, and $R_w$ and $R_x$ each is the same as $R_n$, and "g" is the same as "b". When "g" is at least 2, substituents represented by $R_x$ may be the same or different.

In formula (2-XII), W and Z each represents a nitrogen atom or $-C(R_\alpha)=$. $R_y$ represents an alkyl group which may have a substituent, an aryl group which may have a substituent, a heterocycle which may have a substituent. Specifically listed as alkyl groups, which may have a substituent, are a methyl group, an ethyl group, a n-propyl group, an i-propyl group, a n-butyl group, a hydroxyethyl group, a methanesulfonylamino group, etc. Specifically listed as aryl group, which may have a substituent, are a phenyl group which may have a substituent, and the like. In this case, listed as the substituents are an alkyl group, an alkoxy group, a halogen atom, an acylamino group, an acyloxy group, a carbamoyl group, etc. $R_z$, and $R_\alpha$ each is the same as $R_n$.

Particularly preferred dyes represented by formula (2-I) are those represented by (2-XIII) described below.

$$E_2-N=F_2 \qquad (2\text{-XIII})$$

wherein F represents a coupler component represented by formulas (2-IV) and (2-V) and combines with a nitrogen atom at the coupling position of the coupler component. $E_2$ represents a condensed polycyclic heterocyle which contains at least one nitrogen atom in the ring and which is formed by condensation of at least two rings, a heterocycle in which at least one nitrogen atom in the ring is a conjugated terminal and completes a conjugated chain with $-N=F_2$, and a heterocycle in which $-N=F_2$ is substituted with a ring different from a ring containing a nitrogen atom which is a conjugated terminal. Listed as heterocycles which contains at least one nitrogen atom in the ring and which is formed by condensation of at least two rings, are indole, indazole, benzimidazole, benzotriazole, purine, carbazole, pyrazoloazole derivatives, etc. Furthermore, condensed polycyclic compounds may be saturated or unsaturated. Further, these heterocycles may have a substitutable substituent. Preferred condensed polycyclic heterocycles include indole, benzimidazole, pyrazoloazole derivatives.

Preferred specific examples as $X_2$ in formula (2-I) are shown below. $-G_2=Y_2$ is substituted in a carbon atom marked with "*".

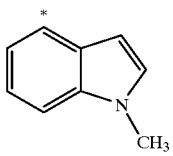

X-201

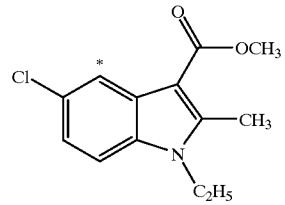

X-202

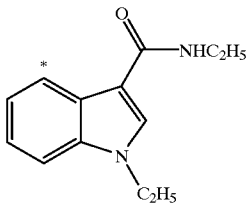

X-203

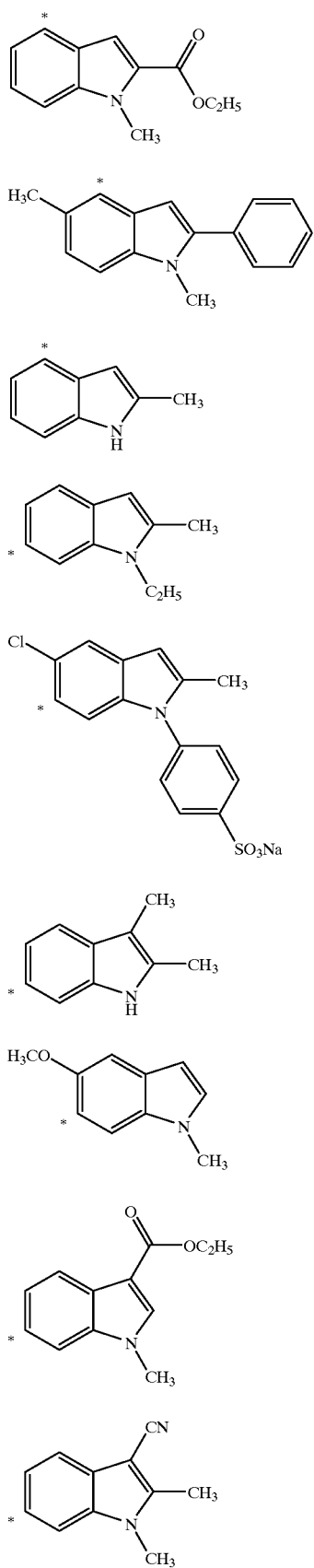
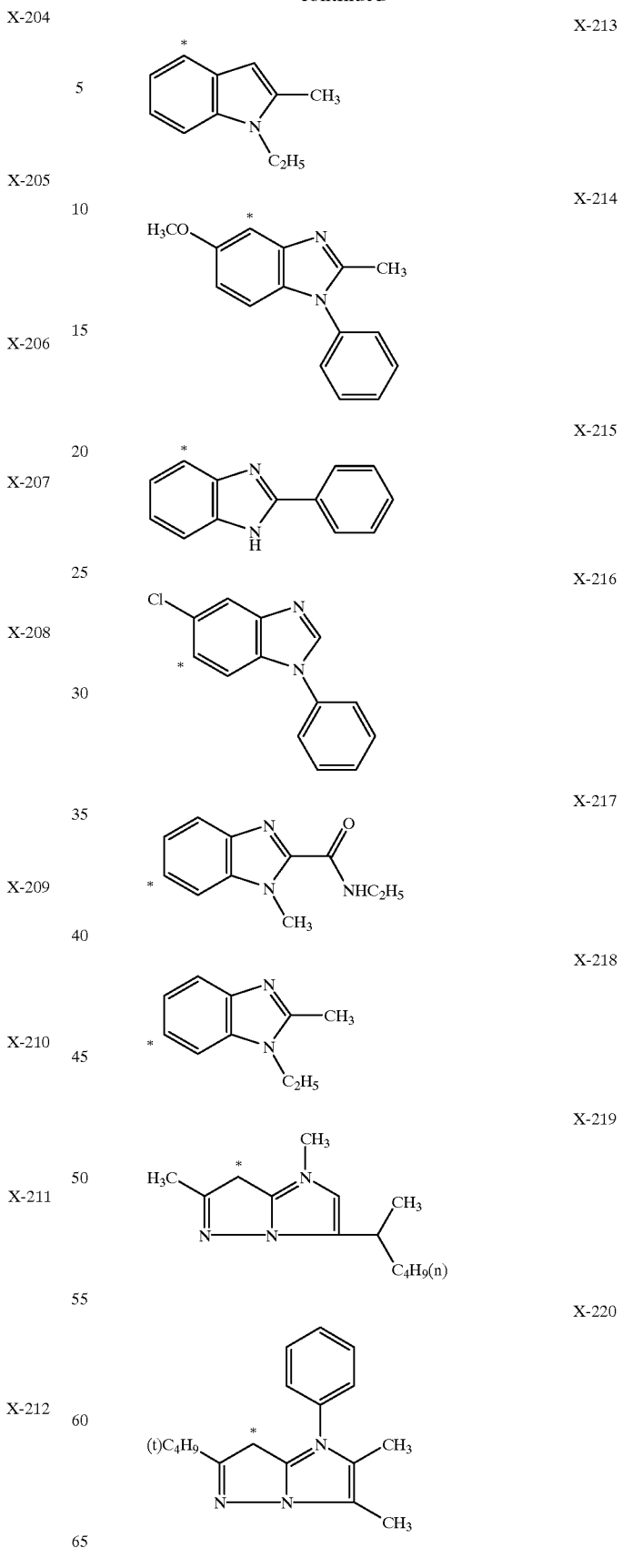

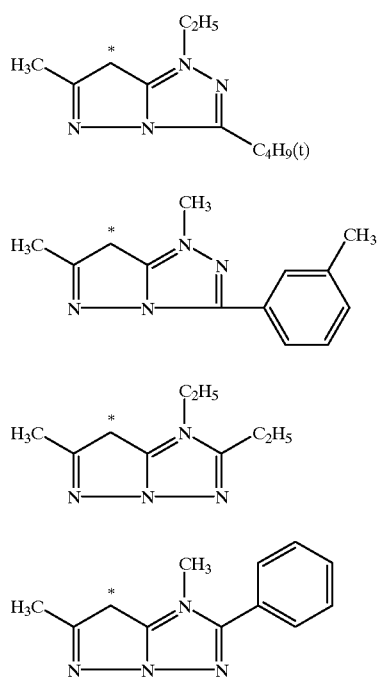
Preferred specific examples as $Y_2$ in formula (2-I) are shown below. —$X_2$=$G_2$ is substituted in a carbon atom marked with "*".
X-221
X-222
X-223
X-224
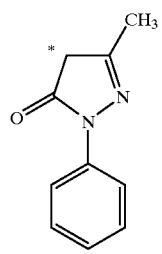  Y-201
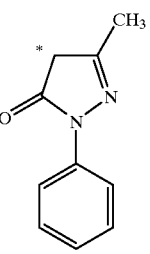  Y-202
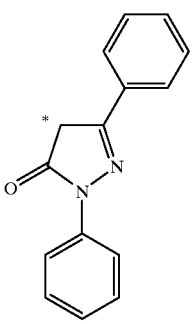  Y-203
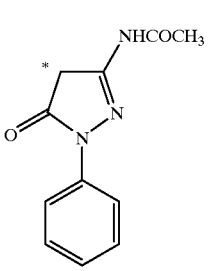  Y-204
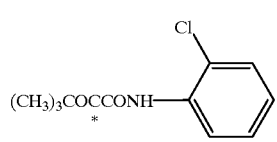  Y-205
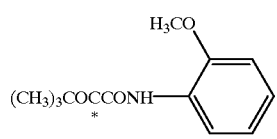  Y-206
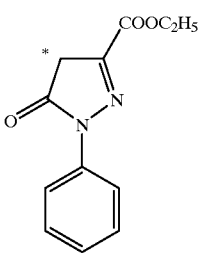  Y-207
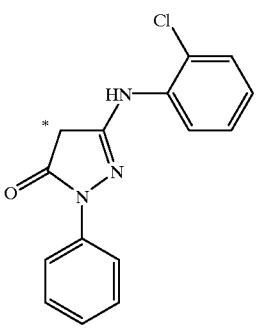
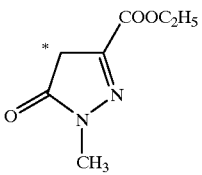
Y-208
Y-209
Y-210
Y-211
Y-212
Y-213

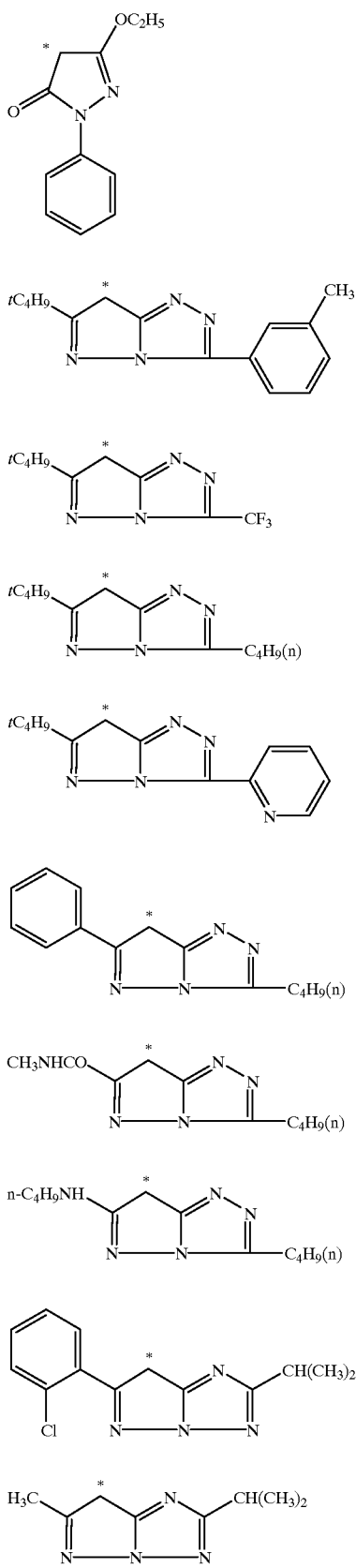
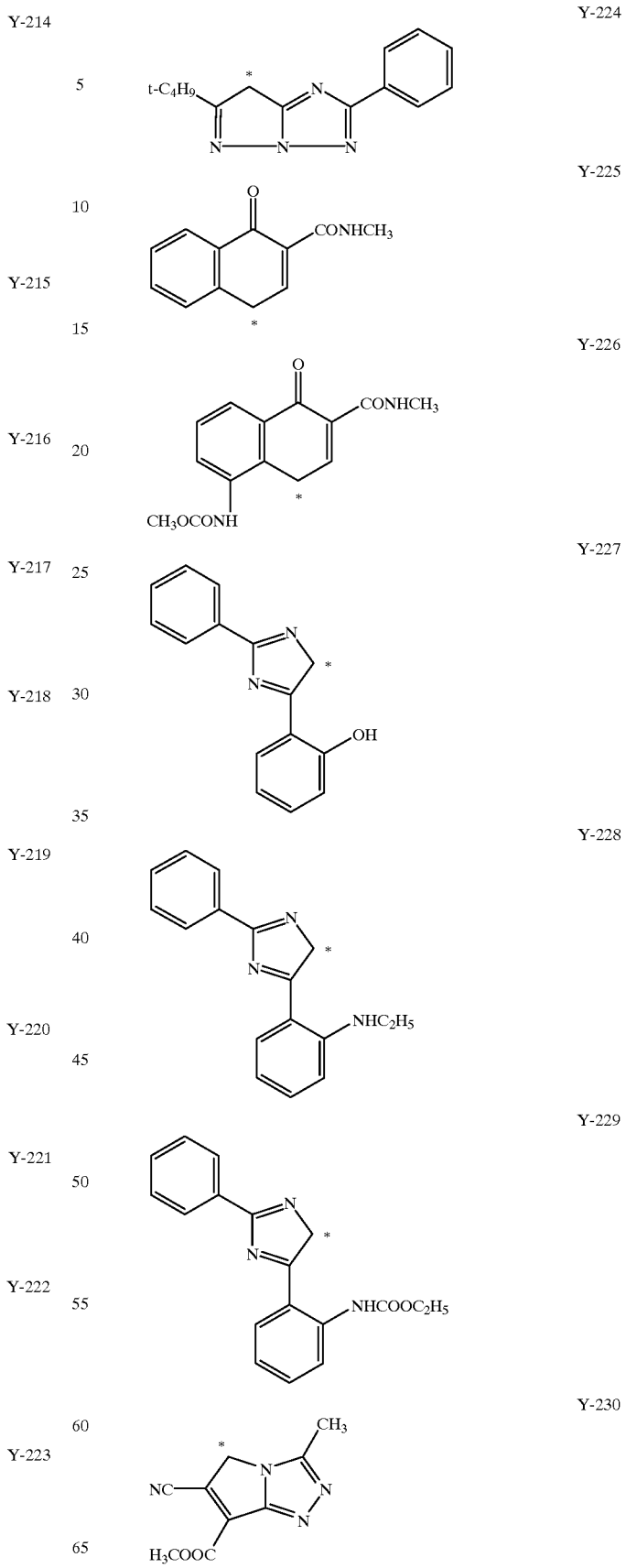

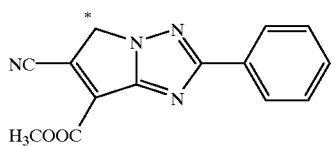
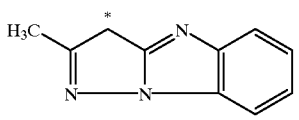
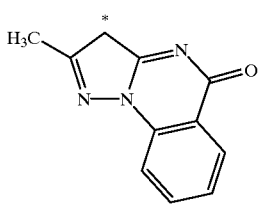
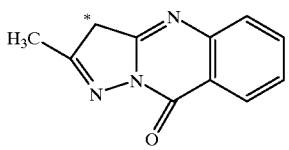
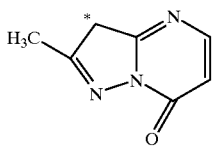
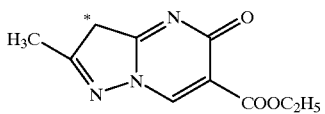
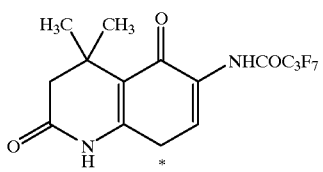
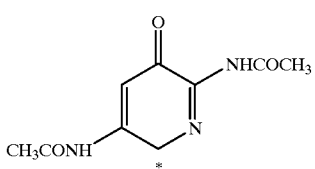
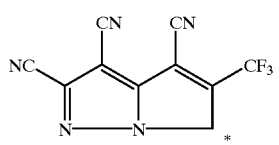
Y-231 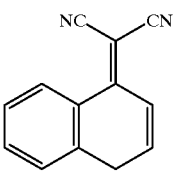
Y-232
Y-233 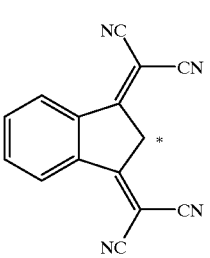
Y-234 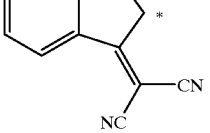
Y-235
Y-236 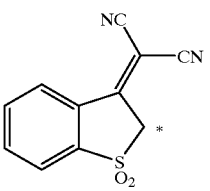
Y-237
Y-238 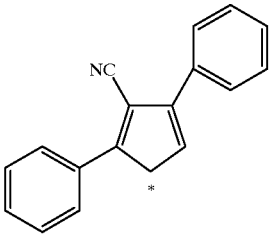
Y-239
Y-240
Y-241
Y-242
Y-243
Y-244
Y-245 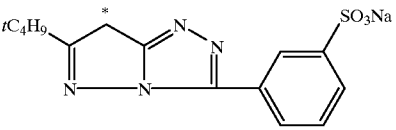
Y-246 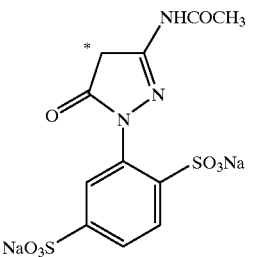

-continued

Y-247

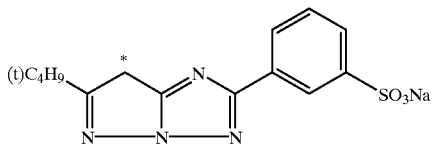

Specific examples of dyes represented by formula (2-I) are shown in Tables 2-7 and 2-8 described below.

Of dyes represented by formula (2-I), those, in which $G_2$ is a nitrogen atom, can be synthesized by a method employing the schemes shown below.

In schemes (1) and (3), derivatives of $X_2$ and $Y_2$ undergo oxidation coupling in the presence of bases. Herein, L represents a coupling-off group (for example, a chlorine atom, a bromine atom, etc.) or a hydrogen atom. In schemes (2) and (4), the derivatives of $X_2$ and $Y_2$ undergo dehydration condensation in the presence of an acid catalyst.

(1)

$X_2-NH_2 + Y_2\begin{smallmatrix}H\\L\end{smallmatrix} \longrightarrow Y_2=N-X_2$ (2)

$X_2-NO + Y_2\begin{smallmatrix}H\\H\end{smallmatrix} \longrightarrow Y_2=N-X_2$ (3)

$X_2-H + Y_2\begin{smallmatrix}NH_2\\H\end{smallmatrix} \longrightarrow Y_2=N-X_2$ (4)

$X_2-H + Y_2\begin{smallmatrix}NO\\H\end{smallmatrix} \longrightarrow Y_2=N-X_2$ Of dyes represented by formula (2-I), those, in which $G_2$ is $CR_c$, can be synthesized in the same manner as above, except that in the scheme (2), nitroso is replaced with corresponding aldehyde, etc.

Synthesis Example

Added to 40 ml of methanol were 2.7 g of compound S31 and 1.5 g of N-methyl-6-aminoindole (compound S32, synthesized according to a method described in Nihon Kagaku Zasshi, 78, page 1372~ (1957)) and were stirred at room temperature. Further, a solution prepared by dissolving 10.4 g of sodium carbonate in 15 ml of water was added. A solution prepared by dissolving 2.3 g of ammonium peroxosulfate in 20 ml of water was then added dropwise. After dropwise addition, the resulting mixture was further stirred for one hour at room temperature and a formed dye was extracted employing ethyl acetate. After washing the resulting ethyl acetate solution with a saturated sodium chloride solution, ethyl acetate was removed by evaporation to obtain a dye residue. The resulting dye residue was purified employing column chromatography and 1.1 g of the targeted compound was obtained. The synthesized compound was identified as the target compound employing NMR and mass spectra.

The maximum absorption wavelength (λmax) and molar absorption coefficient (ε) of the synthesized compound in ethyl acetate were 557 nm and 7,000, respectively.

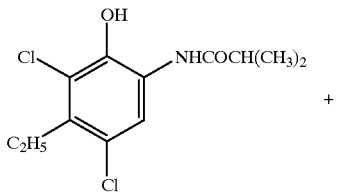

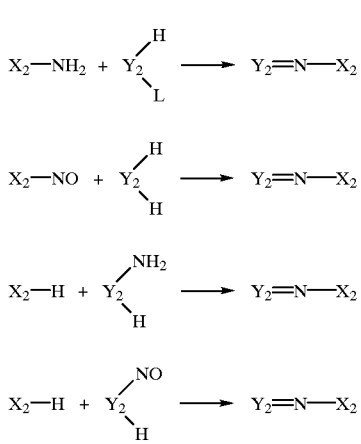

Next, image recording materials comprising the dye of the present invention will be described.

The image recording materials comprising the dye of the present invention as described herein are materials to form an image, specifically a color image, and include part and all of a so-called hard copy image which can be formed employing the dye of the present invention.

Specifically, they are a thermal transfer-type image recording material, a pressure-sensitive recording material, an ink-jet system recording material, an electrophotographic recording material, a transfer-type silver halide photosensitive material, printing ink, a recording pen, etc. Of them, the thermal transfer-type image recording material, the ink-jet system recording material, and the electrophotographic recording material are preferred, and the thermal transfer-type recording material and the ink-jet system recording material are more preferred.

Next, the thermal transfer material employing the dye of the present invention will be described.

The molecular weight of the dye employed in the thermal transfer material, when its transferability is considered, is preferably small. However, when the stability of images, specifically bleeding, is considered, the dye having a small molecular weight is not so preferred. The molecular weight is preferably between about 300 and about 800, and is more preferably between 400 and 700.

The thermal transfer material comprising the dye of the present invention will be described. The thermal transfer material comprising the dye of the present invention preferably has a support comprising thereon a dye-containing layer comprising a dye and a binder. The content of the dye is preferably between 0.05 and 10 g per m² of the support. The dye of the present invention may be employed together with other dyes known in the art.

Preferred as binders are solvent-soluble polymers such as acrylic resins, methacrylic resins, polystyrene, polycarbonate, polysulfone, polyether sulfone, polyvinyl butyral, polyvinyl acetal, nitrocellulose, ethyl cellulose, etc. These binders may be employed upon dissolving one type or at least two types of solvents and may also be in the form of a latex dispersion. The employed amount of binders is preferably between 0.1 and 30 g. The binder amount to the dye amount per $m^2$ of the support is preferably between 0.5 and 2 times.

The above-mentioned dye-containing layer can be formed in such a manner that a thermal transfer layer-forming ink composition is prepared by dissolving the dye of the present invention together with a binder or by dispersing it into a solvent as fine particles, and said ink is applied onto a support and subsequently dried. The dry thickness of the dye-containing layer is preferably between 0.1 and 10 μm.

Thermal transfer materials comprising the dye of the present invention may include those which have good dimensional stability and resistance against heat from a heat-sensitive head, etc. during recording. Preferably employed are thin paper such as condenser paper and glassine paper, and heat-resistant plastic films such as polyethylene terephthalate, polyamide, and polycarbonate. The thickness of the support is preferably between 2 and 30 μm. In order to improve adhesion with the binder and to minimize transfer and dying to the support, the support preferably has a sublayer composed of a selected polymer. Furthermore, in order to minimize adhesion of the head onto the support, a stripping layer may be provided on the reverse side (the reverses side of the dye-containing layer) of the support.

For applying the thermal transfer material comprising the dye of the present invention to a thermal transfer material which enables full color image recording, it is preferred to successively and repeatedly coat at least a total of three layers consisting of a yellow thermal transfer layer containing a yellow dye, a magent a thermal transfer layer containing a magenta dye, and a cyan thermal transfer containing a cyan dye, on the same surface of a support . Furthermore, if desired, a total of four layers, including a thermal transfer layer containing a black image forming substance, may be successively and repeatedly coated onto the same surface.

As a recording method employing the thermal transfer material comprising the dye of the present invention, the dye-containing layer of the above-mentioned thermal transfer material is faced with the image receptive material described below, and heat corresponding to image information is then provided onto the thermal transfer material recording material and an image composed of the dye can be formed on the image receptive material.

As the image receptive material, one having a support comprising thereon an image receptive layer is employed. Employed as supports of the image receptive layer can be paper, plastic film, or paper-plastic film composites. Listed as specific supports are those described on page 5 from 11th line of the upper right to 11th line of the upper left of Japanese Patent Publication Open to Public Inspection No. 3-54556. The image receptive layer is composed of a polymer binder.

As polymer binders, thermoplastic polymers are preferred and a polymer layer is formed which is composed of one type or at least two types of, for example, polyester resins, polyvinyl chloride resins, copolymer resins of vinyl chloride with other monomers (for example, vinyl acetate, etc.), polyvinyl butyral, polyvinylpyrrolidone, polycarbonate, etc.

The ink-jet recording liquid comprising the dyes of the present invention will be described. When the dye of the present invention is employed in the ink-jet recording liquid, the solubility of the dye in the major ink component is an important property, and a dye which is added to a water-based ink liquid is preferably a water-soluble dye in which a sulfonic acid group is preferably substituted.

Preferably employed as ink-jet recording liquids comprising the dye of the present invention can be a water-based ink-jet recording liquid, an oil-based ink-jet recording liquid, a solid (phase change) ink-jet recording liquid, etc. The water-based ink-jet recording liquid (for example, a water-based ink-jet recording liquid containing water of at least 10 weight percent of the total ink weight) can be most preferably employed.

In the water-based ink-jet recording liquid, in addition to the dye of the present invention, water and water-soluble organic solvents are preferably employed in combination.

Examples of water-soluble organic solvents include alcohols (for example, methanol, ethanol, propanol, isopropanol, butanol, isobutanol, s-butanol, tert-butanol, pentanol, hexanol, cyclohexanol, benzyl alcohol, etc.); polyhydric alcohols (for example, ethylene glycol, diethylene glycol, triethylene glycol, polyethylene glycol, propylene glycol, dipropylene glycol, polypropylene glycol, butylene glycol, hexanediol, pentanediol, glycerin, hexanetriol, thiodiglycol, etc.); polyhydric alcohol ethers (for example, ethylene glycol monomethyl ether, ethylene glycol monoethyl ether, ethylene glycol monobutyl ether, diethylene glycol monomethyl ether, diethylene glycol monomethyl ether, diethylene glycol monobutyl ether, propylene glycol monomethyl ether, propylene glycol monobutyl ether, ethylene glycol monomethyl ether acetate, triethylene glycol monomethyl ether, triethylene glycol monoethyl ether, triethylene glycol monobutyl ether, ethylene glycol monophenyl ether, propylene glycol monophenyl ether); amines (for example, ethanolamine, diethanolamine, triethanolamine, N-methyldiethanolamine, N-ethyldiethanolamine, morpholine, N-ethylmorpholine, ethylenediamine, diethylenediamine, triethylenetetramine, tetraethylenepentamine, polyethyleneimine, pentamethyldiethyltriamine, tetramethylpropylenediamine, etc.); amides (for example, formamide, N,N-dimethylformamide, N,N-dimethylacetamide, etc.), heterocycles (for example, 2-pyrrolidone, N-methyl-2-pyrrolidone, cyclohexylpyrrolidone, 2-oxazolidone, 1,3-dimethyl-2-imidazolidinone, etc.), sulfoxides (for example, dimethylsulfoxide, etc.); sulfones (for example, sulfolane, etc.); urea, acetonitrile, acetone, etc. Listed as preferred water-soluble organic solvents are polyhydric alcohols. The water-soluble organic solvents may be employed individually or in combination. The added amount in. the ink of water-soluble organic solvents is between 5 and 60 weight percent of the total weight, and is preferably between 10 and 30 weight percent.

In the above-mentioned water-based ink-jet recording liquid, when the dye is soluble in the solvent system, it can be dissolved as it is and can be employed. On the other hand, when the dye is insoluble solid as it is, it is pulverized into fine particles employing various types of pulverizing mills (for example, a ball mill, a sand mill, an atoraita, a roll mill, an agitator mil, a Henschel mixer, a colloid mill, an ultrasonic homogenizer, a pearl mil, a jet mill, an ongu mill), or after being dissolved in a dye-soluble organic solvent, can be dispersed into a solvent system together with a polymer dispersing agent or a surface active agent. Regarding specific preparation methods of such water-based ink-jet recording liquids, can be referred methods described, for example, in Japanese Patent Publication Open to Public Inspection No. 5-148436, 5-295312, 7-97541, 7-82515, and 7-118584.

The viscosity of each of the above-mentioned water-based, oil-based, and solid ink-jet recording liquids is preferably below 40 cps during impinging, and is more preferably no more than 30 cps.

The surface tension of the ink-jet recording liquid of the present invention is preferably at least 20 dyn/cm during ejection, and is more preferably between 40 and 60 dyn/cm.

The employed dye concentration is preferably in the range of 0.1 to 25 weight percent of the total ink-jet recording liquid, and is more preferably in the range of 0.5 to 10 weight percent. The dye of the present invention may be employed together with other dyes known in the art.

In accordance with objectives to improve ejection stability, adaptability to print heads and ink cartridges, storage stability, image keeping quality, and other properties, incorporated into the ink-jet recording liquid are viscosity controlling agents, surface tension controlling agents, specific resistance controlling agents, film-forming agents, dispersing agents, surface active agents, UV absorbers, antioxidants, anti-discoloring agents, antiseptics, anticorrosion agents, etc.

In the ink-jet recording liquid, there is no particular limitation on the employed recording method, and it can be preferably employed for a continuous method and on-demand method ink-jet printers. Listed as specific examples of the on-demand methods can be an electrical-mechanical conversion method (for example, a single cavity type, a double cavity type, a bender type, a piston type, a share mode type, a shared wall type, etc.), an electrical-thermal conversion method (for example, an electrolysis control type, a slit jet type, etc.), a discharge method (for example, a spark jet type, etc.), and the like.

EXAMPLES

The present invention will be specifically described with reference to examples.

Example 1-1

Preparation of the Thermal Transfer Material and Image Evaluation

<Ink Preparation>

Raw materials described below were mixed and ink was prepared which comprised a dye according to the present invention.

| Dye described in Table 1 | 5 g |
| Polyvinyl butyral resin (BL-1, Sekisui Kagaku Kogyo) | 5 g |
| Methyl ethyl ketone | 200 ml |

<Preparation of the Thermal Transfer Material>

The above-mentioned ink was coated onto a 4.5 μm thick polyethylene terephthalate film base employing a wire bar so as to obtain a coated amount of 0.8 g/m² after drying and subsequently dried, whereby Thermal Transfer Material 1-1 was prepared in which the thermal transfer layer was formed on the polyethylene terephthalate film base.

Further, provided on the reverse surface of the above-mentioned polyethylene terephthalate film base was a nitrocellulose layer containing a silicone-modified urethane resin (SP-2105, manufactured by Dainichi Seika Co.) as a sticking preventing layer.

<Preparation of the Image Receptive Material>

Coated onto a support prepared by laminating polyethylene onto both sides of the paper base (incorporated onto one side of the polyethylene layer were a white pigment ($TiO_2$) and a bluing agent) was a methyl ethyl ketone solution containing a polyester resin comprising an ester-modified silicone (in a coated amount of 0.15 g/m²), as an image receptive layer, so as to obtain a coated amount of the polyester resin of 5 g/m², and Image Receptive Material 1-1 was thus obtained.

<Formation of the Thermal Transfer Image>

The above-mentioned Thermal Transfer Material 1-1 and Image Receptive Material 1-1 were superimposed and image recording was carried out under the recording conditions described below, while placing a thermal head on the reverse side of the Thermal Transfer Material, whereby a magenta image Image 1), which was excellent in gradation, was obtained.

(Recording Conditions)

Recording density of main scanning and subscanning:

8 dots/mm

Electric power consumption:

0.6 W/dot

Heating time:

heating time was regulated in increments between 20 and 0.2 millisecond

Thermal Transfer Materials 1 through 30 were prepared in the same manner as in the method employed to obtain Image 1, employing dyes described in Table 1, and each image was obtained.

Further, as a comparative dye, Comparative Compound 1 having the structure described below was used.

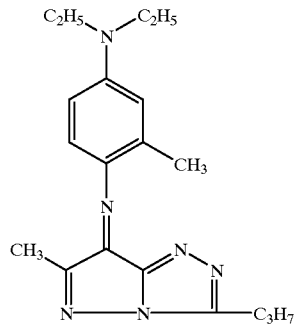

Comparative Compound 1 (Exemplified Compound 23 Described in Japanese Patent Publication Open to Public Inspection No. 6-63194)

<Evaluation of the Thermal Transfer Image>

(Evaluation of the Light Fastness)

Samples having a reflection density of about 1.0, which have been prepared by the method described above, were irradiated employing a Xe fademeter (at 70,000 Lx, for 50 hours) and the change rate of the reflection density was obtained as described below:

Change rate of reflection density=(reflection density after Xe irradiation)/(reflection density prior to Xe irradiation)×100

Table 1 shows the relative values when the change rate of the reflection density of Comparative Compound 1 is 100.

TABLE 1

| Thermal Transfer Material No. | Dye No. | A | D | B | Light Fastness |
|---|---|---|---|---|---|
| 1 | 1 | A1 | N | B14 | 152 |
| 2 | 2 | A1 | N | B15 | 156 |
| 3 | 3 | A1 | N | B18 | 148 |
| 4 | 4 | A1 | N | B21 | 154 |
| 5 | 5 | A2 | N | B14 | 165 |
| 6 | 6 | A12 | N | B14 | 162 |
| 7 | 7 | A7 | N | B1 | 145 |
| 8 | 8 | A8 | N | B25 | 140 |
| 9 | 9 | A13 | N | B24 | 142 |
| 10 | 10 | A1 | N | B5 | 140 |
| 11 | 11 | A1 | N | B28 | 145 |
| 12 | 12 | A1 | N | B32 | 140 |
| 13 | 13 | A1 | N | B38 | 140 |
| 14 | 14 | A3 | N | B7 | 136 |
| 15 | 15 | A14 | N | B15 | 130 |
| 16 | 16 | A15 | N | B14 | 135 |
| 17 | 17 | A18 | N | B25 | 128 |
| 18 | 18 | A19 | N | B25 | 125 |
| 19 | 19 | A21 | N | B15 | 130 |
| 20 | 20 | A22 | N | B25 | 125 |
| 21 | 21 | A26 | N | B3 | 120 |
| 22 | 22 | A27 | N | B3 | 118 |
| 23 | 23 | A1 | CH | B14 | 132 |
| 24 | 24 | A1 | CH | B7 | 125 |
| 25 | 25 | A2 | CH | B5 | 118 |
| 26 | 26 | A14 | CH | B14 | 115 |
| 27 | 27 | A19 | CH | B21 | 119 |
| 28 | 28 | A27 | CH | B12 | 116 |
| 29 | 29 | A1 | C(CN) | B15 | 120 |
| 30 | Compound 1 | | | | 100 |

Based on the results in Table 1, it was found that images formed employing thermal transfer materials comprising dyes of the present invention exhibited excellent light fastness.

Example 2

<Preparation of Ink>

Ink was prepared which was composed of 3 weight percent of each of the dyes described in Table 2, 19 weight percent of diethylene glycol, 9 weight percent of triethylene glycol monobutyl ether, 0.6 weight percent of Surfynol 465 as a surface active agent, and remaining weight percent of deionized water.

Further, a comparative dye having the structure shown below was employed.

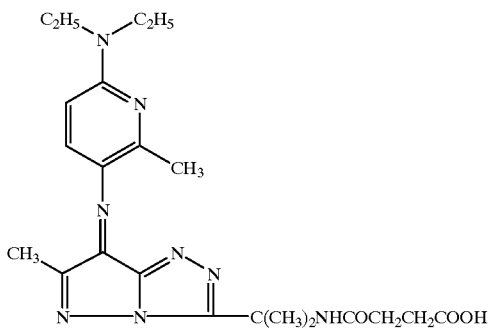

Compound (I-20) Described in Japanese Patent Publication Open to Public Inspection No. 9-150572

<Formation of the Ink-jet Image>

Image samples were prepared by printing images on sheets of plain paper (Xerox 4024) employing an ink-jet printer MJ-5000C (utilizing an electrical-mechanical conversion method, manufactured by Seiko-Epson Co.) provide with the above-mentioned ink.

Surface Active Agent-1: Surfynol 465
(Manufactured by Air Products and Chemicals Inc.)

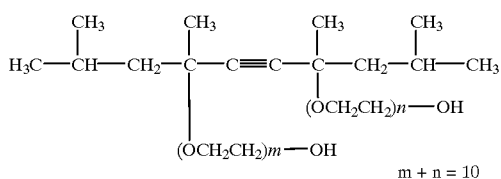

<Evaluation of the Ink-jet Image>
(Evaluation of Light Fastness)

Samples having a reflection density of about 1.0, which have been prepared by the method described above, were irradiated employing a Xe fademeter (70,000 Lx, 50 hours) and the change rate of the reflection density was obtained as described below:

Change rate of reflection density=(reflection density after Xe irradiation)/(reflection density prior to Xe irradiation)×100

Table 2 shows the relative values when the change rate of the reflection density of Comparative Compound 1 is 100.

TABLE 2

| Dye No. | A | D | B | Light Fastness |
|---|---|---|---|---|
| 30 | A1 | N | B48 | 153 |
| 31 | A2 | N | B48 | 160 |
| 32 | A8 | N | B48 | 155 |
| 33 | A1 | N | B50 | 150 |
| 34 | A9 | N | B5 | 140 |
| 35 | A9 | N | B15 | 151 |
| 36 | A9 | N | B1 | 160 |
| 37 | A9 | N | B48 | 165 |
| 38 | A9 | N | B22 | 157 |
| 39 | A9 | N | B25 | 148 |
| 40 | A9 | N | B30 | 140 |
| 41 | A9 | N | B38 | 141 |
| 42 | A14 | N | B49 | 130 |
| 43 | A19 | N | B50 | 131 |
| 44 | A22 | N | B48 | 135 |
| 45 | A27 | N | B49 | 120 |
| 46 | A1 | CH | B48 | 134 |
| 47 | A22 | CH | B48 | 126 |
| 48 | A9 | C(CN) | B6 | 118 |
| 49 | A9 | CH | B22 | 119 |
| Comparative Compound I-20 | | | | 100 |

Based on the results in Table 2, it was found that images formed employing the ink-jet recording liquid comprising the dye of the present invention exhibited excellent light fastness. These are due to the excellent light fastness of the the dye of the present invention.

Example 3

Thermal Transfer Materials 1 through 32 were prepared in the same manner as in the method which was used to obtain Image 1, employing dyes described in Table 3, and each image was obtained. Further, as comparative dyes, the above-mentioned Comparative Compound 1 and Comparative Compound 2 described below were used.

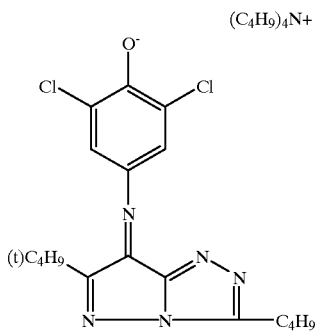

Comparative Compound 2 (Exemplified Compound, Dye 1 Described in Japanese Patent Publication Open to Public Inspection No. 6-80900)

<Evaluation of the Thermal Transfer Image>

(Evaluation of the Light Fastness)

Samples having a reflection density of about 1.0, which have been prepared by the method described above, were irradiated employing a Xe fademeter (70,000 Lx, 50 hours) and the change rate of the reflection density was obtained as described below:

Change rate of reflection density=(reflection density after Xe irradiation)/(reflection density prior to Xe irradiation)×100

Table 3 shows the relative values when the change rate of the reflection density of Comparative Compound 1 is 100.

TABLE 3

| Dye No. | X | G | Y | Light Fastness |
|---|---|---|---|---|
| 1 | 1 | N | 1 | 165 |
| 2 | 2 | N | 2 | 160 |
| 3 | 3 | N | 3 | 155 |
| 4 | 5 | N | 5 | 158 |
| 5 | 10 | N | 10 | 152 |
| 6 | 17 | N | 17 | 159 |
| 7 | 18 | N | 18 | 150 |
| 8 | 19 | N | 19 | 152 |
| 9 | 20 | N | 20 | 148 |
| 10 | 24 | N | 24 | 136 |
| 11 | 26 | N | 26 | 132 |
| 12 | 25 | N | 25 | 139 |
| 13 | 1 | N | 2 | 160 |
| 14 | 1 | N | 4 | 155 |
| 15 | 1 | N | 6 | 152 |
| 16 | 1 | N | 14 | 150 |
| 17 | 1 | N | 9 | 154 |
| 18 | 1 | N | 16 | 159 |
| 19 | 1 | N | 20 | 143 |
| 20 | 1 | N | 24 | 134 |
| 21 | 28 | N | 28 | 130 |
| 22 | 1 | N | 28 | 136 |
| 23 | 1 | N | 32 | 140 |
| 24 | 1 | N | 36 | 135 |
| 25 | 1 | N | 42 | 130 |
| 26 | 1 | N | 49 | 128 |
| 27 | 56 | N | 56 | 125 |
| 28 | 1 | CH | 1 | 120 |
| 29 | 10 | CH | 10 | 123 |
| 30 | 19 | CH | 19 | 120 |
| 31 | 1 | C(CN) | 1 | 116 |

TABLE 3-continued

| Dye No. | X | G | Y | Light Fastness |
|---|---|---|---|---|
| Comparative Compound 1 | | | | 100 |
| Comparative Compound 2 | | | | 45 |

Based on the results in Table 3, it was found that images formed employing thermal transfer materials comprising dyes of the present invention exhibited excellent light fastness.

Example 4

<Preparation of Ink>

Ink was prepared which was composed of 3 weight percent of each of dyes described in Table 4, 19 weight percent of diethylene glycol, 9 weight percent of triethylene glycol monobutyl ether, 0.6 weight percent of Surfynol 465 as a surface active agent, and remaining weight percent of deionized water.

Further, as a comparative dye, the above-mentioned one ((I-2) in Japanese Patent Publication Open to Public Inspection No. 9-150572) was employed.

<Formation of Ink-jet Image>

Image samples were prepared by printing images on sheets of plain paper (Xerox 4024) employing an ink-jet printer MJ-5000C (utilizing an electrical-mechanical conversion method, manufactured by Seiko-Epson Co.) provide with the above-mentioned ink.

<Evaluation of the Ink-jet Image>

(Evaluation of Light Fastness)

Samples having a reflection density of about 1.0, which have been prepared by the method described above, were irradiated employing a Xe fademeter (70,000 Lx, 50 hours) and the change rate of the reflection density was obtained as described below:

Change rate of reflection density=(reflection density after Xe irradiation)/(reflection density prior to Xe irradiation)×100

Table 4 shows the relative values when the change rate of the reflection density of Comparative Compound 1 is 100.

TABLE 4

| Ink No. | Dye No. | X | G | Y | Light Fastness | Remarks |
|---|---|---|---|---|---|---|
| 1 | 32 | 1 | N | 52 | 156 | Present Invention |
| 2 | 33 | 52 | N | 52 | 150 | Present Invention |
| 3 | 34 | 10 | N | 52 | 148 | Present Invention |
| 4 | 35 | 54 | N | 54 | 140 | Present Invention |
| 5 | 36 | 53 | N | 53 | 130 | Present Invention |
| 6 | 37 | 52 | N | 24 | 128 | Present Invention |
| 7 | 38 | 52 | N | 28 | 122 | Present Invention |
| 8 | 39 | 52 | N | 32 | 130 | Present Invention |
| 9 | 40 | 52 | N | 36. | 120 | Present Invention |
| 10 | 41 | 52 | N | 42 | 120 | Present Invention |
| 11 | 42 | 52 | CH | 52 | 118 | Present Invention |
| 12 | 43 | 52 | C(CN) | 52 | 114 | Present Invention |
| 21 | Comparative Compound | | | | 100 | Comparative |

Based on the results in Table 4, it was found that images formed employing the ink-jet recording liquid comprising the dye of the present invention exhibited excellent light fastness. These are due to the excellent light fastness for the dye of the present invention.

Example 2-1

Preparation of the Thermal Transfer Material and Image Evaluation

<Ink Preparation>

Raw materials described below were mixed and ink was prepared which comprised the dye according to the present invention.

| | |
|---|---|
| Dye 1 described in the above-mentioned Table 2-1 | 5 g |
| Polyvinyl butyral resin (BL-1, Sekisui Kagaku Kogyo) | 5 g |
| Methyl ethyl ketone | 200 ml |

<Preparation of the Thermal Transfer Material>

The above-mentioned ink was coated onto a 4.5 μm thick polyethylene terephthalate film base employing a wire bar so as to obtain a coated amount of 0.8 g/m² after drying and subsequently dried, and Thermal Transfer Material 1 was prepared in which the thermal transfer layer was formed on the polyethylene terephthalate film base.

Further, provided on the reverse surface of the above-mentioned polyethylene terephthalate film base was a nitro-cellulose layer containing a silicone-modified urethane resin (SP-2105, manufactured by Dainichi Seika Co.) as a sticking preventing layer.

<Preparation of the Image Receptive Material>

Coated onto a support prepared by laminating polyethylene onto both sides of paper (incorporated into one side of the polyethylene layer were a white pigment ($TiO_2$) and a bluing agent) was a methyl ethyl ketone solution containing a polyester resin comprising an ester-modified silicone (a coated amount of 0.15 g/m²), as an image receptive layer, so as to obtained a coated amount of the polyester resin of 5 g/m², and Image Receptive Material 2-1 was thus obtained.

<Formation of the Thermal Transfer Image>

The above-mentioned Thermal Transfer Martial 2-1 and Image Receptive Material 2-1 were superimposed and image recording was carried out under the recording conditions described below while placing a thermal head on the reverse side of the Thermal Transfer Material, and a yellow image (Image 1), which was excellent in gradation, was obtained.

(Recording Conditions)

Recording density of main scanning and subscanning:

8 dots/mm

Electric power consumption:

0.6 W/dot

Heating time:

heating time was regulated in increments between 20 and 0.2 millisecond

Thermal Transfer Materials 202 through 286 were prepared in the same manner as in the method employed to obtain Image 1, employing dyes 202 through 286 described in Tables 1 through 3, and corresponding images 202 through 286 were obtained.

Further, as comparative dyes, three dyes described below were employed.

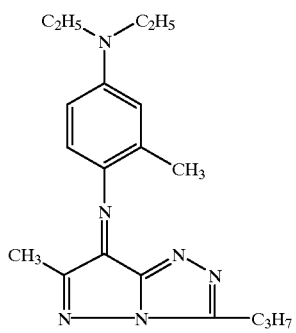

Comparative Compound 2-1 (Exemplified Compound 23 Described in Japanese Patent Publication Open to Public Inspection No. 6-63194)

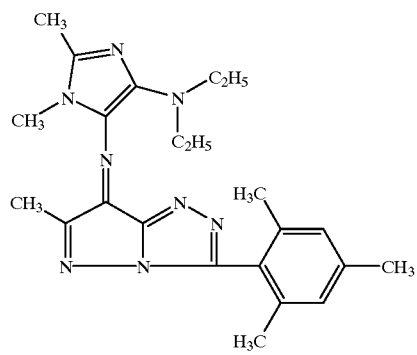

Comparative Compound 2-2 (Exemplified Compound 26 Described in Japanese Patent Publication Open to Public Inspection No. 6-219057)

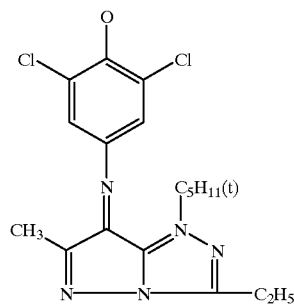

Comparative Compound 2-3 (Exemplified Compound D-2 Described in Japanese Patent Publication Open to Public Inspection No. 6-192585)

<Evaluation of the Thermal Transfer Image>

(Evaluation of Light Fastness)

Samples having a reflection density of about 1.0, which have been prepared by the method described above, were irradiated employing a Xe fademeter (at 70,000 Lx, for 50 hours) and the change rate of the reflection density was obtained as described below:

Change rate of reflection density=(reflection density after Xe irradiation)/(reflection density prior to Xe irradiation)×100

Tables 2-1 through 2-4 shows the relative values when the change rate of the reflection density of Comparative Compound 1 is 100.

TABLE 2-1

| Dye No. | $A_2$ | $B_2$ | $D_2$ | Light Fastness |
|---|---|---|---|---|
| 201 | A-1 | B-2 | N | 134 |
| 202 | A-2 | B-10 | N | 131 |
| 203 | A-6 | B-15 | N | 142 |
| 204 | A-4 | B-25 | N | 128 |
| 205 | A-6 | B-35 | N | 130 |
| 206 | A-8 | B-1 | N | 126 |
| 207 | A-8 | B-15 | N | 141 |
| 208 | A-13 | B-23 | N | 148 |
| 209 | A-8 | B-25 | N | 128 |
| 210 | A-10 | B-28 | N | 131 |
| 211 | A-8 | B-19 | N | 142 |
| 212 | A-16 | B-1 | N | 134 |
| 213 | A-16 | B-15 | N | 143 |
| 214 | A-14 | B-26 | N | 129 |
| 215 | A-17 | B-2 | N | 128 |
| 216 | A-17 | B-16 | N | 141 |
| 217 | A-18 | B-26 | N | 132 |
| 218 | A-20 | B-1 | N | 129 |
| 219 | A-22 | B-15 | N | 139 |
| 220 | A-20 | B-25 | N | 134 |
| 221 | A-25 | B-5 | N | 130 |
| 222 | A-23 | B-12 | N | 126 |
| 223 | A-25 | B-15 | N | 140 |
| 224 | A-25 | B-26 | N | 130 |
| 225 | A-29 | B-1 | N | 131 |
| 226 | A-27 | B-15 | N | 144 |
| 227 | A-29 | B-15 | N | 140 |
| 228 | A-30 | B-25 | N | 133 |
| 229 | A-31 | B-2 | N | 129 |
| 230 | A-33 | B-10 | N | 127 |
| 231 | A-31 | B-15 | N | 130 |
| 232 | A-31 | B-26 | N | 142 |
| 233 | A-35 | B-1 | N | 133 |
| 234 | A-35 | B-16 | N | 139 |
| 235 | A-39 | B-17 | N | 138 |

TABLE 2-2

| Dye No. | A | B | D | Light Fastness |
|---|---|---|---|---|
| 236 | A-39 | B-28 | N | 129 |
| 237 | A-42 | B-17 | N | 141 |
| 238 | A-41 | B-25 | N | 130 |
| 239 | A-43 | B-1 | N | 132 |
| 240 | A-43 | B-16 | N | 142 |
| 241 | A-46 | B-2 | N | 128 |
| 242 | A-45 | B-17 | N | 141 |
| 243 | A-46 | B-15 | N | 140 |
| 242 | A-46 | B-25 | N | 130 |
| 245 | A-45 | B-29 | N | 131 |
| 246 | A-51 | B-1 | N | 132 |
| 247 | A-51 | B-16 | N | 139 |
| 248 | A-52 | B-17 | N | 136 |
| 249 | A-51 | B-25 | N | 129 |
| 250 | A-53 | B-28 | N | 126 |
| 251 | A-54 | B-2 | N | 130 |
| 252 | A-54 | B-15 | N | 139 |
| 253 | A-56 | B-16 | N | 141 |
| 254 | A-54 | B-25 | N | 125 |
| 255 | A-57 | B-1 | N | 132 |
| 256 | A-57 | B-10 | N | 129 |
| 257 | A-59 | B-15 | N | 144 |
| 258 | A-59 | B-26 | N | 133 |
| 259 | A-60 | B-2 | N | 134 |
| 260 | A-63 | B-5 | N | 130 |
| 261 | A-60 | B-15 | N | 142 |
| 262 | A-61 | B-17 | N | 140 |
| 263 | A-60 | B-25 | N | 131 |
| 264 | A-65 | B-2 | N | 127 |

TABLE 2-2-continued

| Dye No. | A | B | D | Light Fastness |
|---|---|---|---|---|
| 265 | A-65 | B-12 | N | 126 |
| 266 | A-66 | B-15 | N | 140 |
| 267 | A-66 | B-27 | N | 129 |
| 268 | A-69 | B-2 | N | 130 |
| 269 | A-69 | B-15 | N | 141 |
| 270 | A-71 | B-16 | N | 138 |

TABLE 2-3

| Dye No. | A | B | D | Light Fastness |
|---|---|---|---|---|
| 271 | A-71 | B-25 | N | 128 |
| 272 | A-73 | B-1 | N | 130 |
| 273 | A-74 | B-15 | N | 142 |
| 274 | A-73 | B-17 | N | 140 |
| 275 | A-72 | B-29 | N | 131 |
| 276 | A-1 | B-15 | CH | 129 |
| 277 | A-2 | B-25 | CH | 118 |
| 278 | A-8 | B-10 | CH | 116 |
| 279 | A-16 | B-17 | CH | 128 |
| 280 | A-25 | B-15 | CH | 131 |
| 281 | A-29 | B-17 | CH | 130 |
| 282 | A-34 | B-12 | CH | 123 |
| 283 | A-45 | B-16 | CH | 132 |
| 284 | A-51 | B-10 | CH | 124 |
| 285 | A-59 | B-15 | CH | 128 |
| 286 | A-46 | B-17 | C(CN) | 133 |
| Comparative Dye 2-1 | | | | 100 |
| Comparative Dye 2-2 | | | | 96 |
| Comparative Dye 2-3 | | | | 87 |

TABLE 2-4

| Dye | Light Fastness |
|---|---|
| 2-1 | 140 |
| 2-2 | 135 |
| 2-3 | 147 |
| 2-4 | 156 |
| 2-5 | 130 |
| 2-6 | 132 |
| 2-7 | 140 |
| 2-8 | 142 |
| 2-9 | 137 |
| 2-11 | 130 |
| 2-12 | 124 |
| 2-13 | 140 |
| 2-14 | 136 |
| 2-15 | 165 |

Based on the results in Tables 2-1 through 2-4, it was found that images formed employing thermal transfer materials comprising dyes of the present invention exhibited excellent light fastness.

Example 2-2

<Preparation of Ink>

Ink was prepared which was composed of 3 weight percent of each of dyes described in Table 4, 19 weight percent of diethylene glycol, 9 weight percent of triethylene glycol monobutyl ether, 0.6 weight percent of Surfynol 465 as a surface active agent, and remaining weight percent of deionized water.

Further, a comparative dye having the structure shown below was employed.

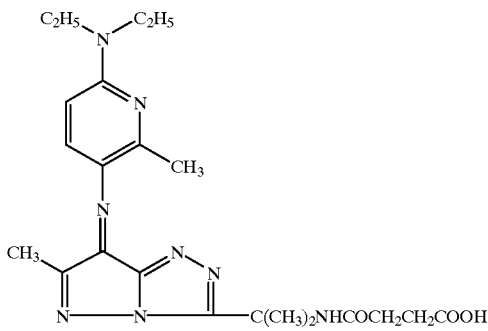

Comparative Compound 2-4 (Compound (1-20)
Described in Japanese Patent Publication Open to
Public Inspection No. 9-150572

<Formation of the Ink-jet Image>

Image samples were prepared by printing images on sheets of plain paper (Xerox 4024) employing an ink-jet printer MJ-5000C (electrical-mechanical conversion method, manufactured by Seiko-Epson Co.) provide with the above-mentioned ink.

Surface Active Agent-1: Surfynol 465
(manufactured By Air Products and Chemicals Inc.)

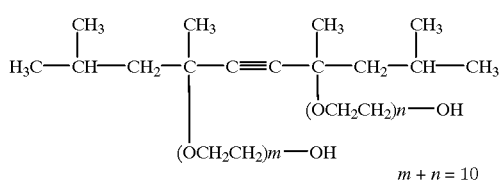

<Evaluation of the Ink-jet Image>
(Evaluation of Light Fastness)

Samples having a reflection density of about 1.0, which have been prepared by the method described above, were irradiated employing a Xe fademeter (at 70,000 Lx, for 50 hours) and the change rate of the reflection density was obtained as described below:

Change rate of reflection density=(reflection density after Xe irradiation)/(reflection density prior to Xe irradiation)×100

Table 2-5 show the relative values when the change rate of the reflection density of Comparative Compound is 100.

TABLE 2-5

| Dye No. | A | B | D | Light Fastness |
|---|---|---|---|---|
| 1 | A-2 | B-45 | N | 142 |
| 2 | A-6 | B-46 | N | 131 |
| 3 | A-8 | B-45 | N | 140 |
| 4 | A-11 | B-26 | N | 132 |
| 5 | A-17 | B-45 | N | 141 |
| 6 | A-20 | B-46 | N | 130 |
| 7 | A-22 | B-46 | N | 128 |
| 8 | A-25 | B-47 | N | 149 |
| 9 | A-34 | B-45 | N | 143 |
| 10 | A-35 | B-46 | N | 130 |
| 11 | A-45 | B-5 | N | 133 |
| 12 | A-45 | B-45 | N | 139 |
| 13 | A-50 | B-45 | N | 140 |
| 14 | A-53 | B-46 | N | 132 |

TABLE 2-5-continued

| Dye No. | A | B | D | Light Fastness |
|---|---|---|---|---|
| 15 | A-55 | B-47 | N | 147 |
| 16 | A-57 | B-45 | N | 138 |
| 17 | A-60 | B-45 | N | 141 |
| 18 | A-63 | B-47 | N | 148 |
| 19 | A-67 | B-45 | N | 142 |
| 20 | A-69 | B-45 | N | 137 |
| 21 | A-72 | B-45 | N | 140 |
| 22 | A-2 | B-45 | CH | 131 |
| 23 | A-11 | B-46 | CH | 129 |
| 24 | A-23 | B-42 | CH | 119 |
| 25 | A-28 | B-45 | CH | 129 |
| 26 | A-34 | B-47 | CH | 139 |
| 27 | A-45 | B-45 | CH | 132 |
| 28 | A-50 | B-45 | CH | 133 |
| 29 | A-46 | B-46 | C(CN) | 125 |
| Comparative Compound 2-4 | | | | 100 |

Based on the results in Tables 2-5, it was found that images formed employing ink-jet recording liquid comprising the dye of the present invention exhibited excellent light fastness. These are due to the excellent light fastness of the dye of the present invention.

TABLE 2-6

| Dye | Light Fastness |
|---|---|
| 2-16 | 150 |
| 2-17 | 130 |
| 2-18 | 128 |
| 2-19 | 145 |

Example 2-3

Thermal Transfer Materials 202 through 231 were prepared in the same manner as the method which was employed to obtain Image 201 in Example 2-1, employing dyes described in Tables 2-7, and corresponding images 2 through 31 was obtained. Further, as comparative dyes, the above-mentioned Comparative Compounds 1 through 3 were used.

<Evaluation of the Thermal Transfer Image>
(Evaluation of Light Fastness)

Samples having a reflection density of about 1.0, which have been prepared by the method described above, were irradiated employing a Xe fademeter (70,000 Lx, 50 hours) and the change rate of the reflection density was obtained as described below:

Change rate of reflection density=(reflection density after Xe irradiation)/(reflection density prior to Xe irradiation)×100

Table 2-7 shows the relative values when the change rate of the reflection density of Comparative Compound is 100.

TABLE 2-7

| Dye No. | X | Y | G | Light Fastness |
|---|---|---|---|---|
| 201 | X-1 | Y-1 | N | 132 |
| 202 | X-5 | Y-10 | N | 130 |
| 203 | X-1 | Y-15 | N | 128 |
| 204 | X-3 | Y-25 | N | 129 |
| 205 | X-5 | Y-35 | N | 127 |
| 206 | X-7 | Y-3 | N | 127 |
| 207 | X-7 | Y-17 | N | 130 |

TABLE 2-7-continued

| Dye No. | X | Y | G | Light Fastness |
|---|---|---|---|---|
| 208 | X-10 | Y-24 | N | 147 |
| 209 | X-7 | Y-25 | N | 132 |
| 210 | X-12 | Y-29 | N | 129 |
| 211 | X-7 | Y-19 | N | 143 |
| 212 | X-13 | Y-1 | N | 131 |
| 213 | X-13 | Y-16 | N | 140 |
| 214 | X-14 | Y-26 | N | 129 |
| 215 | X-16 | Y-5 | N | 128 |
| 216 | X-18 | Y-15 | N | 143 |
| 217 | X-18 | Y-25 | N | 131 |
| 218 | X-21 | Y-17 | N | 142 |
| 219 | X-22 | Y-15 | N | 145 |
| 220 | X-24 | Y-23 | N | 148 |
| 221 | X-24 | Y-24 | N | 147 |
| 222 | X-1 | Y-15 | CH | 132 |
| 223 | X-5 | Y-10 | CH | 123 |
| 224 | X-5 | Y-2 | CH | 122 |
| 225 | X-7 | Y-17 | CH | 129 |
| 226 | X-10 | Y-24 | CH | 136 |
| 227 | X-10 | Y-25 | CH | 119 |
| 228 | X-13 | Y-16 | CH | 132 |
| 229 | X-18 | Y-12 | CH | 119 |
| 230 | X-22 | Y-17 | CH | 134 |
| 231 | X-1 | Y-16 | C(CN) | 135 |
| Comparative Compound 2-1 | | | | 100 |
| Comparative Compound 2-2 | | | | 98 |
| Comparative Compound 2-3 | | | | 87 |

Based on the results in Table 2-7, it is found that images formed employing thermal transfer materials comprising dyes of the present invention exhibit excellent light fastness.

Example 2-4

<Preparation of Ink>

Ink was prepared which was composed of 3 weight percent of each of dyes described in Table 2-8, 19 weight percent of diethylene glycol, 9 weight percent of triethylene glycol monobutyl ether, 0.6 weight percent of Surfynol 465 as a surface active agent, and remaining weight percent of deionized water.

Further, as a comparative dye, the above-mentioned comparative compound 4 was employed.

<Formation of the Ink-jet Image>

Image samples were prepared by printing images on sheets of plain paper (Xerox 4024) employing an ink-jet printer MJ-5000C (utilizing an electrical-mechanical conversion method, manufactured by Seiko-Epson Co.) provide with the above-mentioned ink.

<Evaluation of the Ink-jet Image>

(Evaluation of Light Fastness)

Samples having a reflection density of about 1.0, which have been prepared by the method described above, were irradiated employing a Xe fademeter (at 70,000 Lx, for 50 hours) and the change rate of the reflection density was obtained as described below:

Changed rate of reflection density=(reflection density after Xe irradiation)/(reflection density prior to Xe irradiation)×100

Table 2-8 shows the relative values when the change rate of the reflection density of Comparative Compound 1 is 100.

TABLE 2-8

| Dye No. | X | Y | G | Light Fastness |
|---|---|---|---|---|
| 201 | X-1 | Y-45 | N | 142 |
| 202 | X-3 | Y-46 | N | 134 |
| 203 | X-7 | Y-47 | N | 149 |
| 204 | X-12 | Y-45 | N | 144 |
| 205 | X-13 | Y-46 | N | 129 |
| 206 | X-18 | Y-45 | N | 141 |
| 207 | X-21 | Y-45 | N | 139 |
| 208 | X-23 | Y-47 | N | 146 |
| 209 | X-8 | Y-35 | N | 132 |
| 210 | X-8 | Y-16 | N | 138 |
| 211 | X-1 | Y-46 | CH | 119 |
| 212 | X-7 | Y-45 | CH | 132 |
| 213 | X-13 | Y-45 | CH | 131 |
| 214 | X-21 | Y-45 | CH | 129 |
| 215 | X-8 | Y-17 | CH | 133 |
| 216 | X-1 | Y-45 | C(CN) | 130 |
| Comparative Compound 2-4 | | | | 100 |

Based on the results in Table 2-8, it was found that images formed employing the ink-jet recording liquid comprising the dye of the present invention exhibited excellent light fastness. These are due to the excellent light fastness for the dye of the present invention.

According to the present invention, it is possible to provide novel dyes which exhibit excellent fastness, specifically in light fastness, and an image recording material, thermal transfer material, and ink-jet recording liquid comprising said dye.

What is claimed is:

1. An image recording material which comprises at least a dye represented by formula (I), Formula (229), Formula (230), Formula (231) or Formula (232):

Formula (I)

wherein X and Y each independently represents a coupler component represented by formula (II), (III), (IV), (V), (VI) or (VII) except that at least one of X and Y is a substituted or unsubstituted phenol, and wherein * shows a coupling position:

Formula (II)

Formula (III)

Formula (IV)

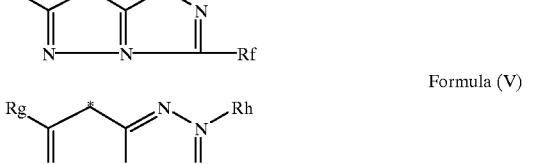

Formula (V)

Formula (VI)

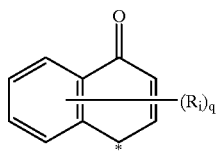

Formula (VII)

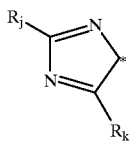

in formula (II) $R_a$ represents a carbamoyl group or a cyano group, and $R_b$ represents an alkyl group which may have a substituent, an aryl group which may have a substituent, and a heterocycle which may have a substituent:

in formula (III) $R_c$ is the same as $R_b$, and $R_d$ represents an alkyl group which may have a substituent, an aryl group which may have a substituent, a heterocycle which may have a substituent, an acylamino group, an anilino group, an amino group an alkyloxy group, a cyano group, a carbamoyl group, an alkoxycarbonyl group, or an aryloxycarbonyl group;

in formula (IV), $R_e$ and $R_f$ each represents an alkyl group which may have a substituent, an aryl which may have a substituent, a heterocycle which may have a substituent, an acylamino group, an anilino group, an amino group an alkyloxy group a cyano group, a carbamoyl group, an alkoxycarbonyl group, or an aryloxycarbonyl group;

in formula (V), $R_g$ and $R_h$ each represents an alkyl group which may have a substituent, an aryl which may have a substituent, a heterocycle which may have a substituent, an acylamino group, an anilino group, an amino group, an alkyloxy group, a cyano group, a carbamoyl group, an alkoxycarbonyl group, or an aryloxycarbonyl group;

in formula (VI), $R_i$ represents an acylamino group, a sulfonylamino group, a ureido group, a carbamoyl group, an alkoxycarbonylamino group, an aryloxycarbonylamino group), an amino group an alkyl group, and q represents 1 to 3, and, when q represents 2, 3, and 4,substituents represented by $R_i$ may be the same or different; and in formula (VII) $R_j$ and $R_g$ each is the same as $R_b$ as defined; above; and G combines with a coupler component at coupling position, G represents a nitrogen atom or C—Rx in which Rx represents a hydrogen atom or a substitutable group;

Formula (229)

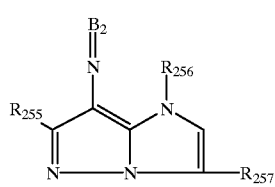

Formula (230)

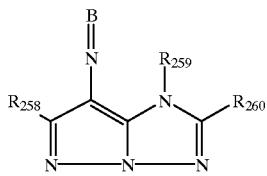

in formulas (229) and (230) $R_{255}$, $R_{257}$, $R_{258}$ and $R_{260}$ each represents an alkyl group which may have a substituent, an aryl group which may have a substituent, a heterocycle which may have a substituent, an acylamino group, an alkyloxy group, an arloxy group, a carbamoyl group, a cyano group, an alkoxycarbonyl group, or an aryloxycarbonyl group, $R_{256}$ and $R_{259}$ each represents an alkyl group which may have a substituent, and B represents a coupler component:

Formula (231)

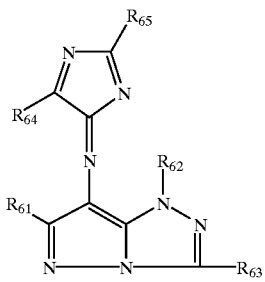

Formula (232)

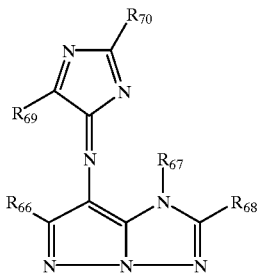

in formulas (231) and (232), $R_{64}$ and $R_{69}$ each represents a hydrogen atom, an alkyl group which may have a substituent, an aryl group which may have a substituent, a heterocycle which may have a substituent, an acylamino group, an alkyloxy group or an aryloxy group; $R_{65}$ and $R_{70}$ each represents a hydrogen atom, an alkyl group which may have a substituent, an aryl group which may have a substituent, a heterocycle which may have a substituent,an acylamino group, an alkyloxy group or an aryloxy group; $R_{61}$,$R_{63}$, $R_{66}$, and $R_{68}$ each represents an alkyl group which may have a substituent, an aryl group which may have a substituent, a heterocycle which may have a substituent, an acylamino group, an alkyloxy group, an aryloxy group, a carbamoyl group, a cyano group, an alkoxycarbonyl ,group, or an aryloxycarbonyl group; and $R_{62}$ and $R_{67}$ each represents an alkyl group which may have a substituent.

2. The image recording material of claim 1, wherein X and Y each independently represents a coupler component represented by formula (III), (IV), (V) or (VI).

3. The image recording material of claim 1, wherein X and Y each independently represents a coupler component represented by formula (IV) or (V).

4. The image recording material of claim 1, wherein $R_e$, $R_f$, $R_g$ or $R_h$ each represents alkyl group or aryl group, both may have a substituent.

5. The image recording material of claim 3, wherein $R_e$ or $R_g$ represents a methyl group, an iso-propyl a t-butyl group or phenyl group which may have a substituent, and $R_f$ or $R_h$ represents alkyl group which may have a substituent, a phenyl group or heterocyclic group.

6. The image recording material of claim 1, wherein the dye is a dye represented by formula (I), Formula (229), Formula (230), Formula (231) or Formula (232).

7. A thermal transfer material comprising a support thereon having a layer including at least a dye represented by formula (1), Formula(229), Formula (230), Formula (231) or Formula (232):

$$Y=G-X \qquad \text{Formula (I)}$$

wherein X and Y each independently represents a coupler component represented by formula (II), (III),(IV),(V), (VI) or (VII) except that at least one of X and Y is a substituted or unsubstituted phenol, and wherein  shows a coupling position:

$$R_bCOC^*R_a \qquad \text{Formula (II)}$$

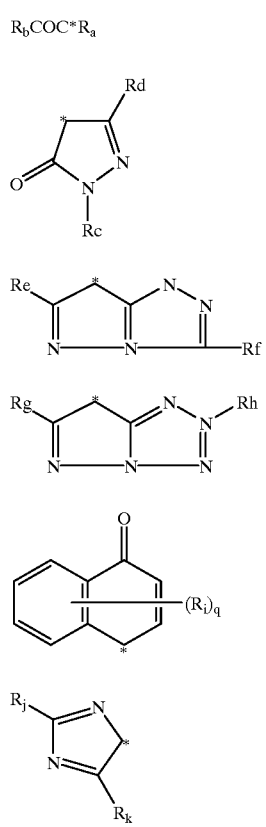

Formula (III)

Formula (IV)

Formula (V)

Formula (VI)

Formula (VII)

in formula (II) $R_a$ represents a carbamoyl group or a cyano group, and $R_b$ represents an alkyl group which may have a substituent, an aryl group which may have a substituent, and a heterocycle which may have a substituent:

in formula (III) $R_c$ is the same as $R_b$, and $R_d$ represents an alkyl group which may have a substituent, an aryl group which may have a substituent, a heterocycle which may have a substituent, an acylamino group, an anilino group, an amino group an alkyloxy group, a cyano group, a carbamoyl group, an alkoxycarbonyl group, or an aryloxycarbonyl group;

in formula (IV), $R_e$ and $R_f$ each represents an alkyl group which may have a substituent, an aryl which may have a substituent, a heterocycle which may have a substituent, an acylamino group, an anilino group, an amino group an alkyloxy group a cyano group, a carbamoyl group, an alkoxycarbonyl group, or an aryloxycarbonyl group;

in formula (V), $R_g$ and $R_h$ each represents an alkyl group which may have a substituent, an aryl which may have a substituent, a heterocycle which may have a substituent, an acylamino group, an anilino group, an amino group, an alkyloxy group, a cyano group, a carbamoyl group, an alkoxycarbonyl group, or an aryloxycarbonyl group;

in formula (VI), $R_i$ represents an acylamino group, a sulfonylamino group, a ureido group, a carbamoyl group, an alkoxycarbonylamino group, an aryloxycarbonylamino group), an amino group an alkyl group, and q represents 1 to 3, and, when q represents 2, 3, and 4,substituents represented by $R_i$ may be the same or different; and in formula (VII) $R_j$ and $R_g$ each is the same as $R_b$ defined above; and G combines with a coupler component at coupling position, G represents a nitrogen atom or C—Rx in which Rx represents a hydrogen atom or a substitutable group;

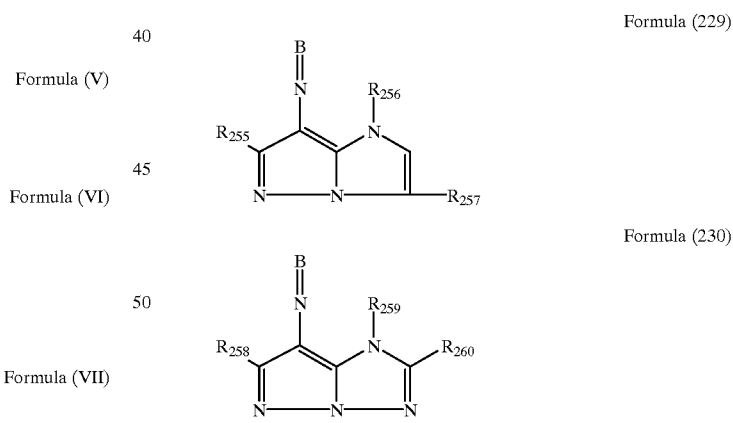

Formula (229)

Formula (230)

in formulas (229) and (230) $R_{255}$, $R_{257}$, $R_{258}$ and $R_{260}$ each represents an alkyl group which may have a substituent, an aryl group which may have a substituent, a heterocycle which may have a substituent, an acylamino group, an alkyloxy group, an arloxy group, a carbamoyl group, a cyano group, an alkoxycarbonyl group, or an aryloxycarbonyl group, $R_{256}$ and $R_{259}$ each represents an alkyl group which may have a substituent, and B represents a coupler component:

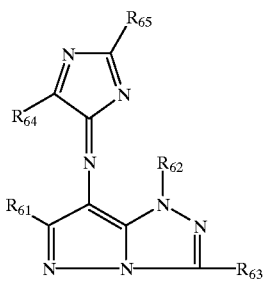

Formula (231)

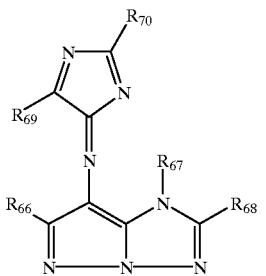

Formula (232)

in formulas (231) and (232), $R_{64}$ and $R_{69}$ each represents a hydrogen atom, an alkyl group which may have a substituent, an aryl group which may have a substituent, a heterocycle which may have a substituent, an acylamino group, an alkyloxy group or an aryloxy group; $R_{65}$ and $R_{70}$ each represents a hydrogen atom, an alkyl group which may have a substituent, an aryl group which may have a substituent, a heterocycle which may have a substituent, an acylamino group, an alkyloxy group or an aryloxy group; $R_{61}$, $R_{63}$, $R_{66}$, and $R_{68}$ each represents an alkyl group which may have a substituent, an aryl group which may have a substituent, a heterocycle which may have a substituent, an acylamino group, an alkyloxy group, an aryloxy group, a carbamoyl group, a cyano group, an alkoxycarbonyl ,group, or an aryloxycarbonyl group; and $R_{62}$ and $R_{67}$ each represents an alkyl group which may have a substituent.

8. The thermal transfer material of claim 7, wherein X and Y each independently represents a coupler component represented by formula (IV) or (V).

9. The thermal transfer material of claim 7, wherein $R_e$, $R_f$, $R_g$ or $R_h$ each represents alkyl group or aryl group, both may have a substituent.

10. The thermal transfer material of claim 8, wherein $R_e$ or $R_g$ represents a methyl group, an iso-propyl a t-butyl group or phenyl group which may have a substituent, and $R_f$ or $R_h$ represents alkyl group which may have a substituent, a phenyl group or heterocyclic group.

11. The thermal transfer material of claim 7, wherein the dye is a dye represented by formula (I), Formula (229), Formula (230), Formula (231) or Formula (232).

12. The thermal transfer material of claim 11, comprising the dye in an amount of 0.05 to 10 g per m².

13. An ink jet recording liquid comprising at least a dye represented by formula (I), Formula(229), Formula (230), Formula(231) or Formula (232):

Y=G—X  Formula (I)

wherein X and Y each independently represents a coupler component represented by formula (II), (III),(IV),(V), (VI) or (VII) except that at least one of X and Y is a substituted or unsubstituted phenol, and wherein * shows a coupling position:

$R_bCOC^*R_a$  Formula (II)

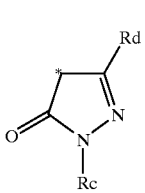

Formula (III)

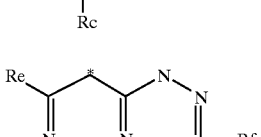

Formula (IV)

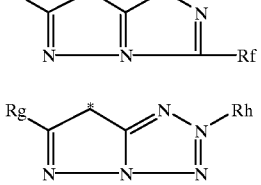

Formula (V)

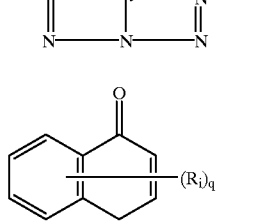

Formula (VI)

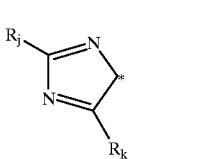

Formula (VII)

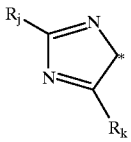

in formula (II) $R_a$ represents a carbamoyl group or a cyano group, and $R_b$ represents an alkyl group which may have a substituent, an aryl group which may have a substituent, and a heterocycle which may have a substituent:

in formula (III) $R_c$ is the same as $R_b$, and $R_d$ represents an alkyl group which may have a substituent, an aryl group which may have a substituent, a heterocycle which may have a substituent, an acylamino group, an anilino group, an amino group an alkyloxy group, a cyano group, a carbamoyl group, an alkoxycarbonyl group, or an aryloxycarbonyl group;

in formula (IV), $R_e$ and $R_f$ each represents an alkyl group which may have a substituent, an aryl which may have a substituent, a heterocycle which may have a substituent, an acylamino group, an anilino group, an amino group an alkyloxy group a cyano group, a carbamoyl group, an alkoxycarbonyl group, or an aryloxycarbonyl group;

in formula (V), $R_g$ and $R_h$ each represents an alkyl group which may have a substituent, an aryl which may have a substituent, a heterocycle which may have a substituent, an acylamino group, an anilino group, an amino group, an alkyloxy group, a cyano group, a carbamoyl group, an alkoxycarbonyl group, or an aryloxycarbonyl group;

in formula (VI), $R_i$ represents an acylamino group, a sulfonylamino group, a ureido group, a carbamoyl group, an alkoxycarbonylamino group, an aryloxycarbonylamino group), an amino group an alkyl group, and q represents 1 to 3, and, when q represents 2, 3, and 4, substituents represented by $R_i$ may be the same or different; and in formula (VII) $R_j$ and $R_g$ each is the same as $R_i$, defined above; and G combines with a coupler component at coupling position, G represents a nitrogen atom or C—Rx in which Rx represents a hydrogen atom or a substitutable group;

Formula (229)

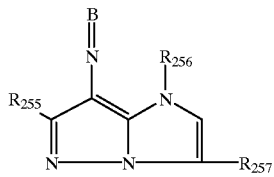

Formula (230)

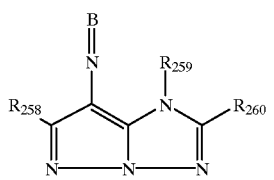

in formulas (229) and (230) $R_{255}$, $R_{257}$, $R_{258}$ and $R_{260}$ each represents an alkyl group which may have a substituent, an aryl group which may have a substituent, a heterocycle which may have a substituent, an acylamino group, an alkyloxy group, an arloxy group, a carbamoyl group, a cyano group, an alkoxycarbonyl group, or an aryloxycarbonyl group, $R_{256}$ and $R_{259}$ each represents an alkyl group which may have a substituent, and B represents a coupler component:

Formula (231)

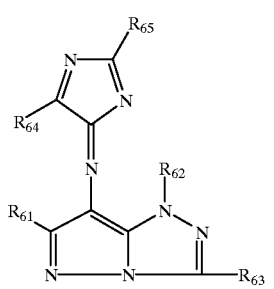

Formula (232)

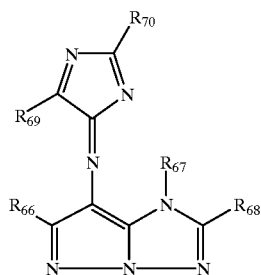

in formulas (231) and (232), $R_{64}$ and $R_{69}$ each represents a hydrogen atom, an alkyl group which may have a substituent, an aryl group which may have a substituent, a heterocycle which may have a substituent, an acylamino group, an alkyloxy group or an aryloxy group; $R_{65}$ and $R_{70}$ each represents a hydrogen atom, an alkyl group which may have a substituent, an aryl group which may have a substituent, a heterocycle which may have a substituent, an acylamino group, an alkyloxy group or an aryloxy group; $R_{61}$, $R_{63}$, $R_{66}$, and $R_{68}$ each represents an alkyl group which may have a substituent, an aryl group which may have a substituent, a heterocycle which may have a substituent, an acylamino group, an alkyloxy group, an aryloxy group, a carbamoyl group, a cyano group, an alkoxycarbonyl ,group, or an aryloxycarbonyl group; and $R_{62}$ and $R_{67}$ each represents an alkyl group which may have a substituent.

14. The ink-jet recording liquid of claim 13, wherein X and Y each independently represents a coupler component represented by formula (III), (IV), (V) or (VII).

15. The ink-jet recording liquid of claim 13, wherein X and Y each independently represents a coupler component represented by formula (IV) or (V).

16. The ink-jet recording liquid of claim 13, wherein $R_e$, $R_f$, $R_g$ or $R_h$ each represents alkyl group or aryl group, both may have a substituent.

17. The ink-jet recording liquid of claim 15, wherein $R_e$ or $R_g$ represents a methyl group, an iso-propyl a t-butyl group or phenyl group which may have a substituent, and $R_f$ or $R_h$ represents alkyl group which may have a substituent, a phenyl group or heterocyclic group.

18. The ink-jet recording liquid of claim 13, wherein the dye is a dye represented by formula (I), Formula (229), Formula (230), Formula (231) or Formula (232).

19. The ink-jet recording liquid of claim 13, comprising water of at least 10 weight percent of total ink weight and the dye in an amount of 0.1 to 25 weight percent of total ink-jet recording liquid.

20. The ink-jet recording liquid of claim 13, wherein the surface tension of the ink-jet recording liquid is at least 20 dyne/cm.

* * * * *